(12) United States Patent
Fleizach et al.

(10) Patent No.: US 12,175,070 B2
(45) Date of Patent: Dec. 24, 2024

(54) SYSTEMS AND METHODS FOR REMOTE INTERACTION BETWEEN ELECTRONIC DEVICES

(71) Applicant: Apple Inc., Cupertino, CA (US)

(72) Inventors: Christopher B. Fleizach, Gilroy, CA (US); Tu K. Nguyen, Fountain Valley, CA (US); Virata Yindeeyoungyeon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/319,388

(22) Filed: May 17, 2023

(65) Prior Publication Data
US 2023/0409194 A1 Dec. 21, 2023

Related U.S. Application Data

(60) Provisional application No. 63/364,879, filed on May 17, 2022.

(51) Int. Cl.
| | |
|---|---|
| *G06F 3/14* | (2006.01) |
| *G06F 3/041* | (2006.01) |
| *G06F 3/04842* | (2022.01) |
| *G06F 3/04886* | (2022.01) |
| *G06F 3/044* | (2006.01) |

(52) U.S. Cl.
CPC ........ *G06F 3/04886* (2013.01); *G06F 3/0416* (2013.01); *G06F 3/04842* (2013.01); *G06F 3/1454* (2013.01); *G06F 3/044* (2013.01); *G06F 2203/04105* (2013.01)

(58) Field of Classification Search
CPC . G06F 3/04842; G06F 3/04886; G06F 3/1454
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |

(Continued)

FOREIGN PATENT DOCUMENTS

| | | |
|---|---|---|
| WO | 2013/169849 A2 | 11/2013 |
| WO | 2014/105276 A1 | 7/2014 |

(Continued)

OTHER PUBLICATIONS

International Search Report received for PCT Patent Application No. PCT/US2023/022595, mailed on Aug. 31, 2023, 4 pages.

*Primary Examiner* — Gene W Lee
(74) *Attorney, Agent, or Firm* — Kubota & Basol LLP

(57) ABSTRACT

Some embodiments described in this disclosure are directed to a first electronic device that operates in a remote interaction mode with a second electronic device, where user interactions with images displayed on the first electronic device cause the second electronic device to update display of the images and/or corresponding user interfaces on the second electronic device.

36 Claims, 38 Drawing Sheets

(56) References Cited

U.S. PATENT DOCUMENTS

| | | |
|---|---|---|
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,736,417 B2 * | 8/2017 | Miura ............... H04N 21/42204 |
| 9,792,028 B2 * | 10/2017 | Chang .................... G08C 17/02 |
| 9,933,937 B2 | 4/2018 | Lemay et al. |
| 10,466,861 B2 * | 11/2019 | Williams ................ G06F 1/163 |
| 10,579,322 B1 | 3/2020 | Rodrigues et al. |
| 11,704,626 B2 * | 7/2023 | Somlai-Fischer ....... G06F 3/017 |
| | | 705/301 |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2015/0020013 A1 * | 1/2015 | Kim ...................... G06F 3/0488 |
| | | 715/769 |
| 2016/0364200 A1 | 12/2016 | Beveridge et al. |
| 2020/0019367 A1 | 1/2020 | Sun et al. |
| 2022/0129230 A1 * | 4/2022 | Ma ........................ G06F 3/1454 |

FOREIGN PATENT DOCUMENTS

| | | | |
|---|---|---|---|
| WO | 2020/104999 A1 | 5/2020 | |
| WO | WO-2022206763 A1 * | 10/2022 | ............... G06F 3/14 |
| WO | WO-2022206764 A1 * | 10/2022 | ............... G06F 3/14 |

\* cited by examiner

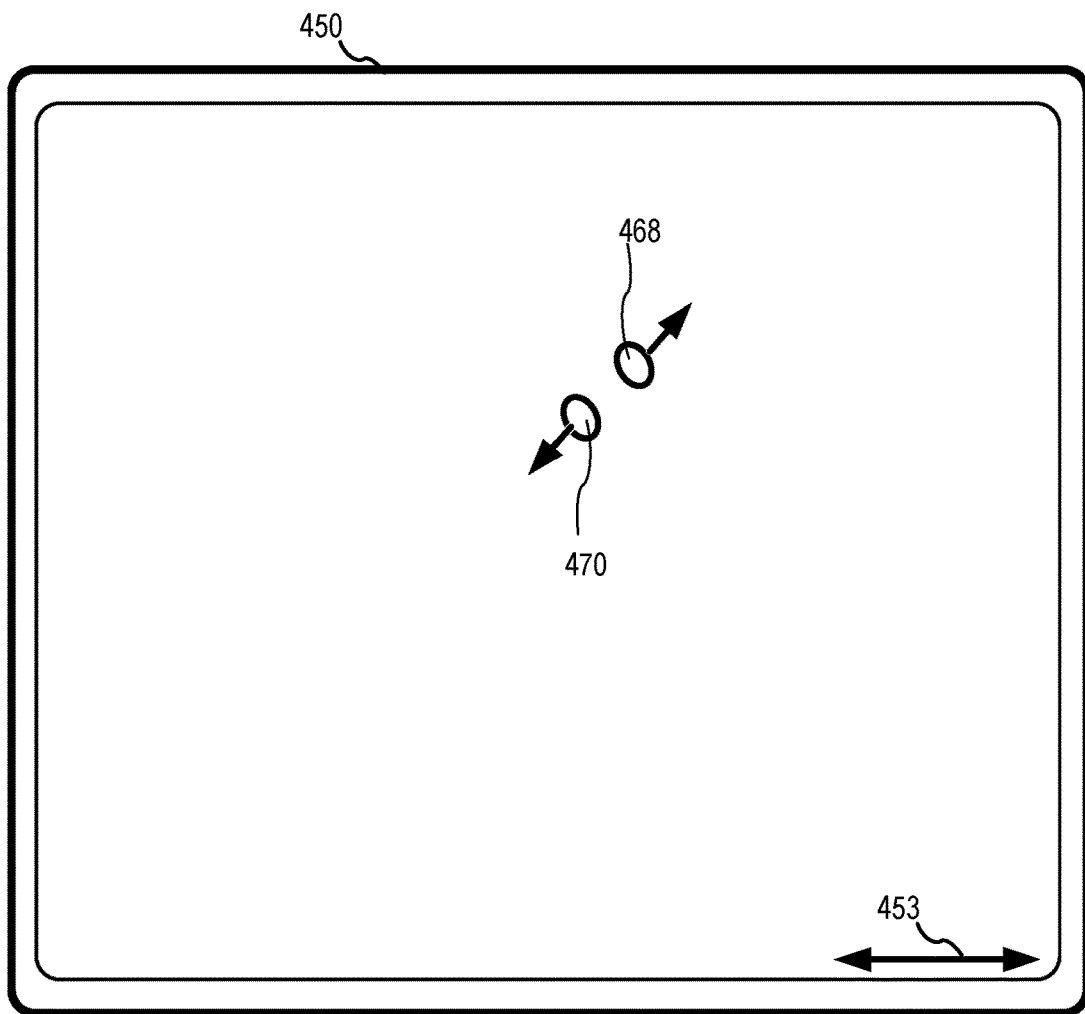
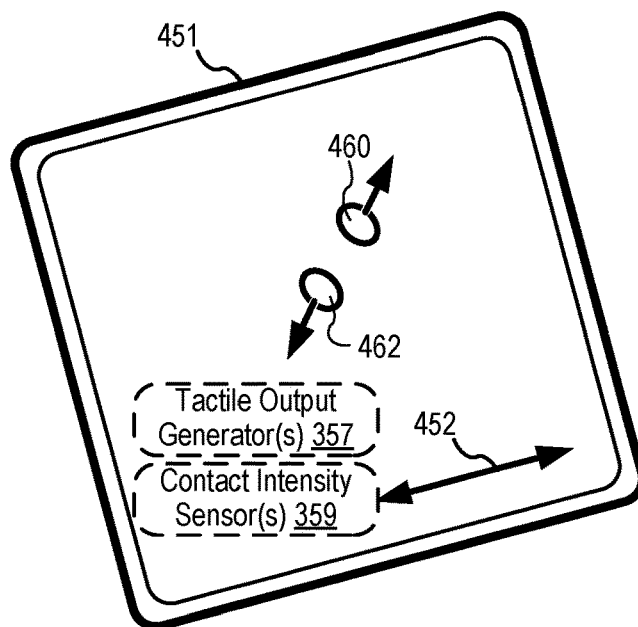
FIG. 4B

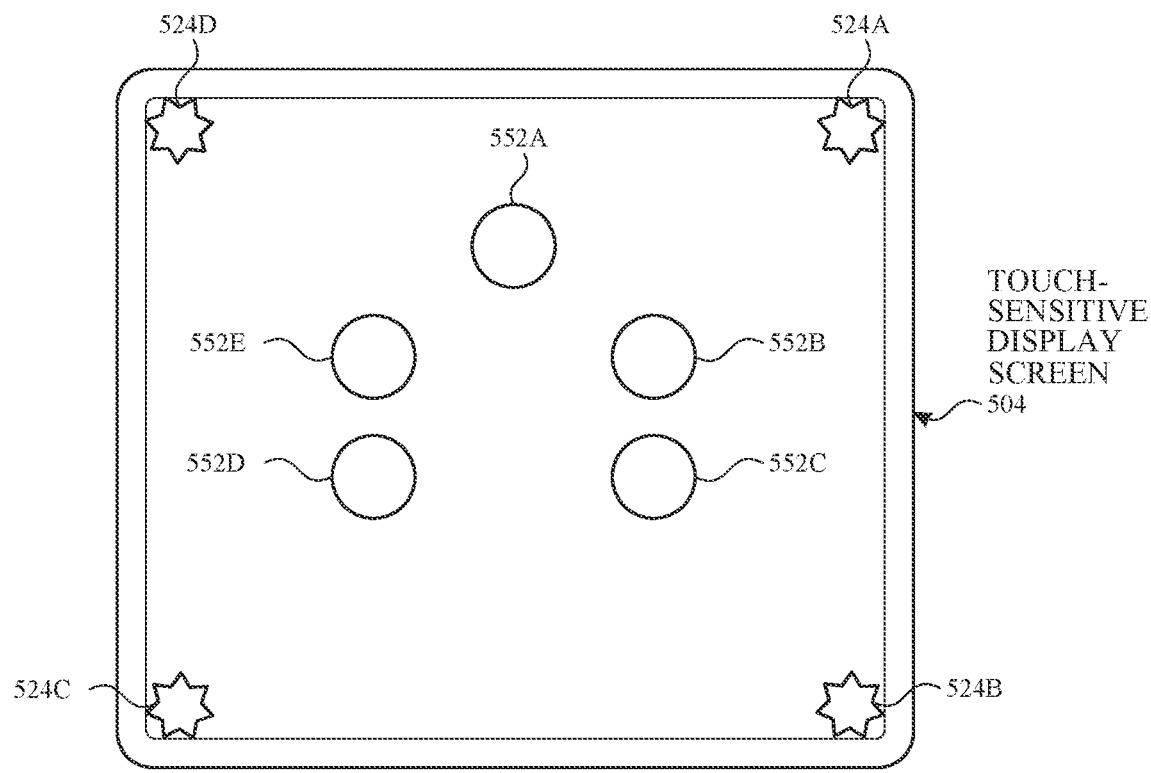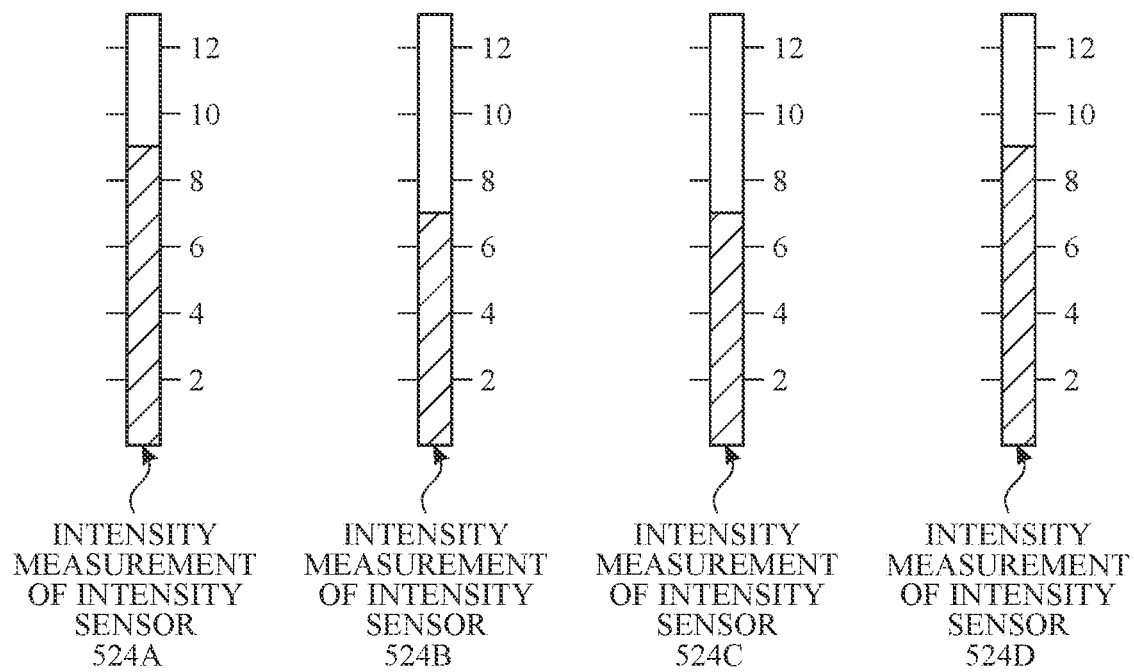
FIG. 5C

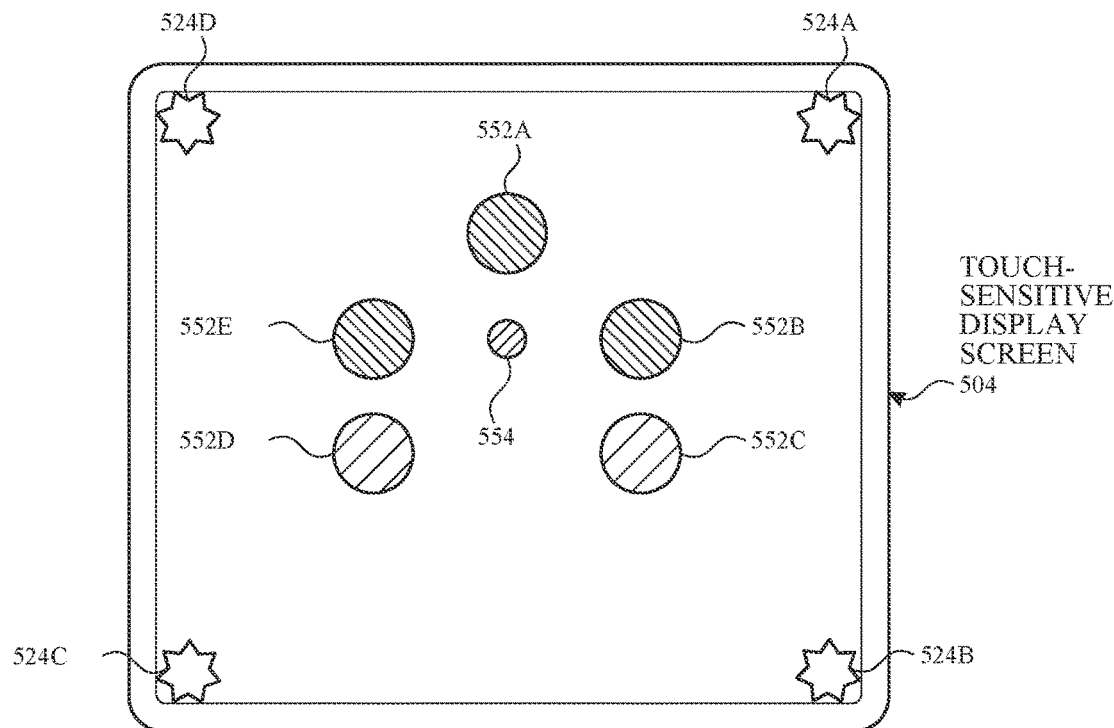
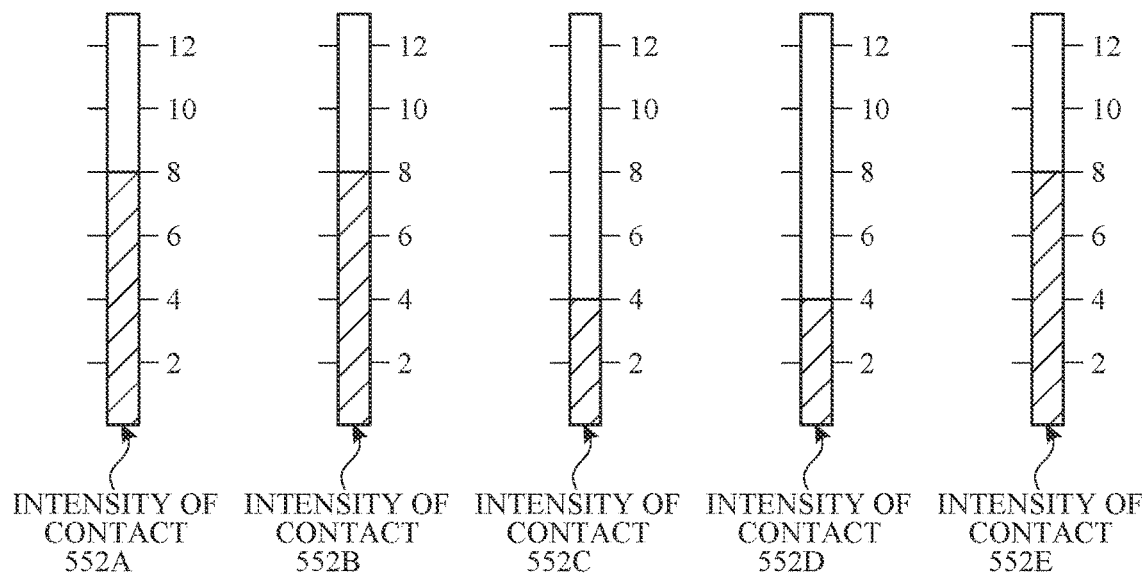
FIG. 5D

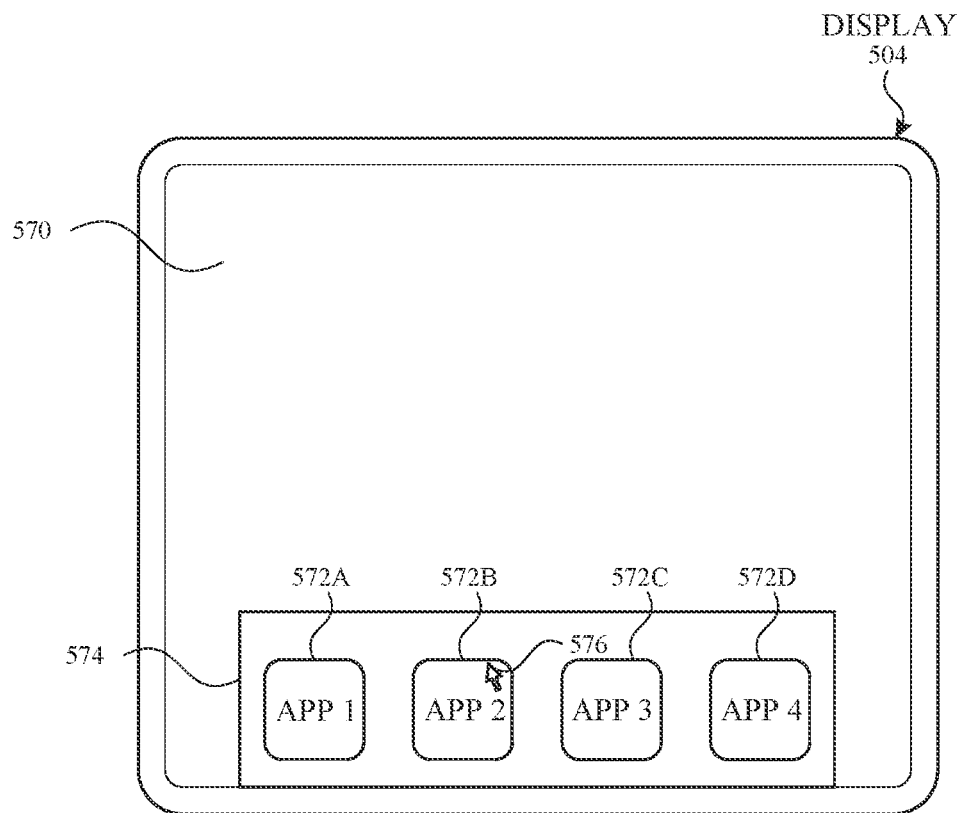
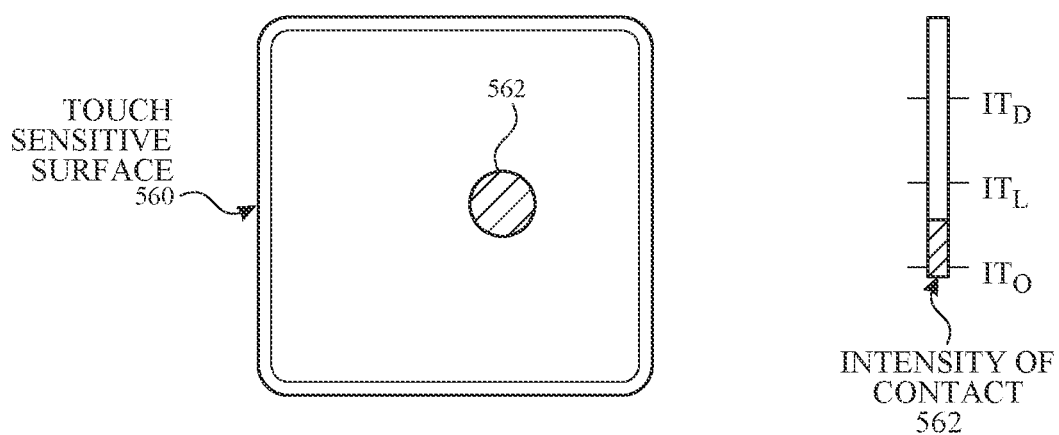
FIG. 5E

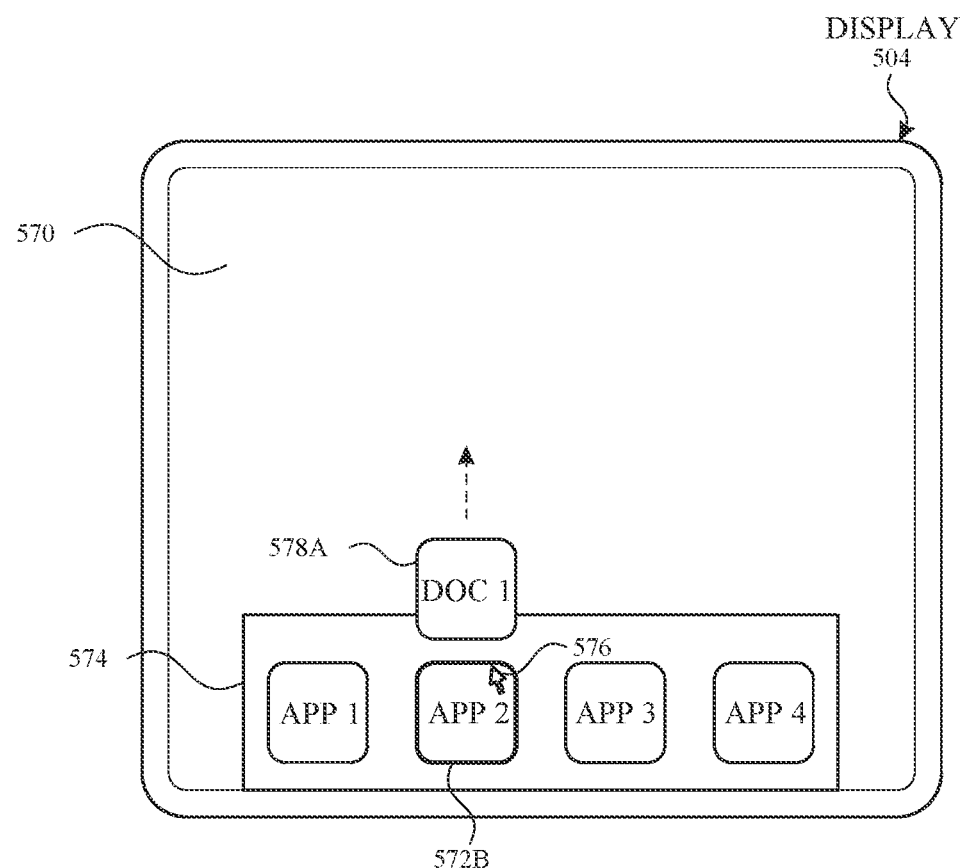
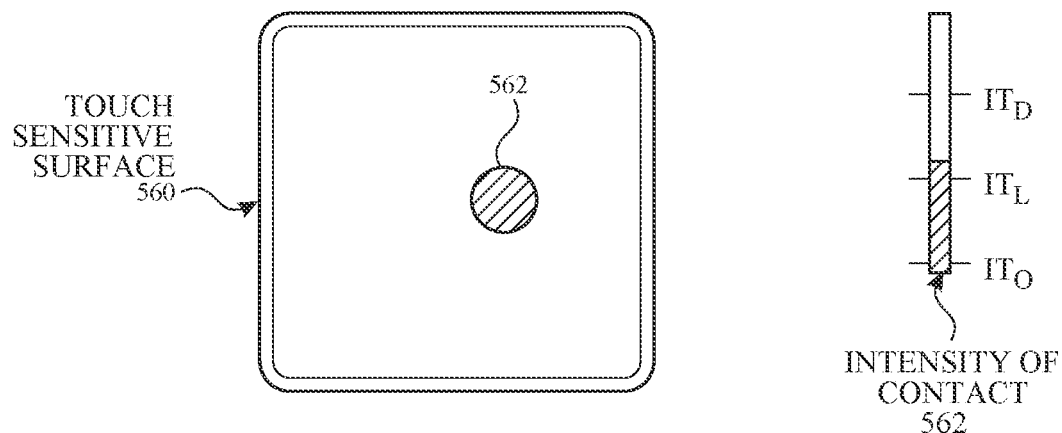
FIG. 5F

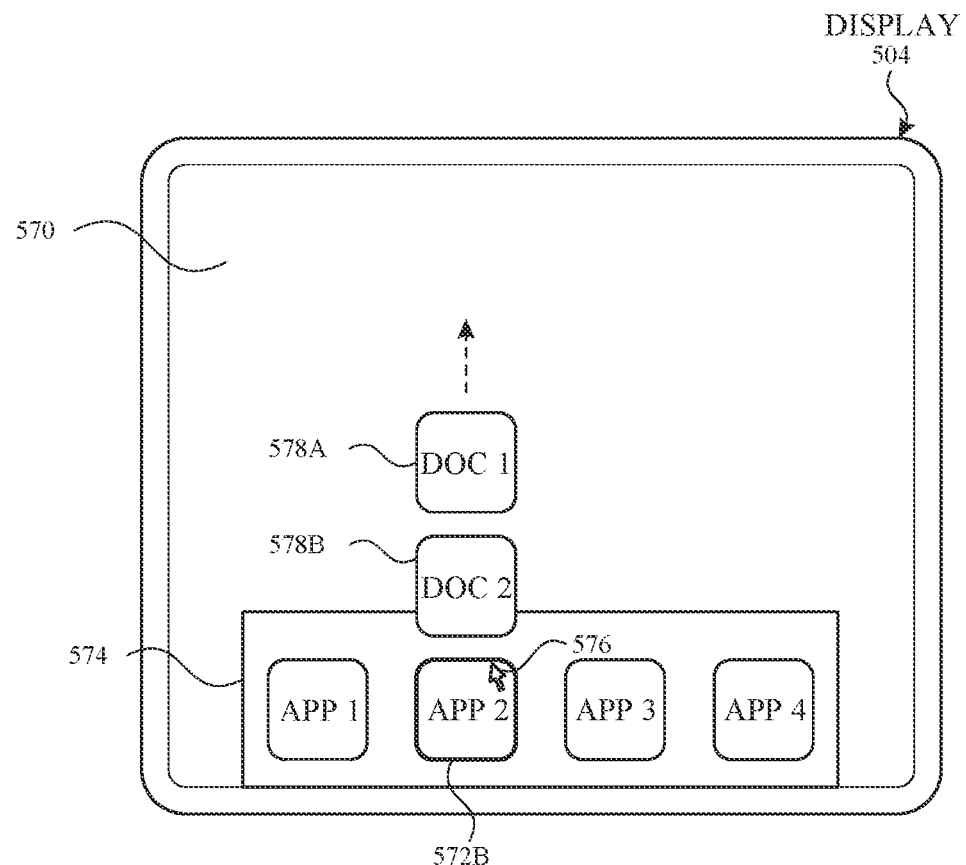
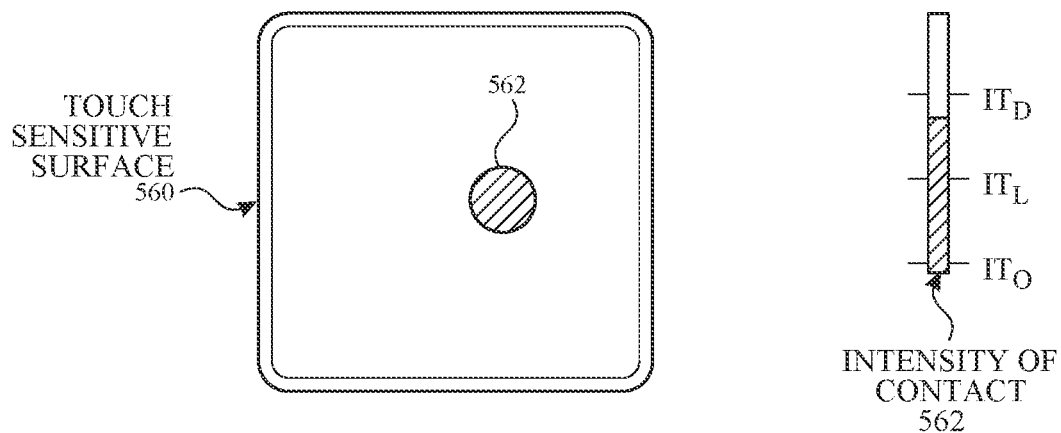
FIG. 5G

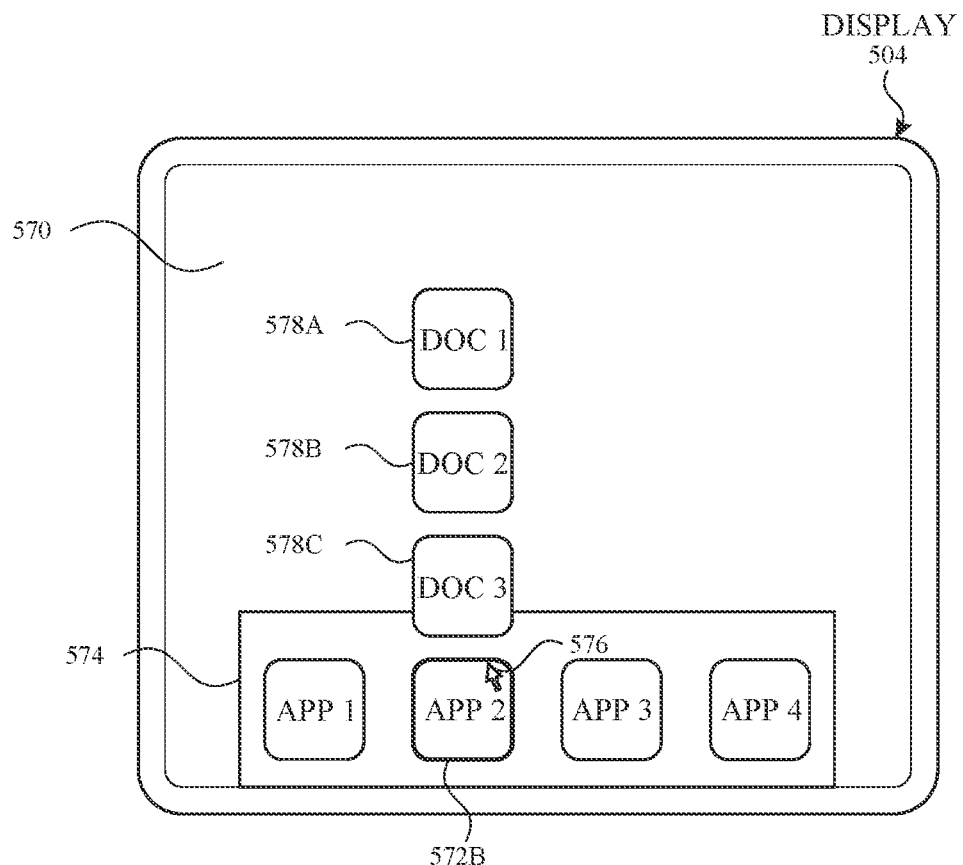
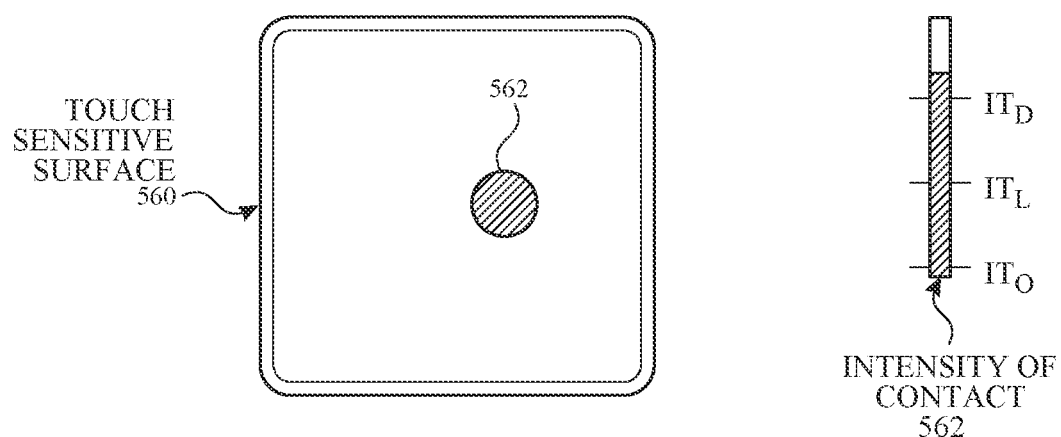
FIG. 5H

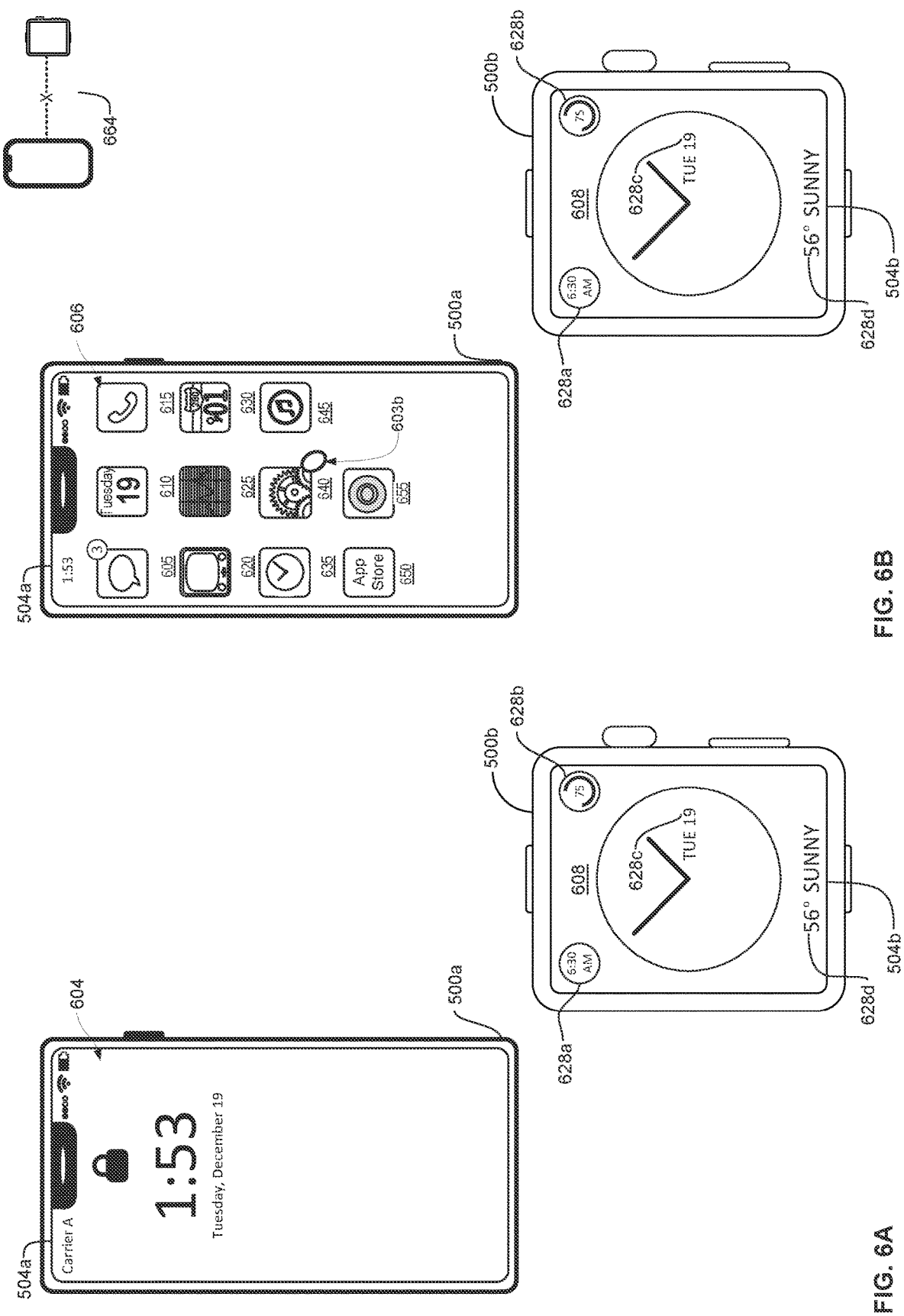

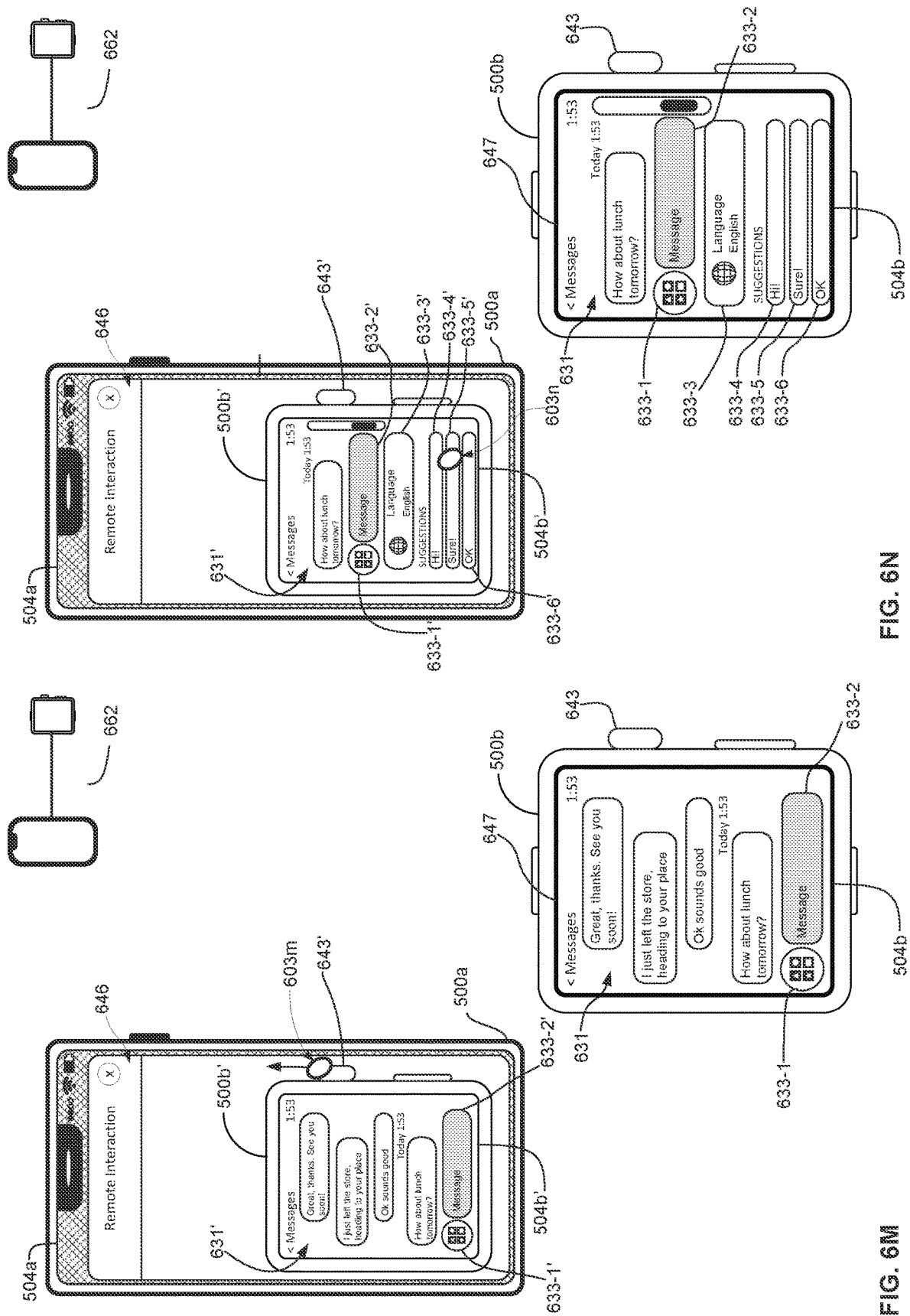

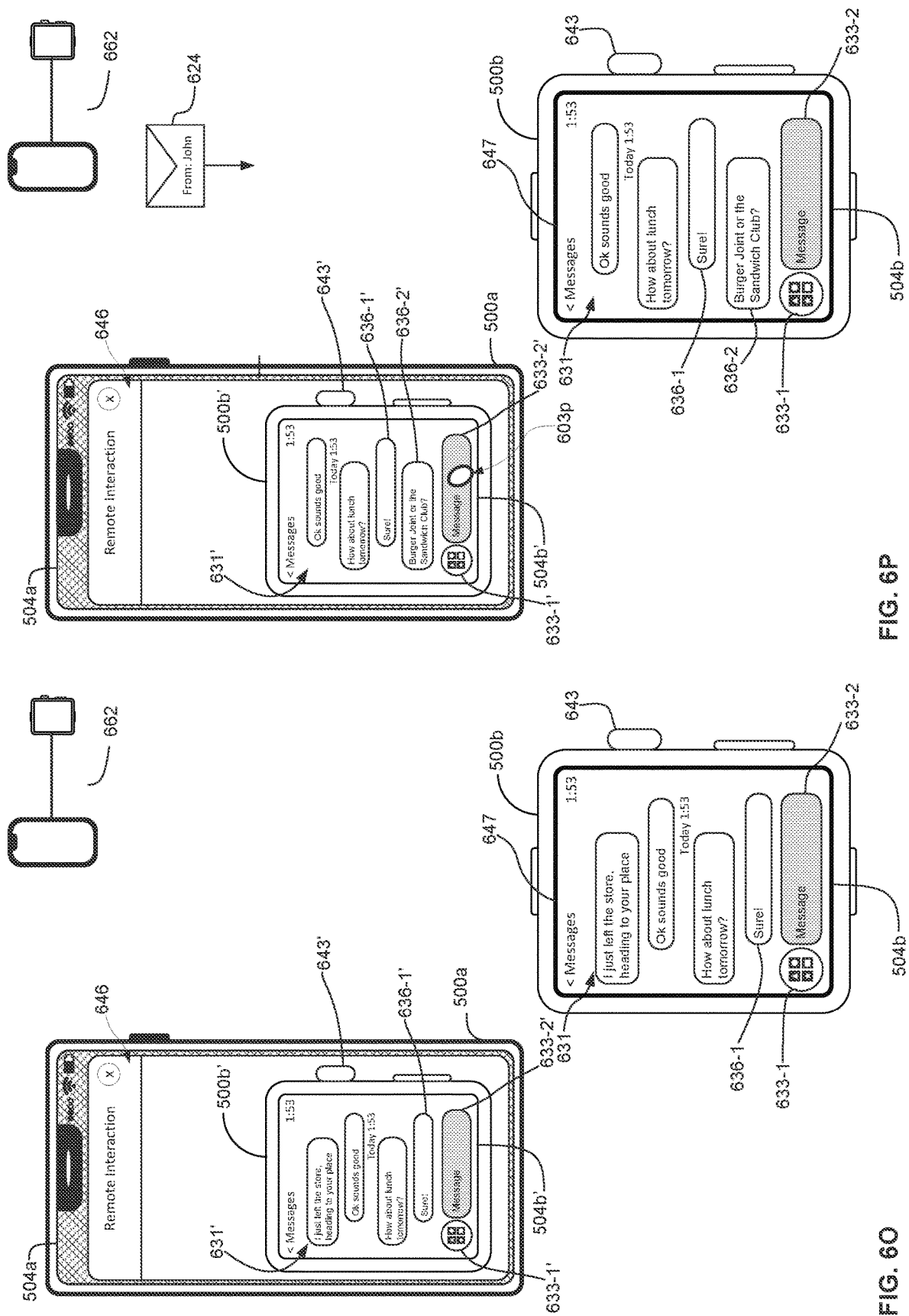

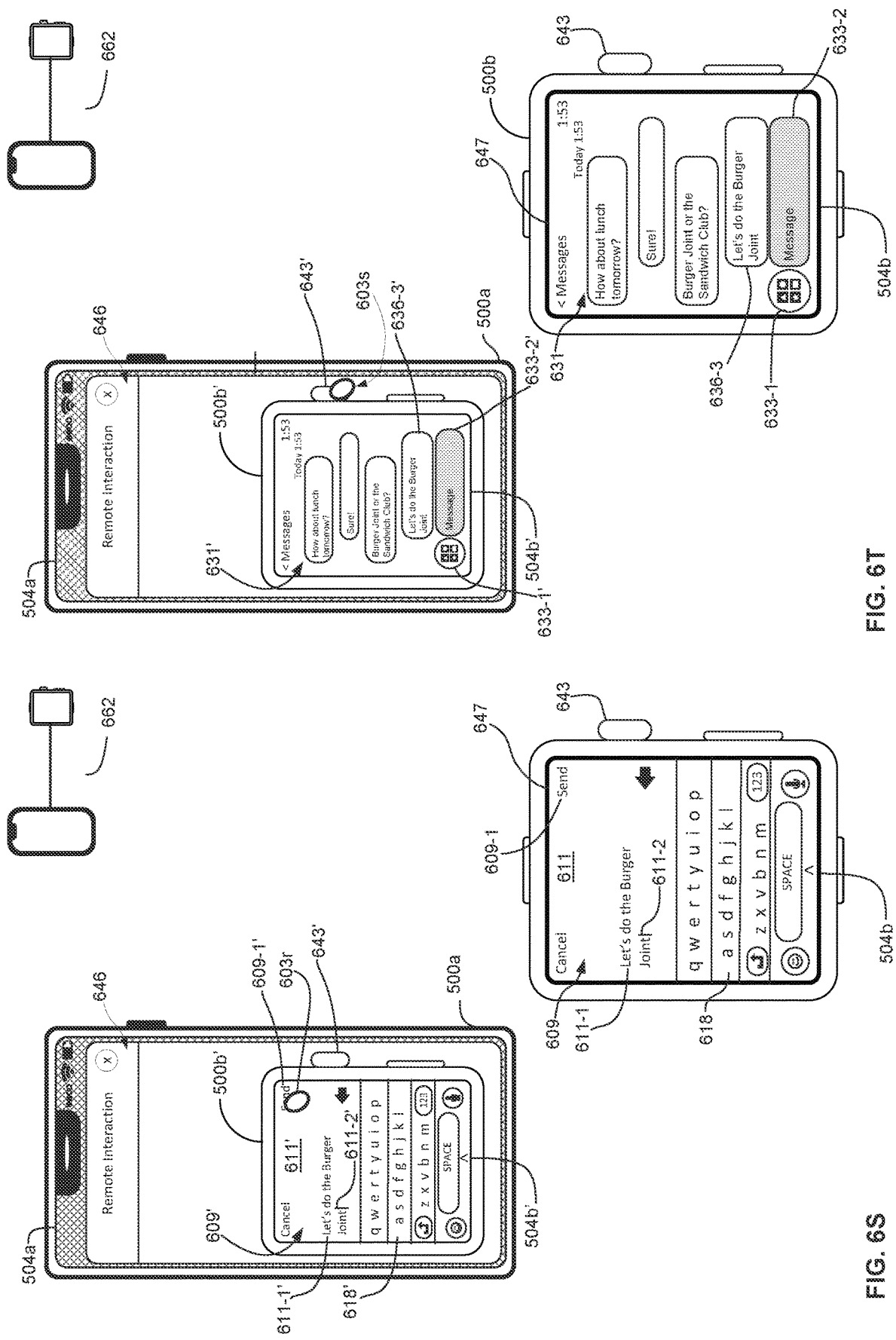

SYSTEMS AND METHODS FOR REMOTE INTERACTION BETWEEN ELECTRONIC DEVICES

CROSS-REFERENCE TO RELATED APPLICATIONS

This application claims the benefit of U.S. Provisional Application No. 63/364,879, filed May 17, 2022, the contents of which are incorporated herein by reference in its entirety for all purposes.

FIELD OF THE DISCLOSURE

This relates generally to electronic devices that present user interfaces that change or update while in a remote interaction mode, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to control the content presented by a first electronic device by interacting with an image of the content on a second electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to a first electronic device that operates in a remote interaction mode with a second electronic device, where user interactions with images displayed on the first electronic device cause the second electronic device to update display of the images on the second electronic device. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

DETAILED DESCRIPTION

Figure 1A:
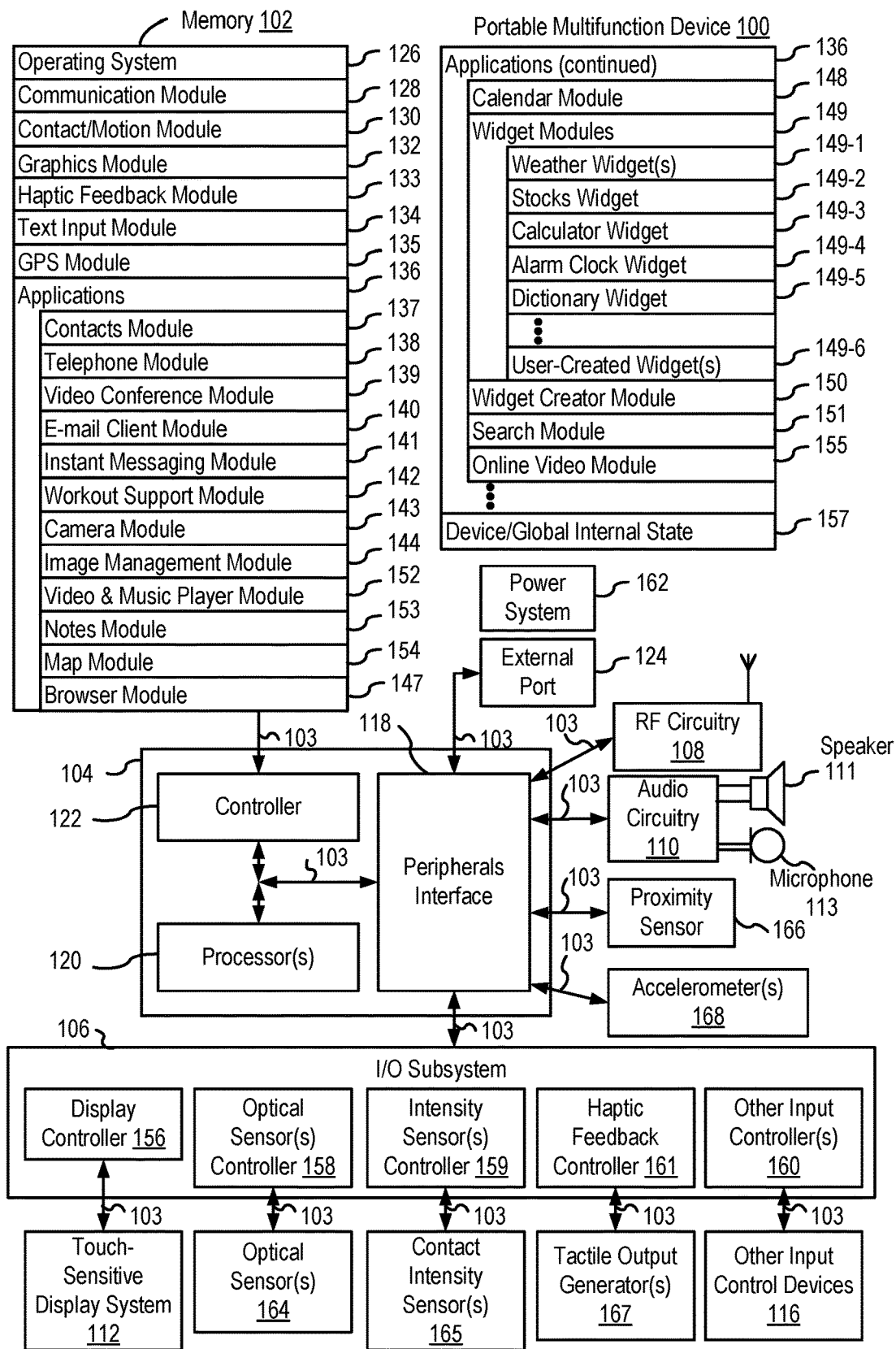
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that enable the user to control the presentation of images on a second device in response to user input received at a first device while the first device and the second device are communicatively linked. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (B TLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
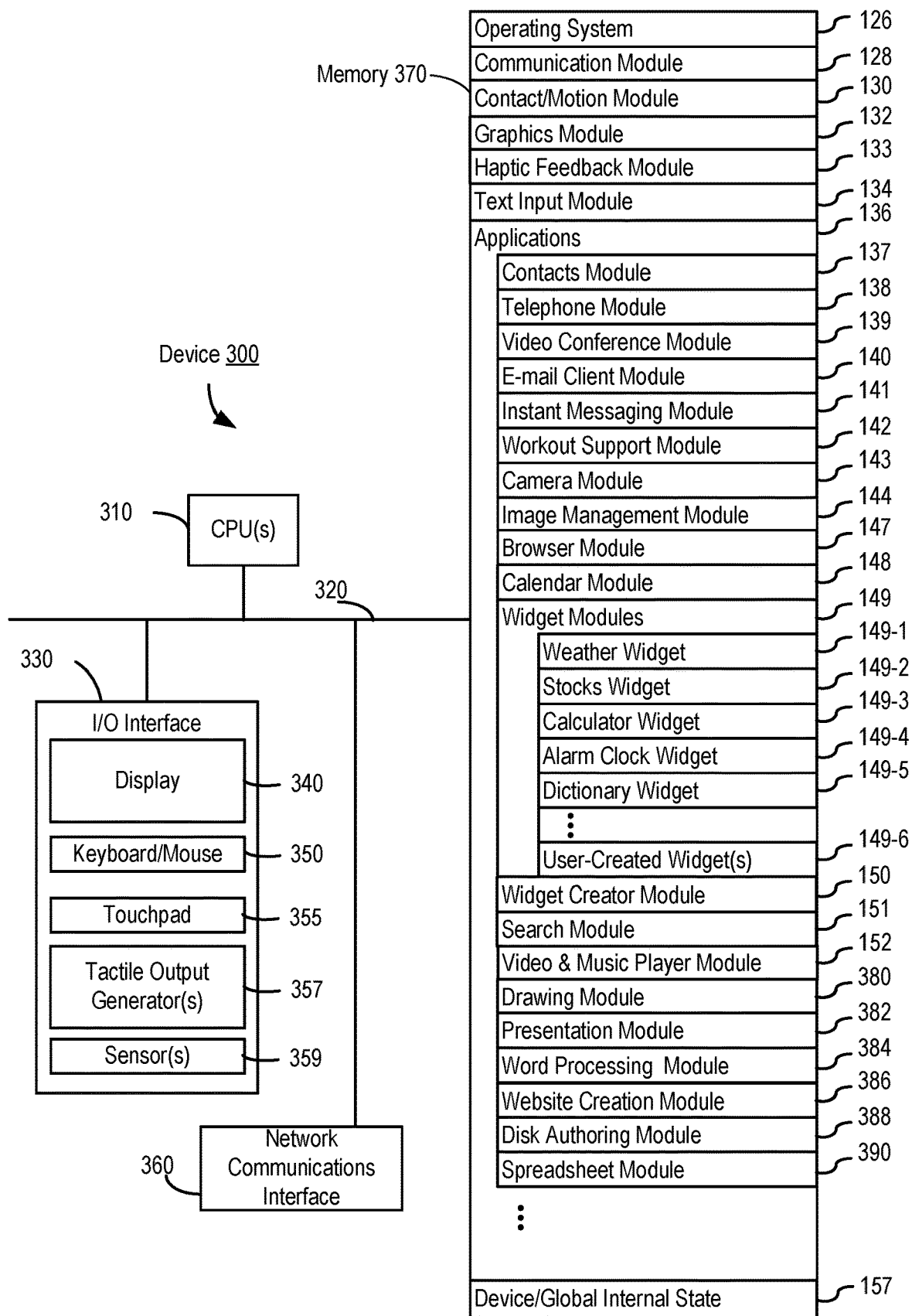
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
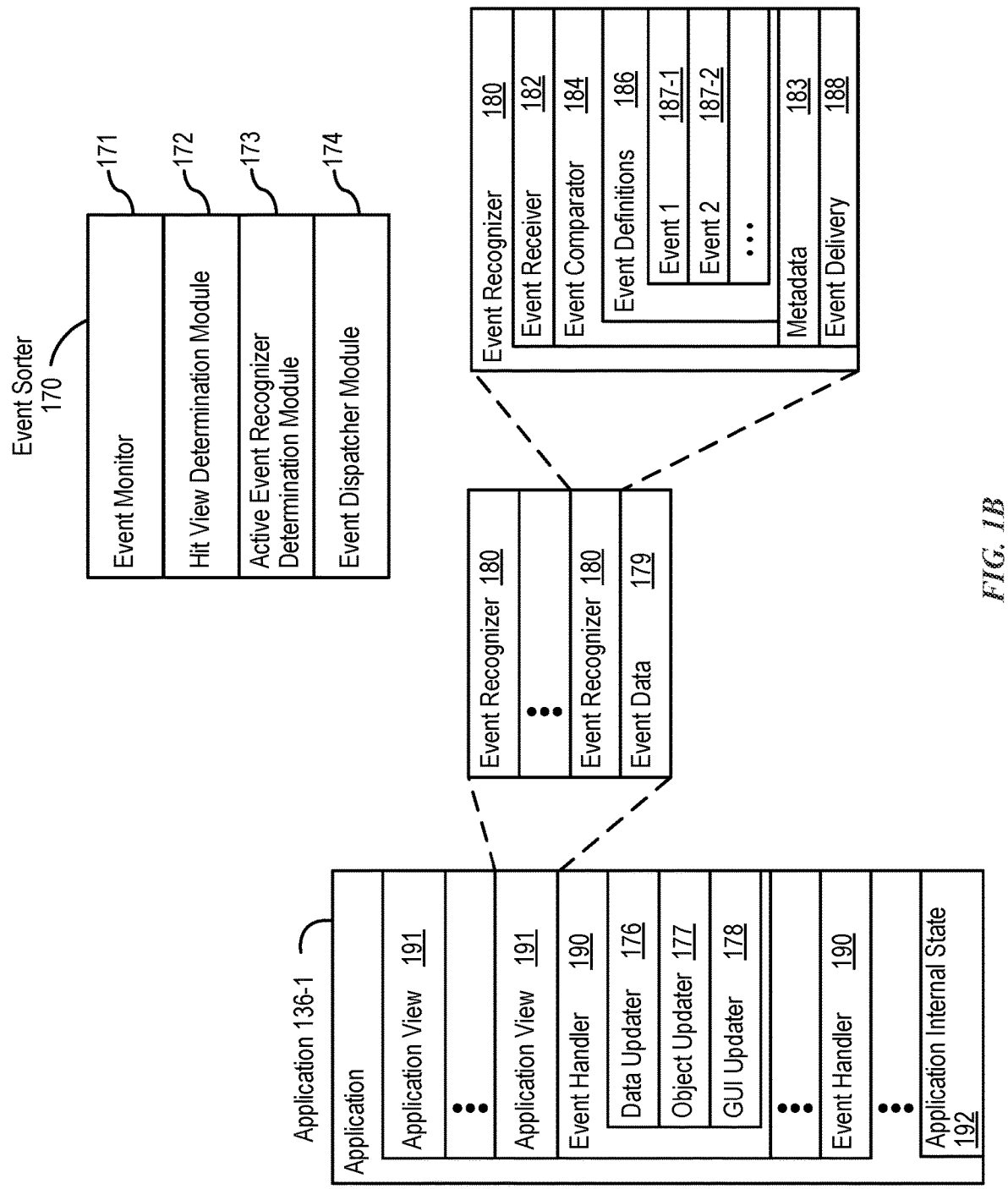
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
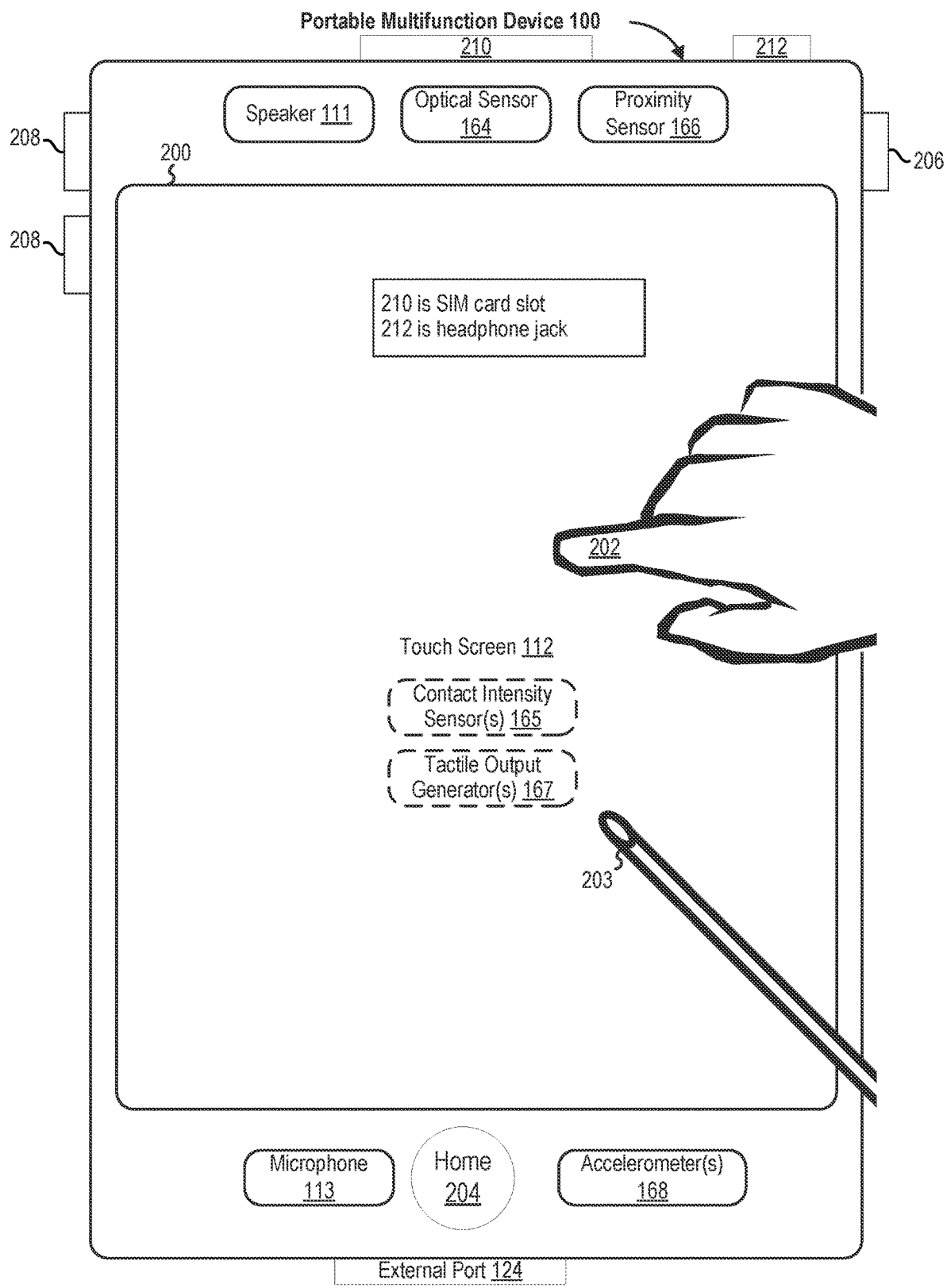
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG.

1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
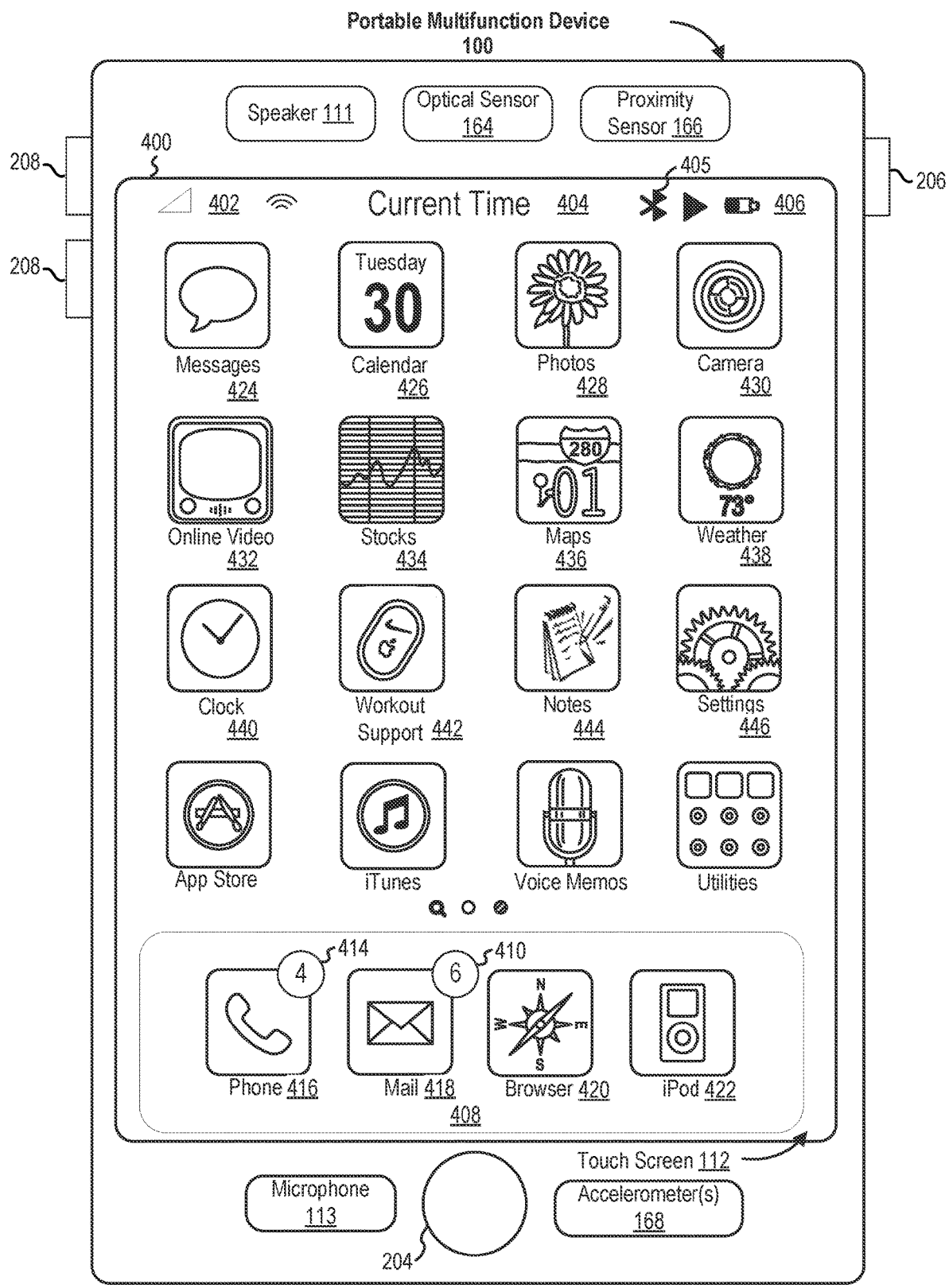
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
　Icon 416 for telephone module 138, labeled "Phone," which optionally includes an indicator 414 of the number of missed calls or voicemail messages;
　Icon 418 for e-mail client module 140, labeled "Mail," which optionally includes an indicator 410 of the number of unread e-mails;
　Icon 420 for browser module 147, labeled "Browser;" and
　Icon 422 for video and music player module 152, also referred to as iPod (trademark of Apple Inc.) module 152, labeled "iPod;" and
Icons for other applications, such as:
　Icon 424 for IM module 141, labeled "Messages;"
　Icon 426 for calendar module 148, labeled "Calendar;"
　Icon 428 for image management module 144, labeled "Photos;"
　Icon 430 for camera module 143, labeled "Camera;"
　Icon 432 for online video module 155, labeled "Online Video;"
　Icon 434 for stocks widget 149-2, labeled "Stocks;"
　Icon 436 for map module 154, labeled "Maps;"
　Icon 438 for weather widget 149-1, labeled "Weather;"
　Icon 440 for alarm clock widget 149-4, labeled "Clock;"
　Icon 442 for workout support module 142, labeled "Workout Support;"
　Icon 444 for notes module 153, labeled "Notes;" and
　Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
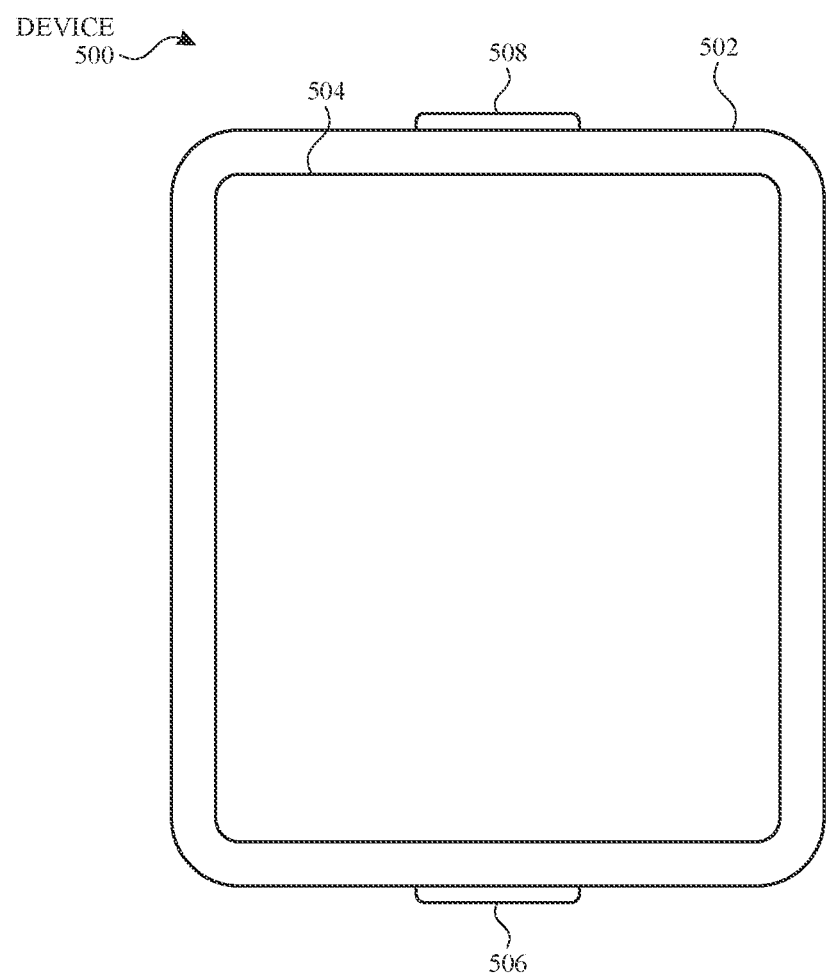
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
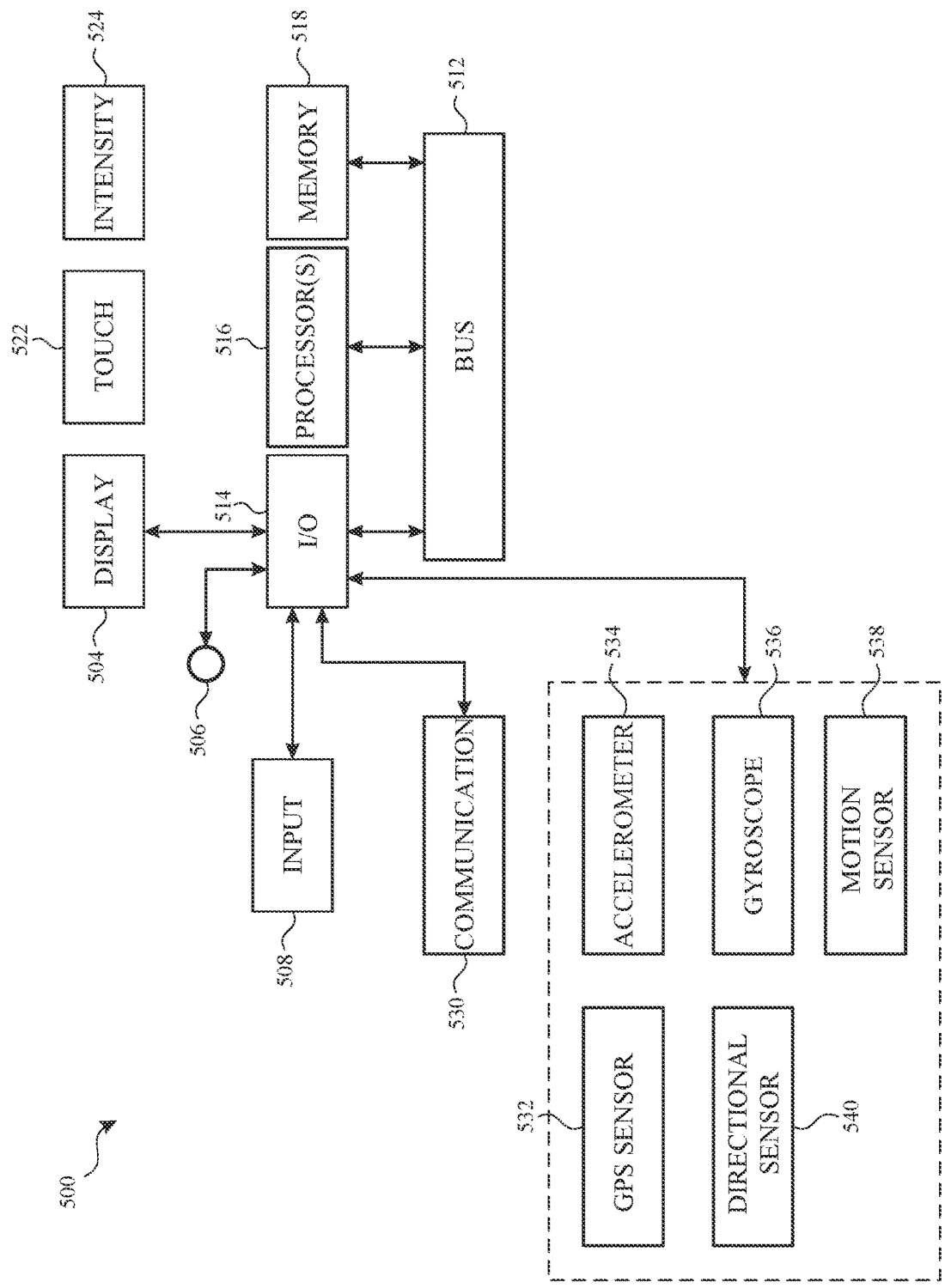
FIG. 5B is a block diagram illustrating a personal electronic device in accordance with some embodiments.
Figure 51:
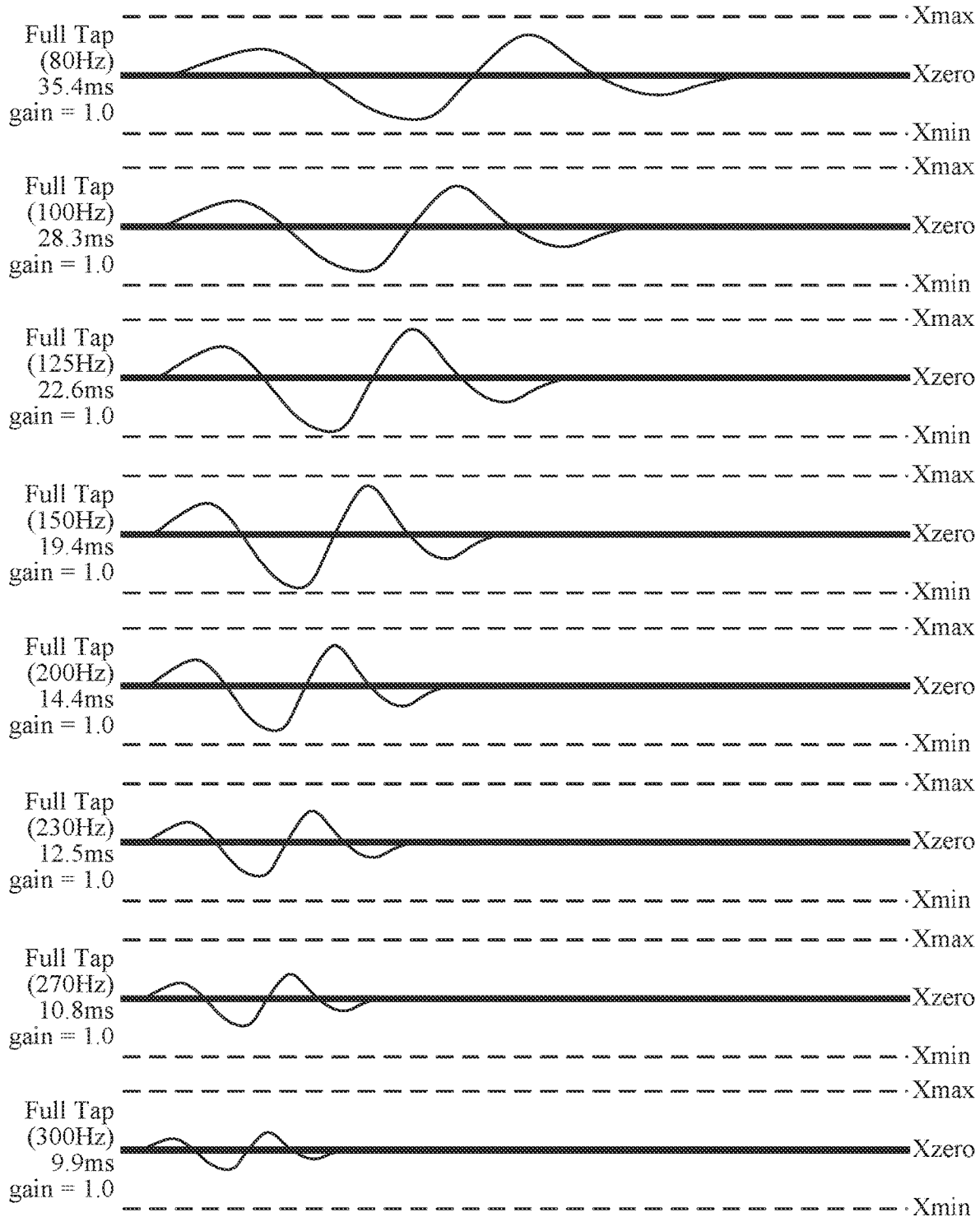

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
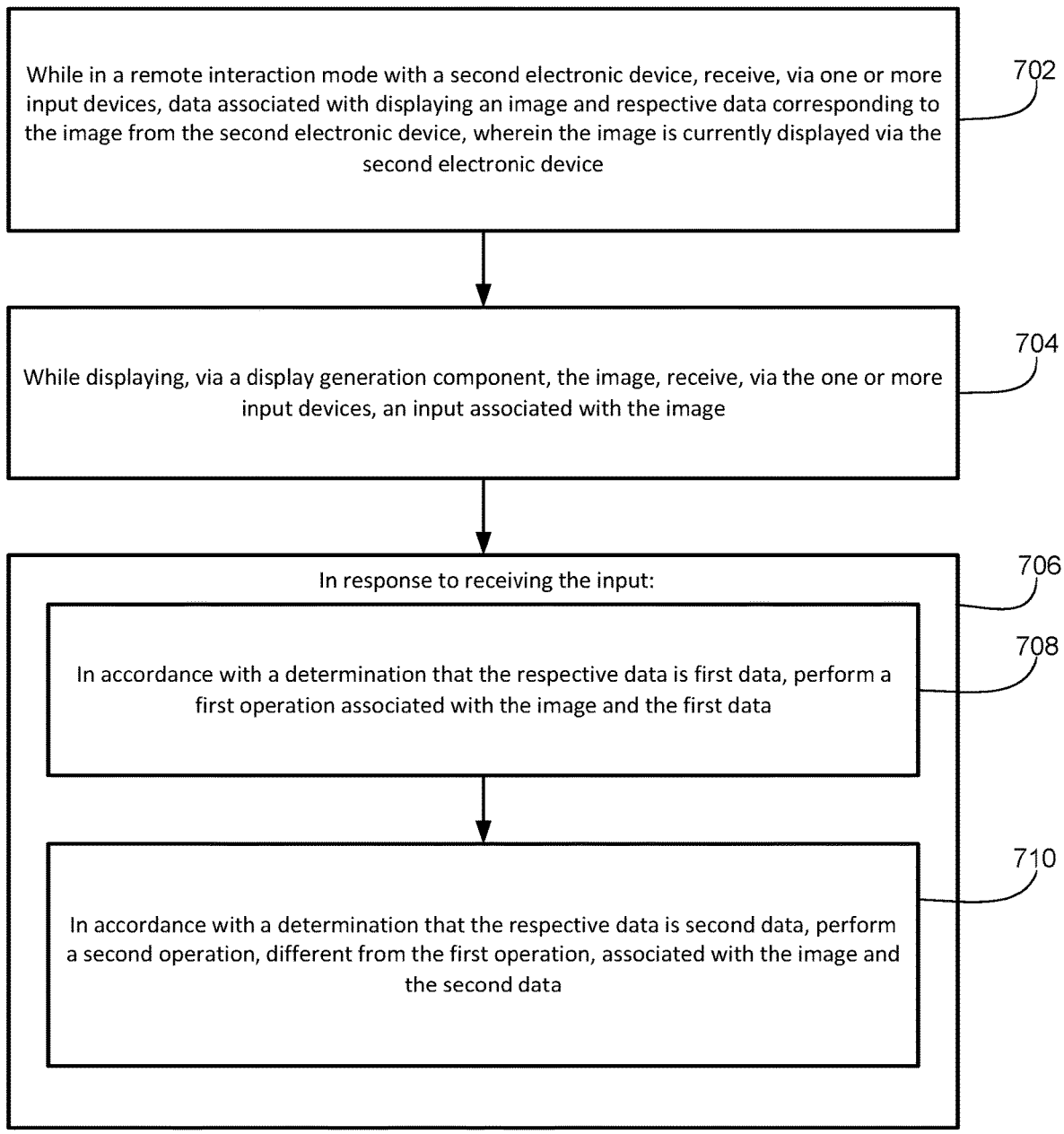
FIG. 7 is a flow diagram illustrating a method of facilitating interactions between a first electronic device and a second electronic device in a remote interaction mode in accordance with some embodiments of the disclosure.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
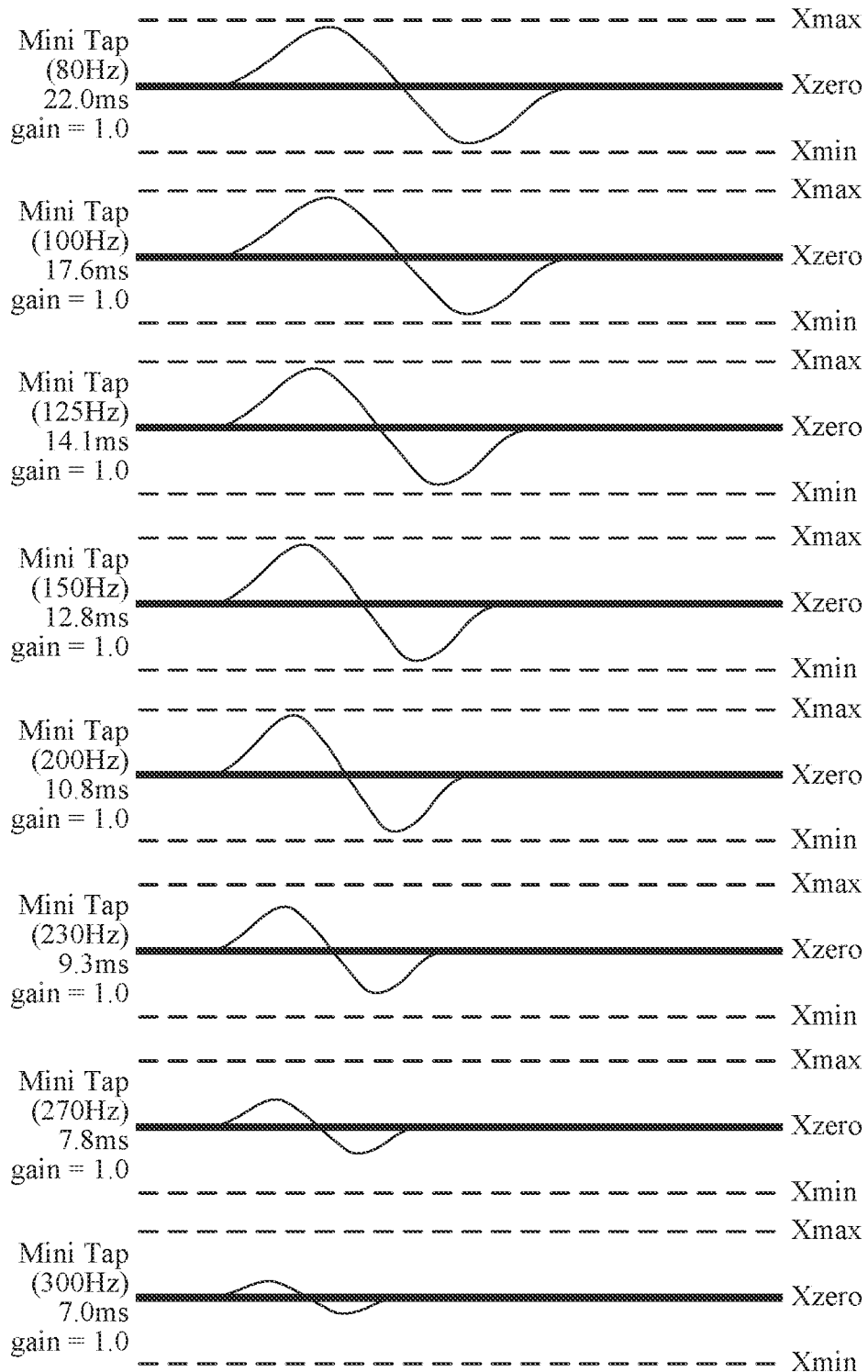
Figure 5K:
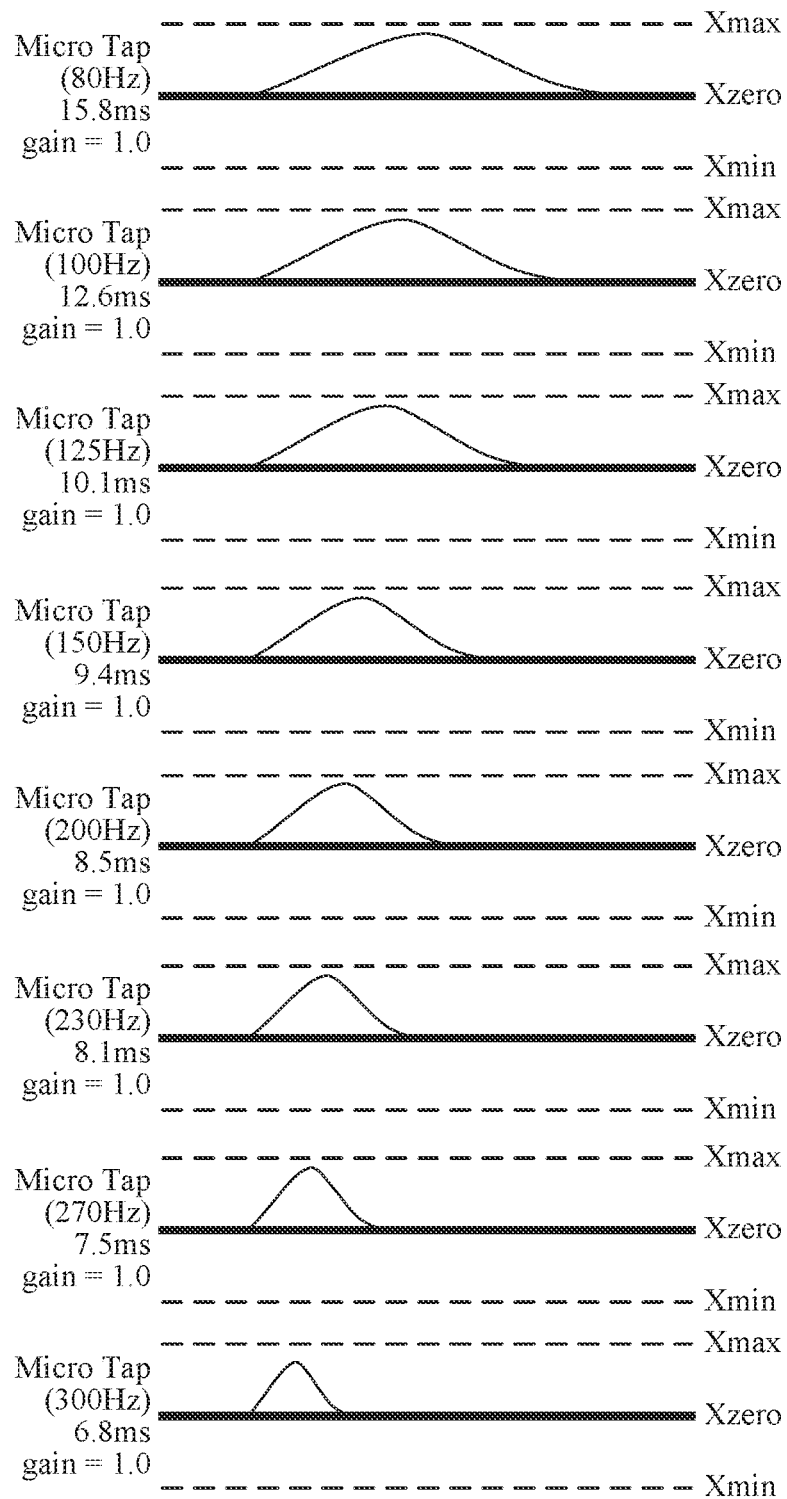
Figure 5L:
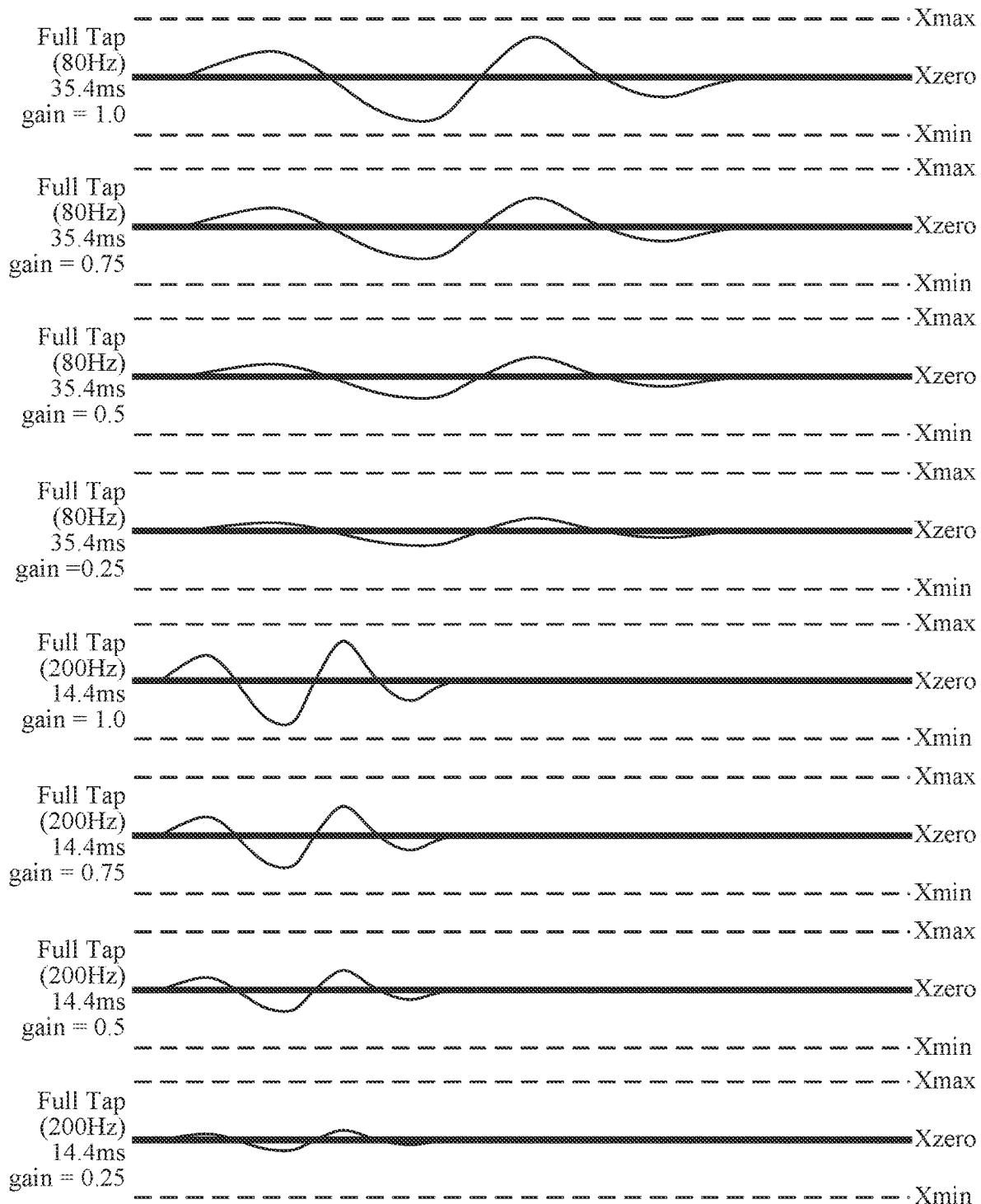
Figure 5M:
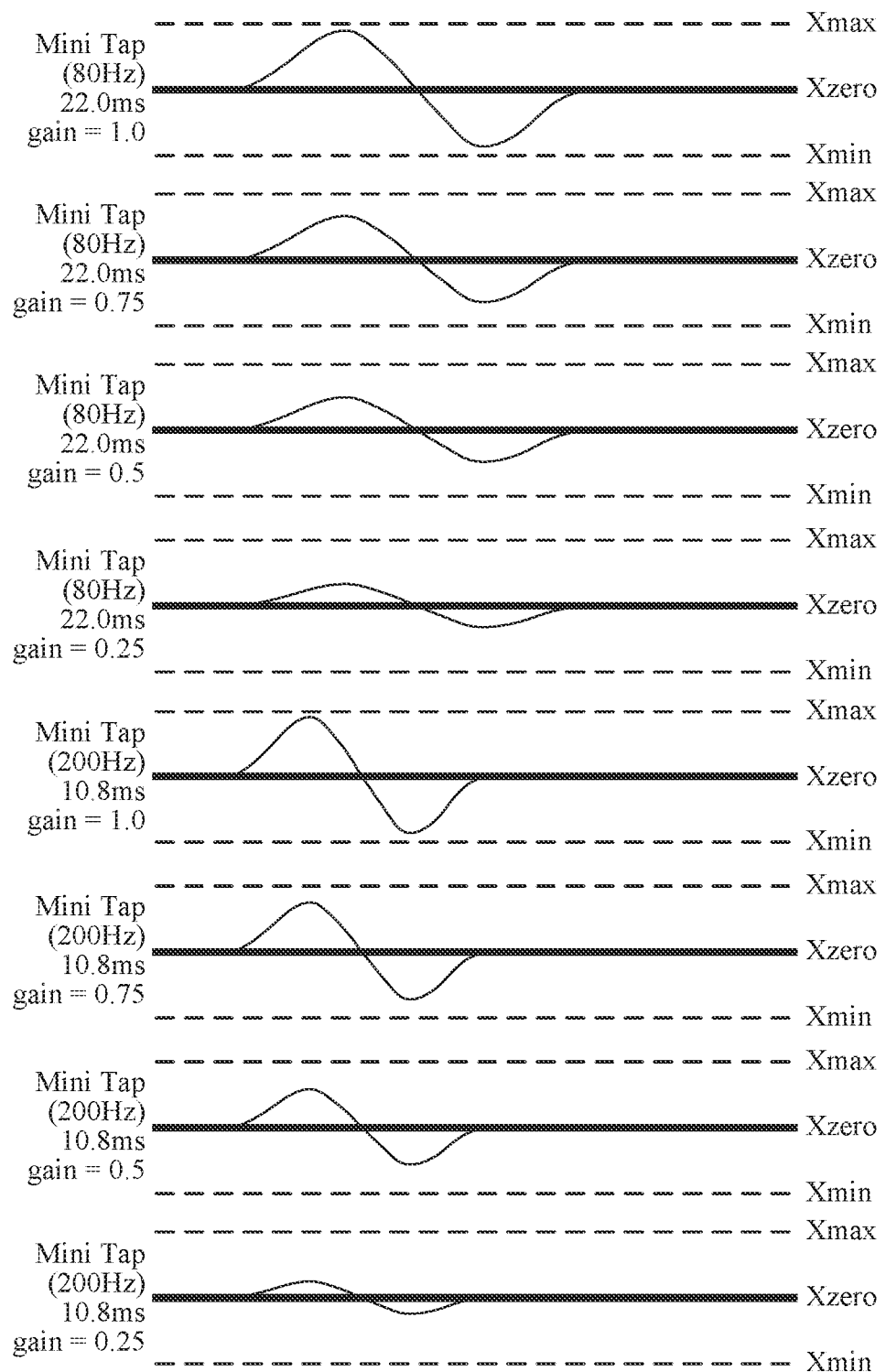
Figure 5N:
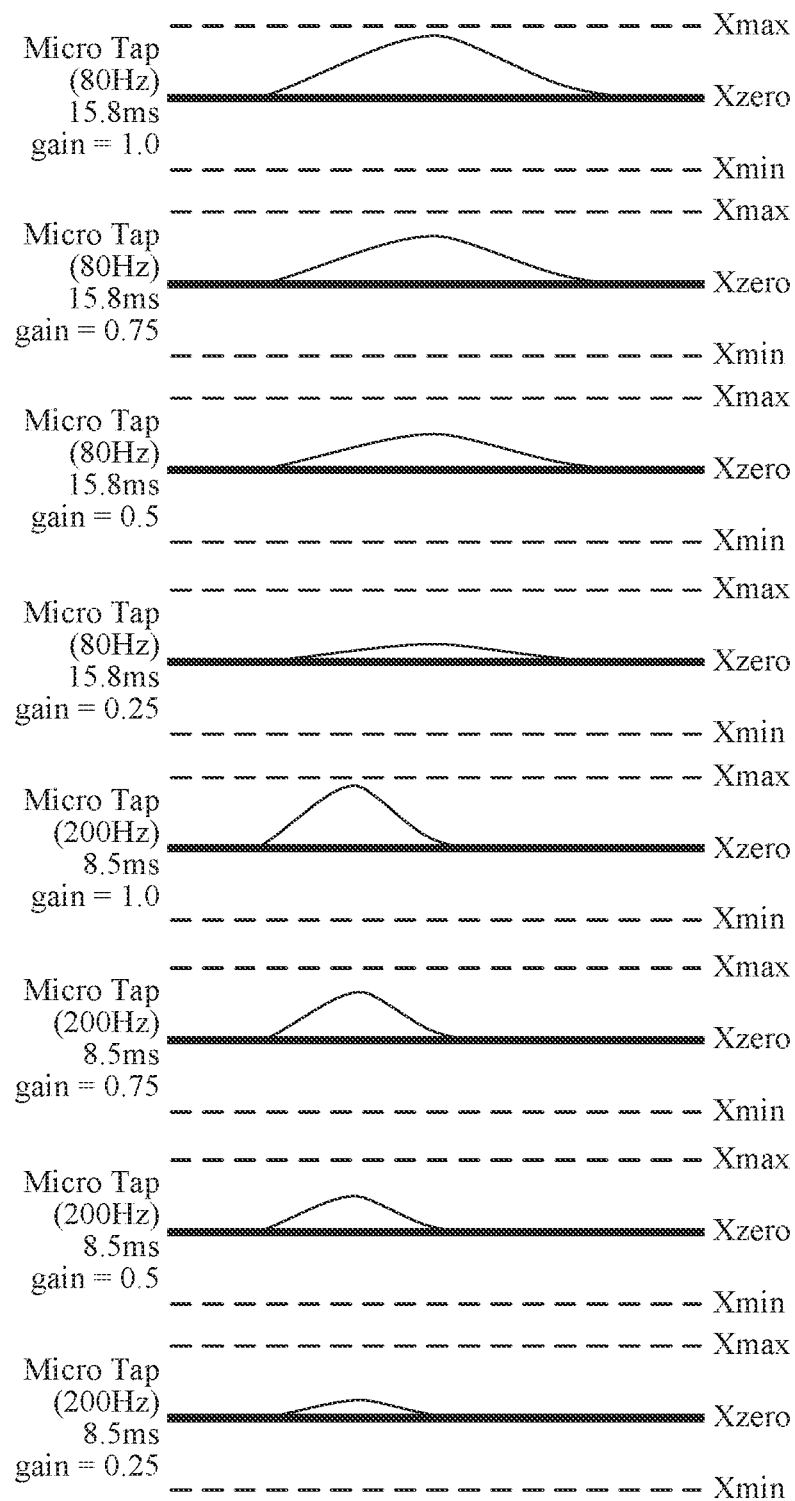

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5I-5K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Interactions with Content in a Remote Interaction Mode

Users interact with electronic devices in many different manners, including interacting with selectable options presented in a user interface. In some embodiments, a first electronic device presents a user interface that includes content that is displayed at a second electronic device while the first electronic device and the second electronic device are in a remote interaction mode. In some embodiments, the electronic device is or includes a computer system. In some embodiments, the computer system is a tablet, mobile phone, laptop, desktop, head-mounted display ("HMD"), device with a mechanical wheelbase, self-propelled device, smart speaker, wearable device, personal assistive device, robot, and/or camera. The embodiments described below provide ways in which the second electronic device updates the user interface in response to detecting user input at the first electronic device while the first electronic device and the second electronic device are in the remote interaction mode. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6GG illustrate exemplary ways in which a first electronic device interacts with a second electronic device in a remote interaction mode in accordance with some embodiments. The embodiments in these figures are used to illustrate the processes described below, including the processes described with reference to FIG. 7.

Figure 6D:
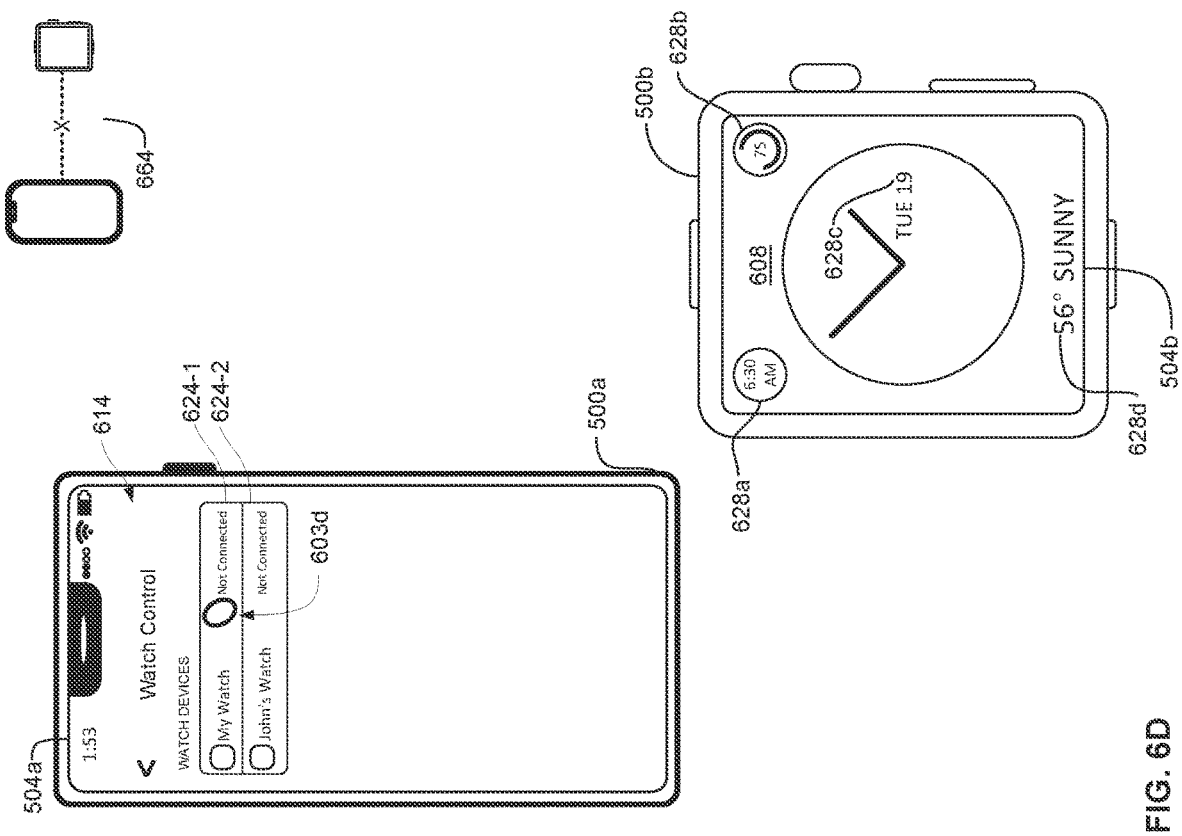
FIGS. 6A-6GG illustrate exemplary ways in which a first electronic device interacts with a second electronic device in a remote interaction mode in accordance with some embodiments.
Figure 6C:
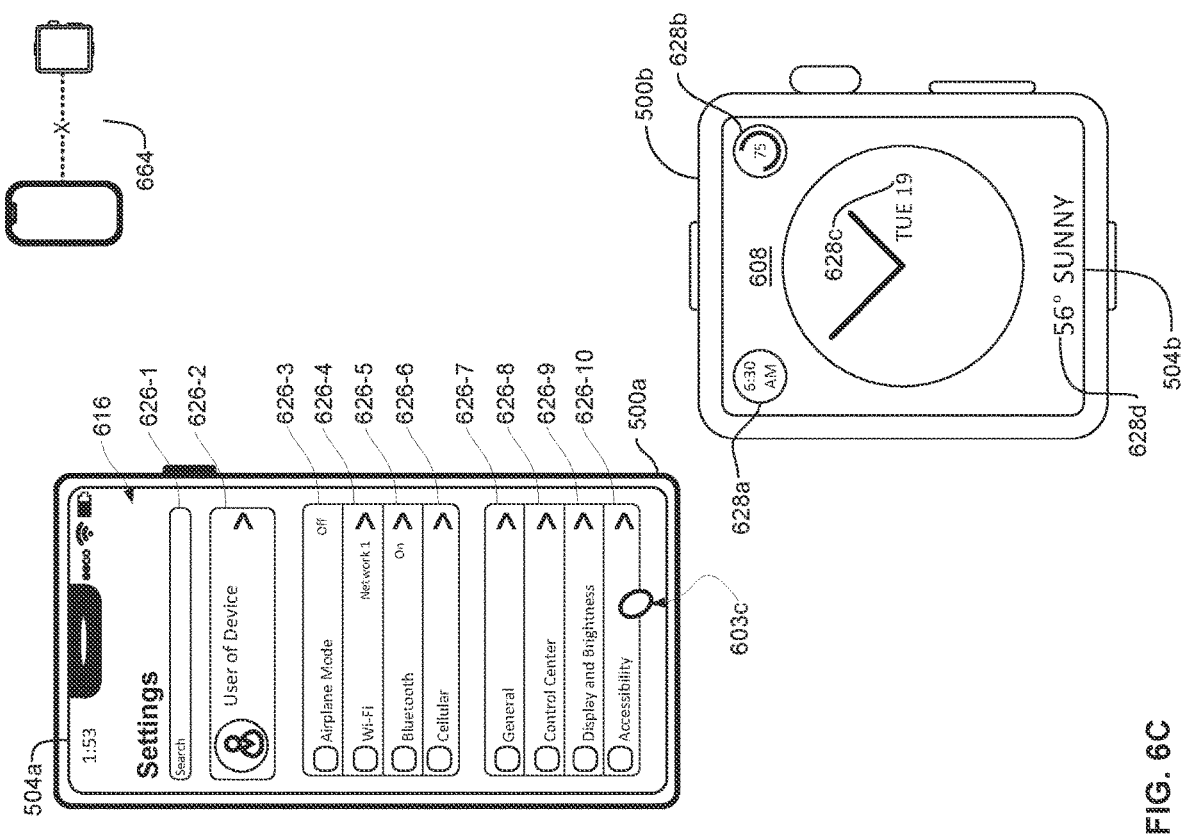
Figure 6F:
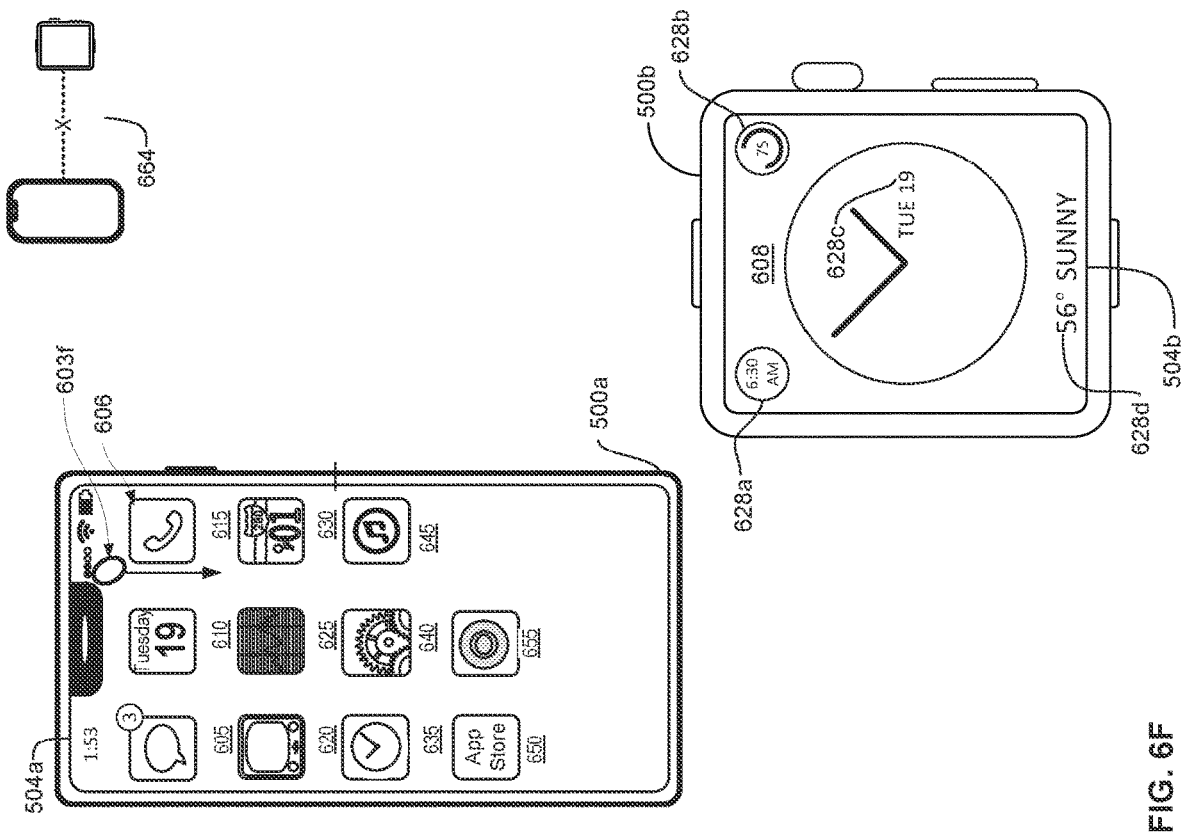
Figure 6E:
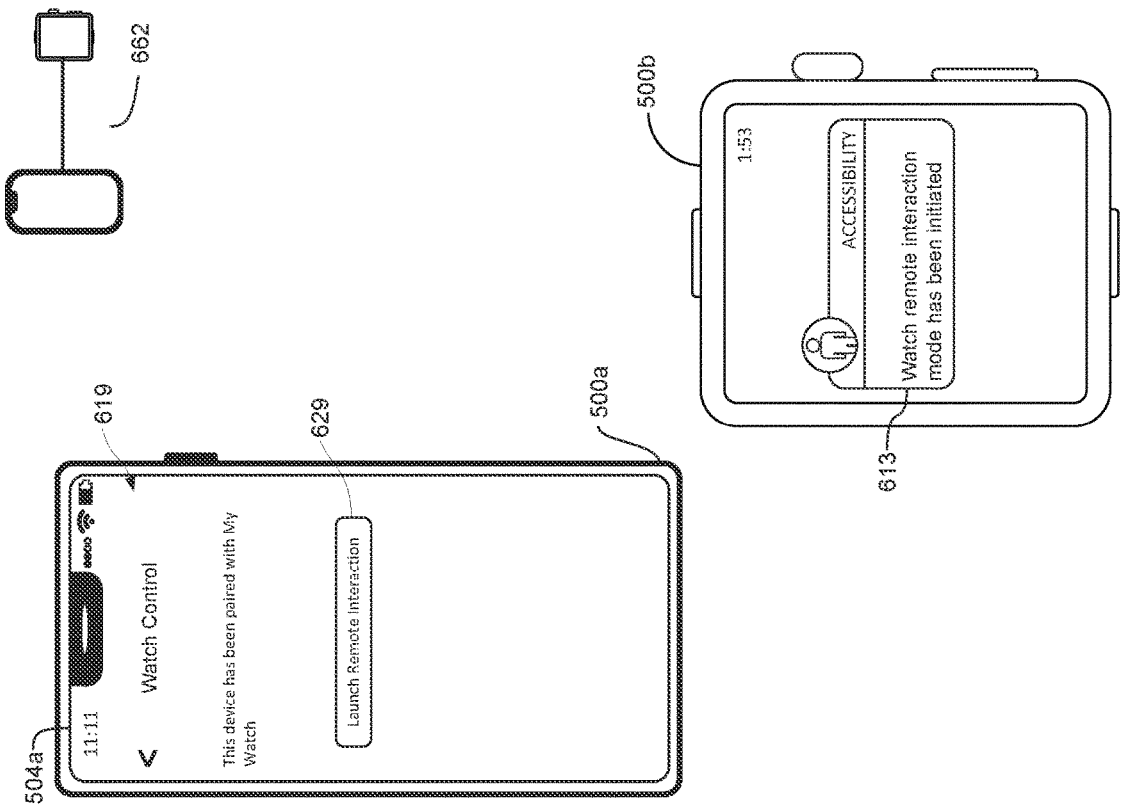
Figure 6H:
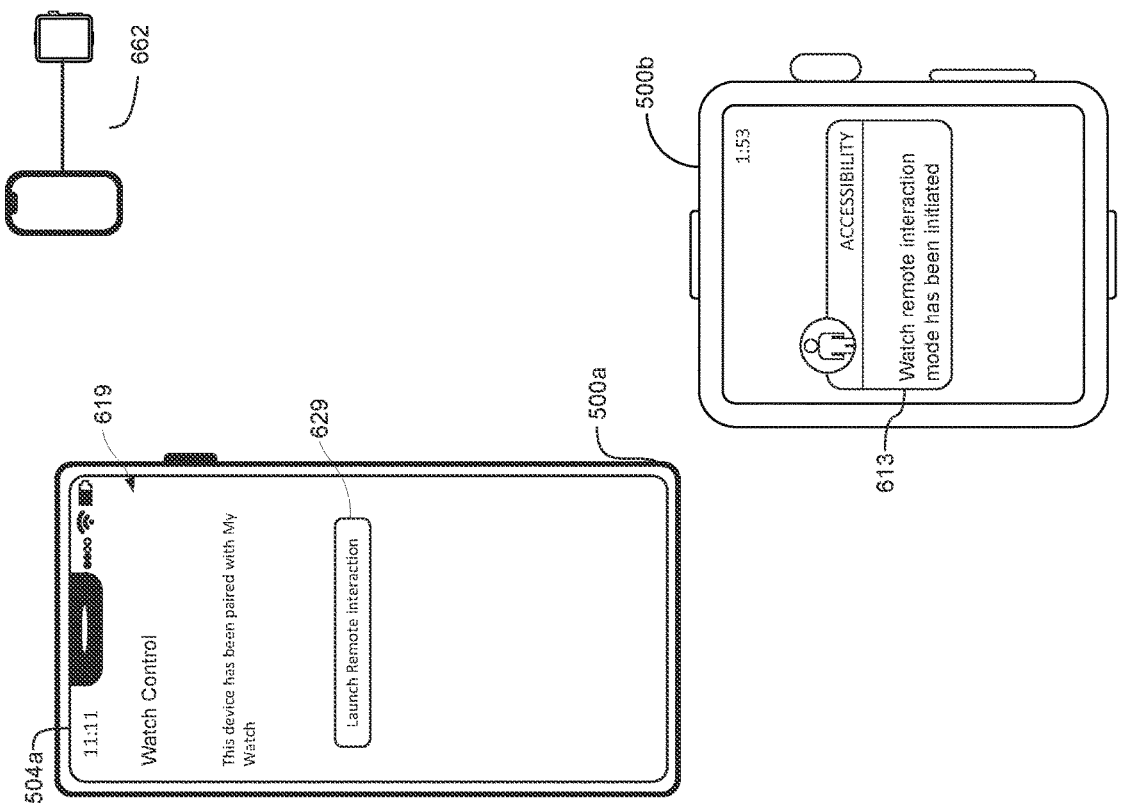
Figure 6G:
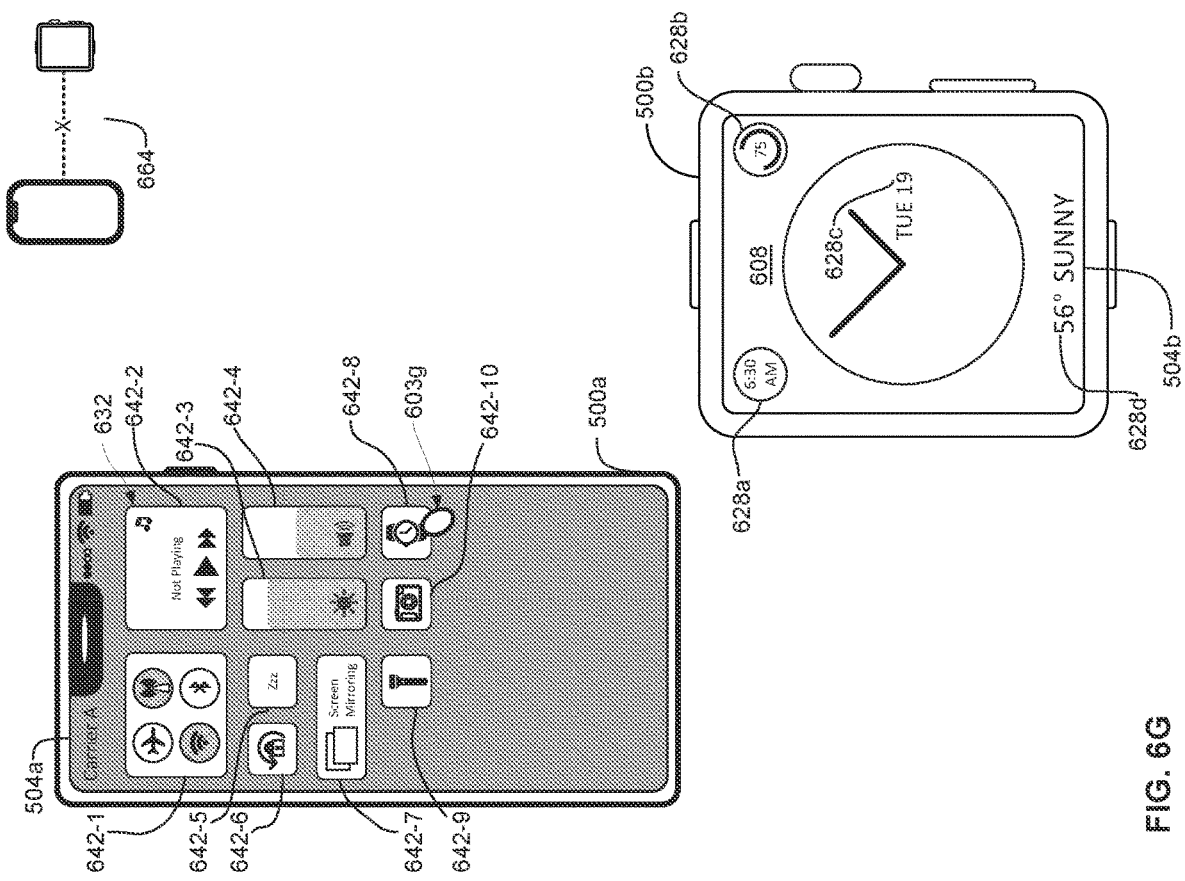
Figure 6J:
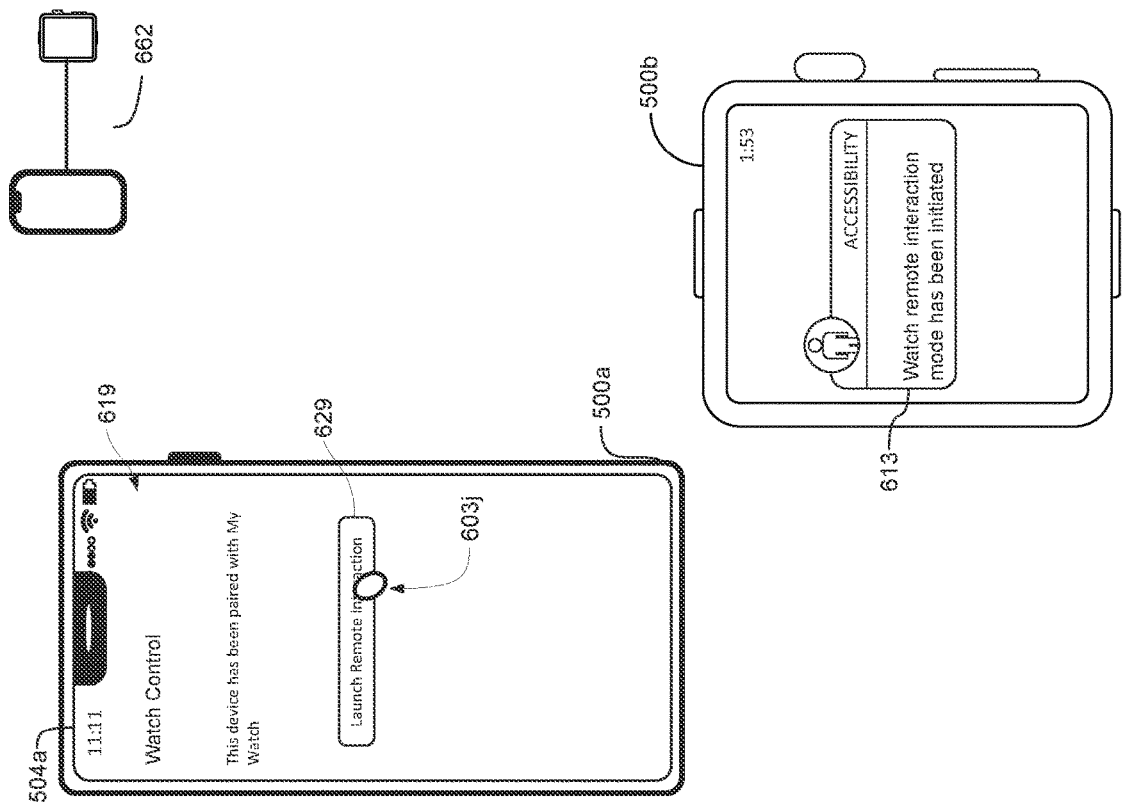
Figure 6I:
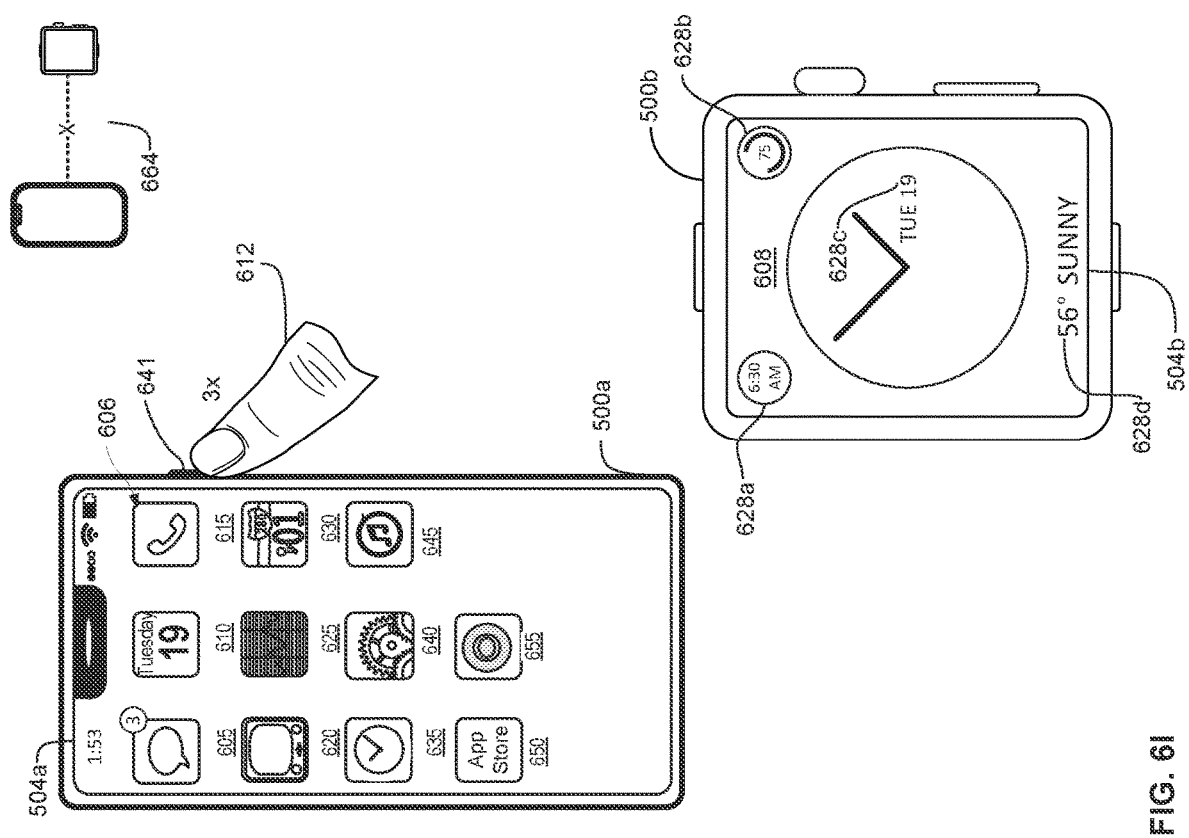
Figure 6L:
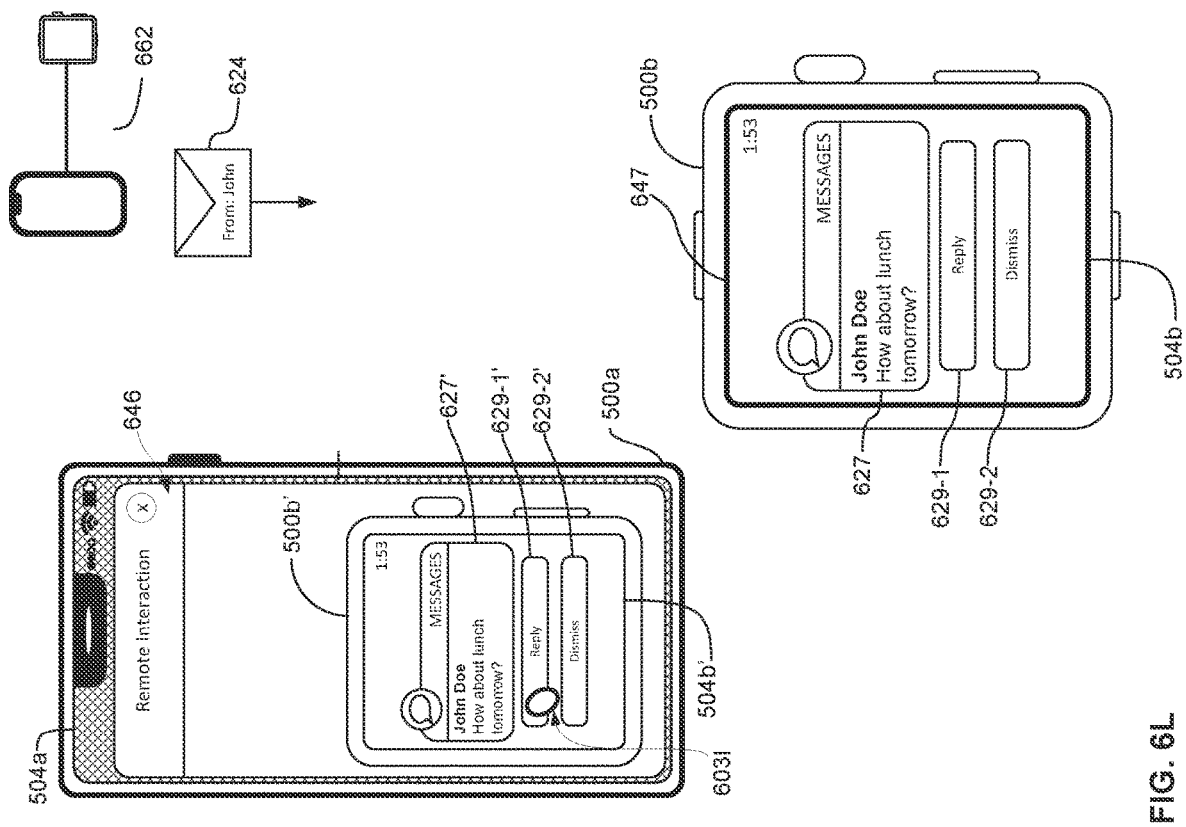
Figure 6K:
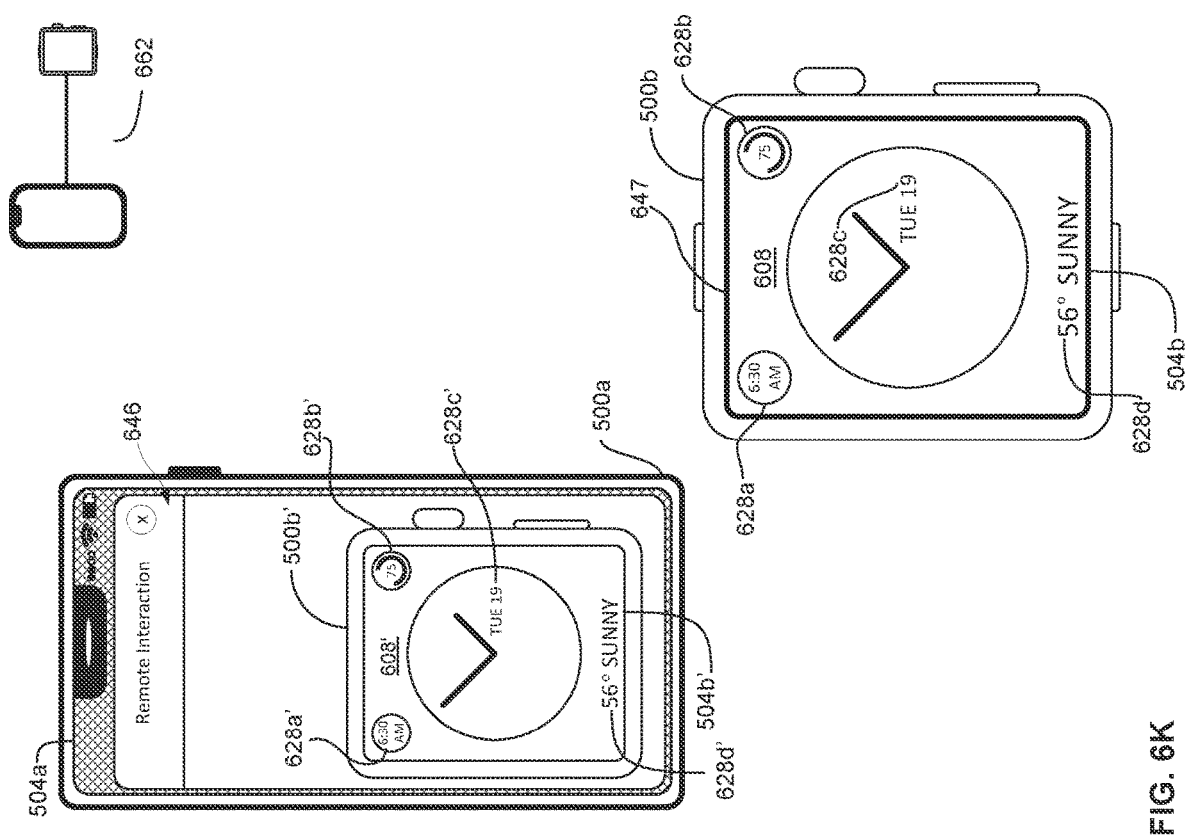
Figure 6R:
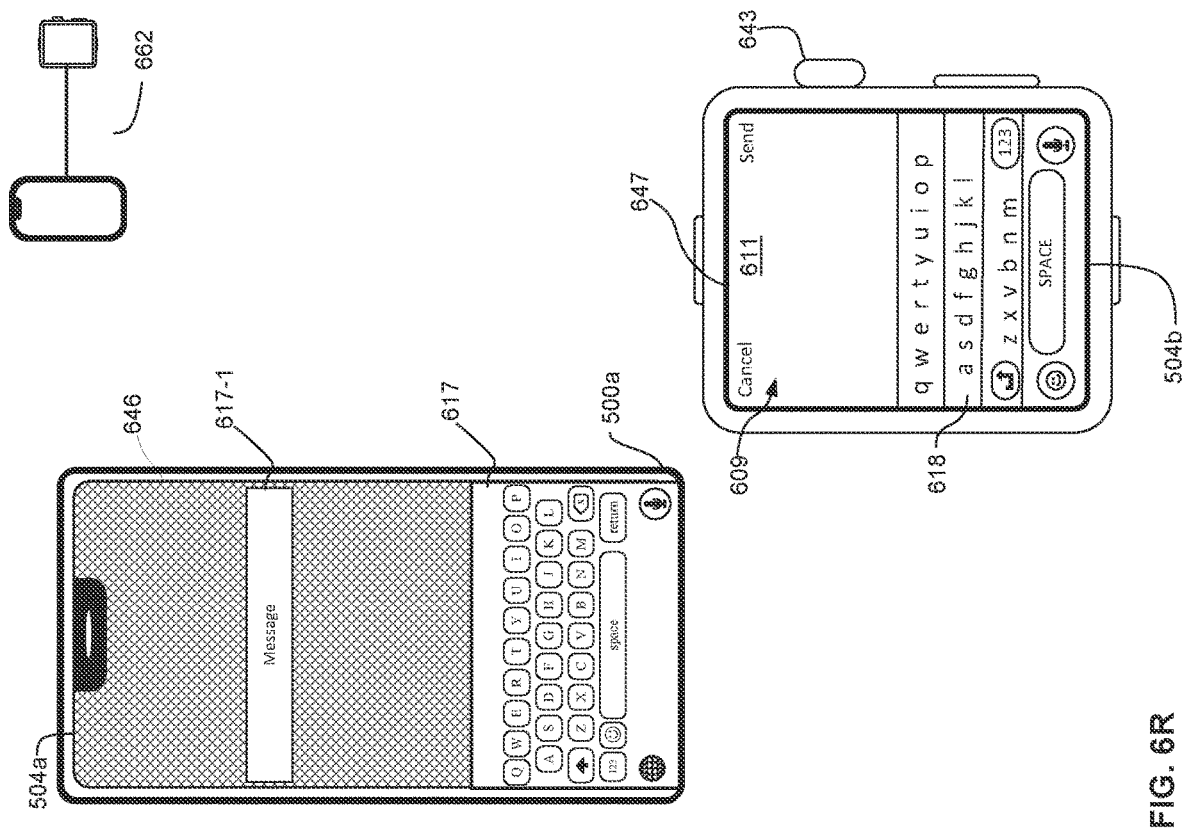
Figure 6Q:
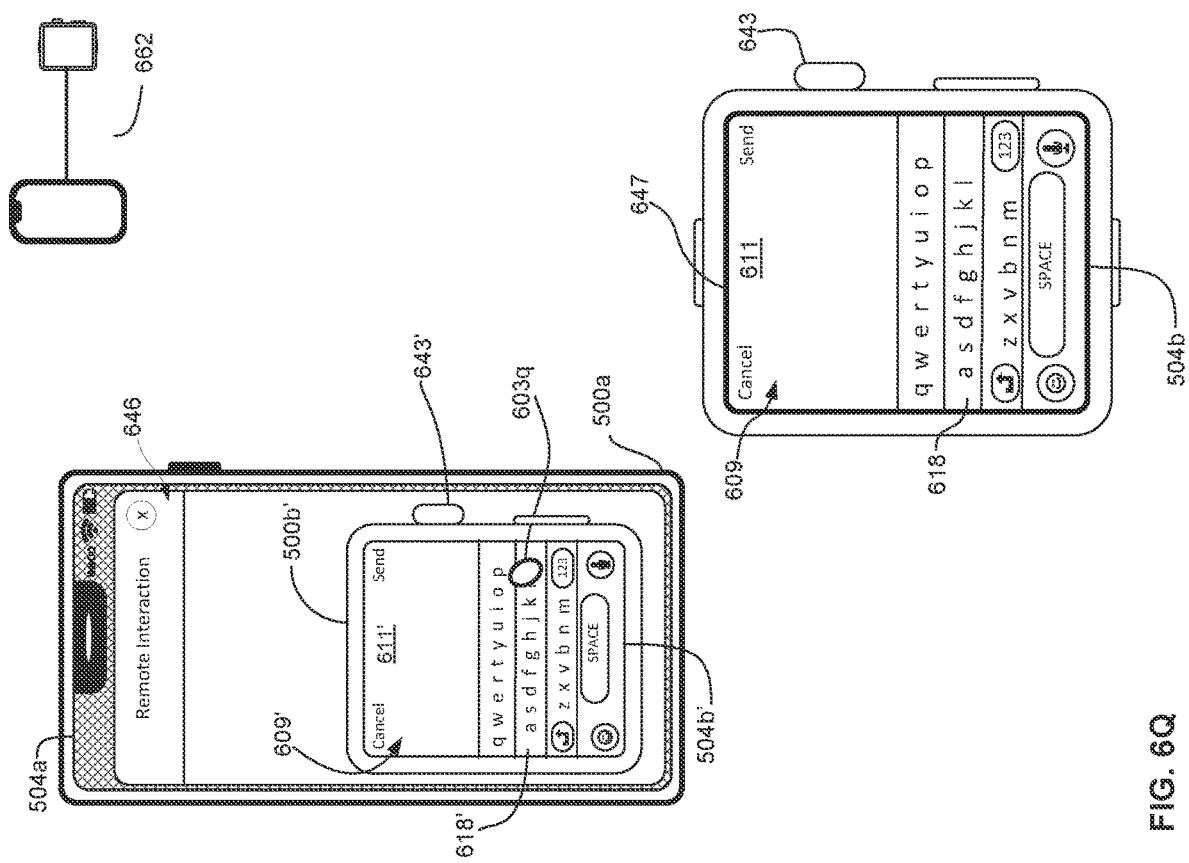
Figure 6V:
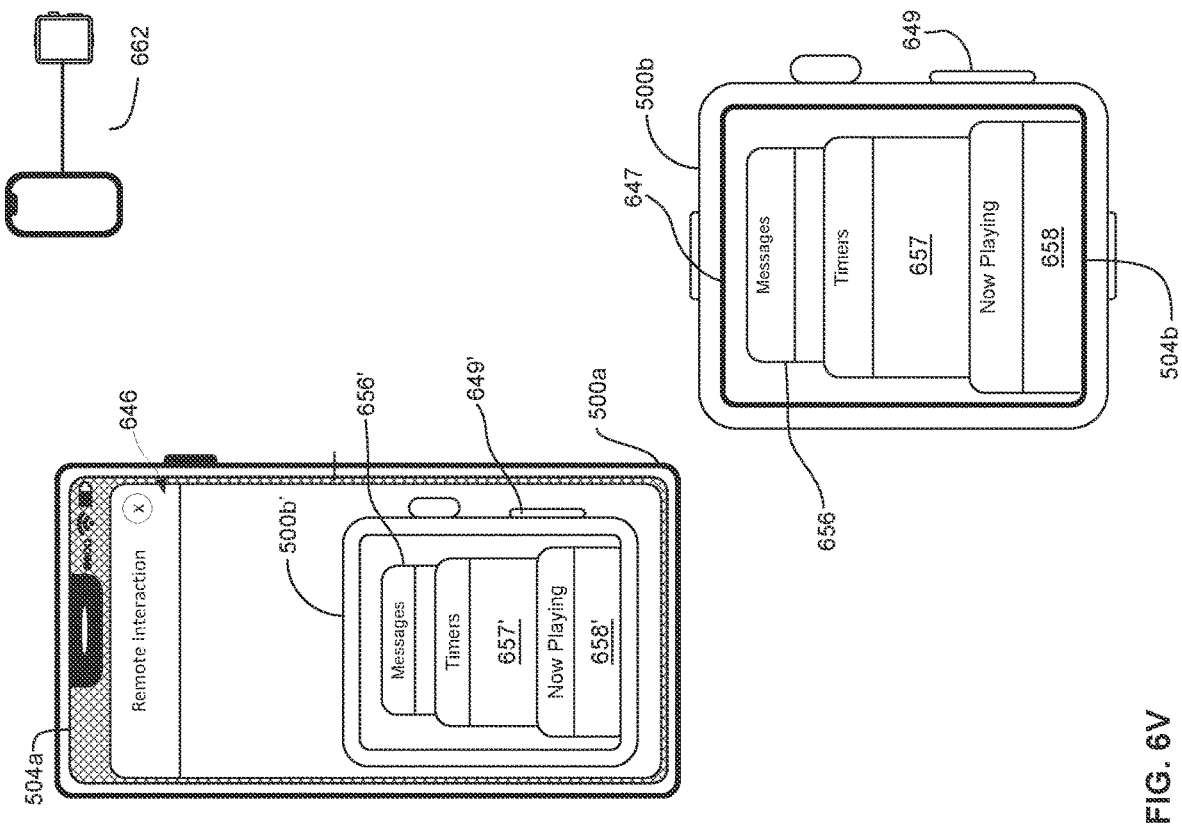
Figure 6U:
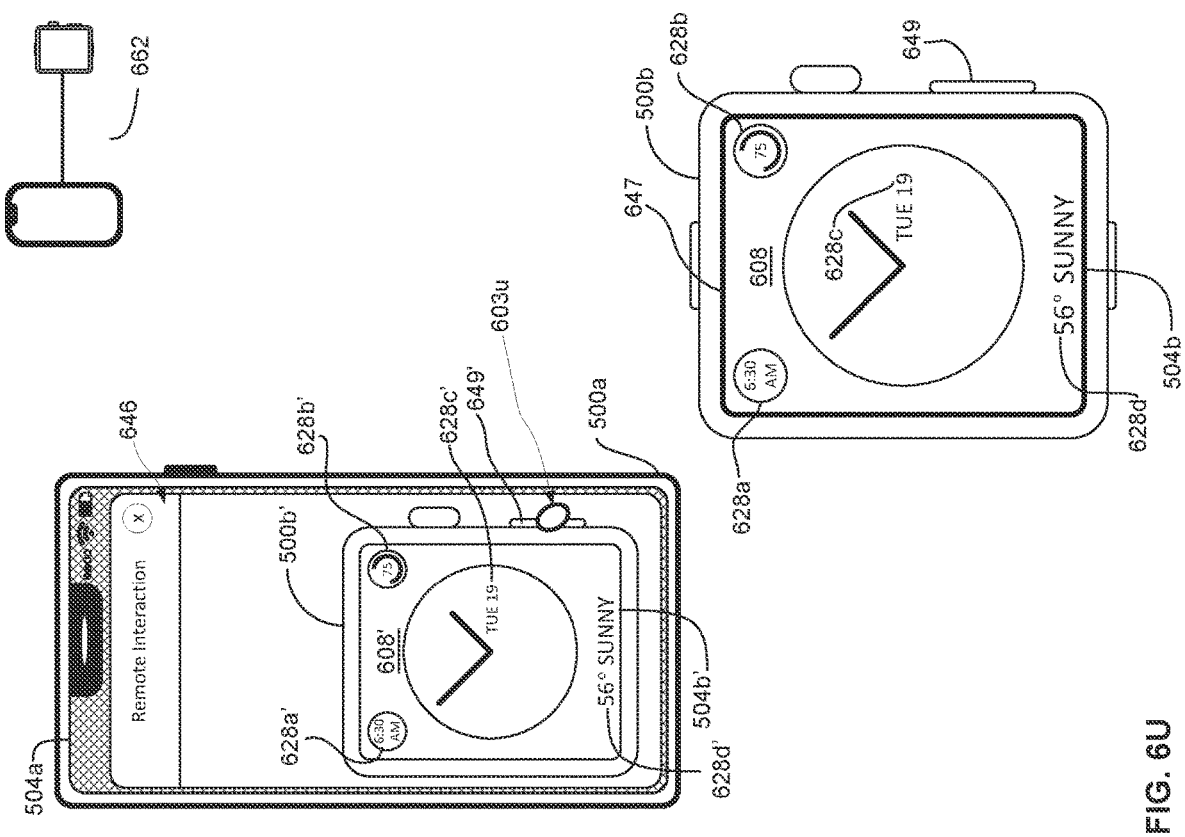
Figure 6X:
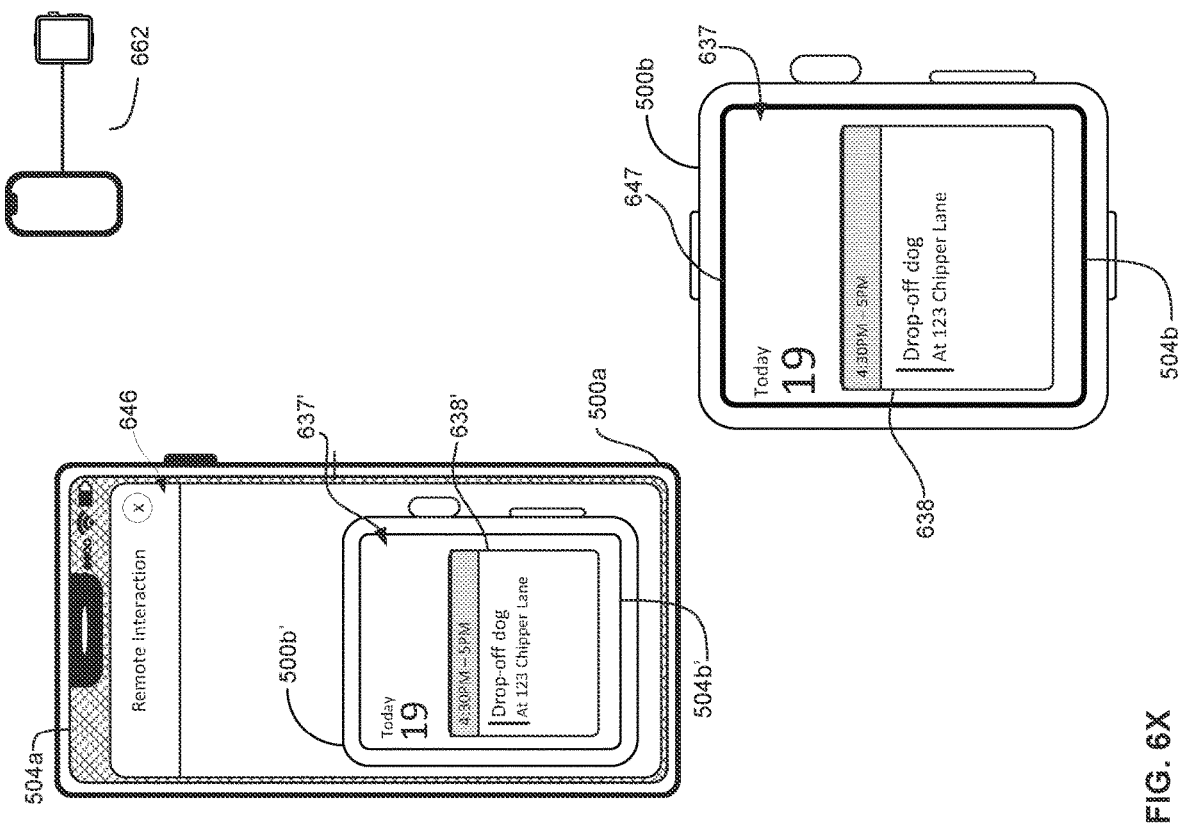
Figure 6W:
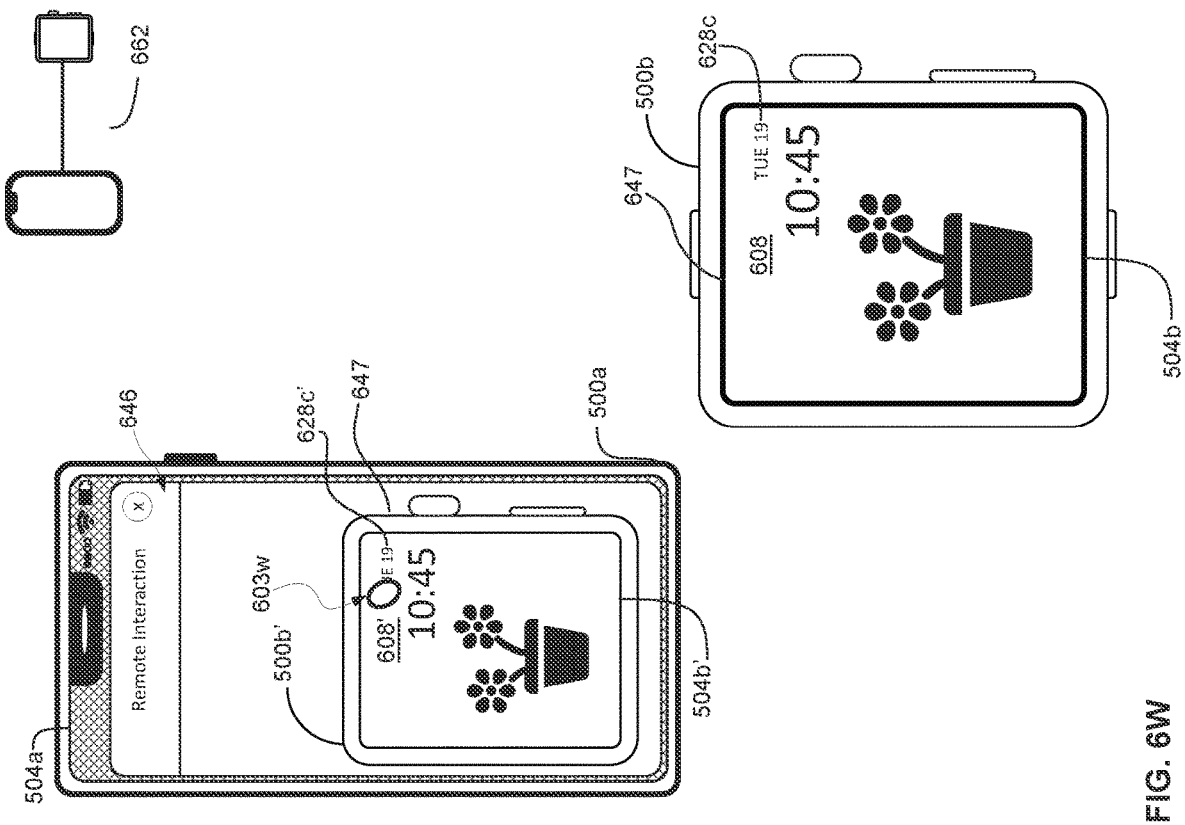
Figure 6Z:
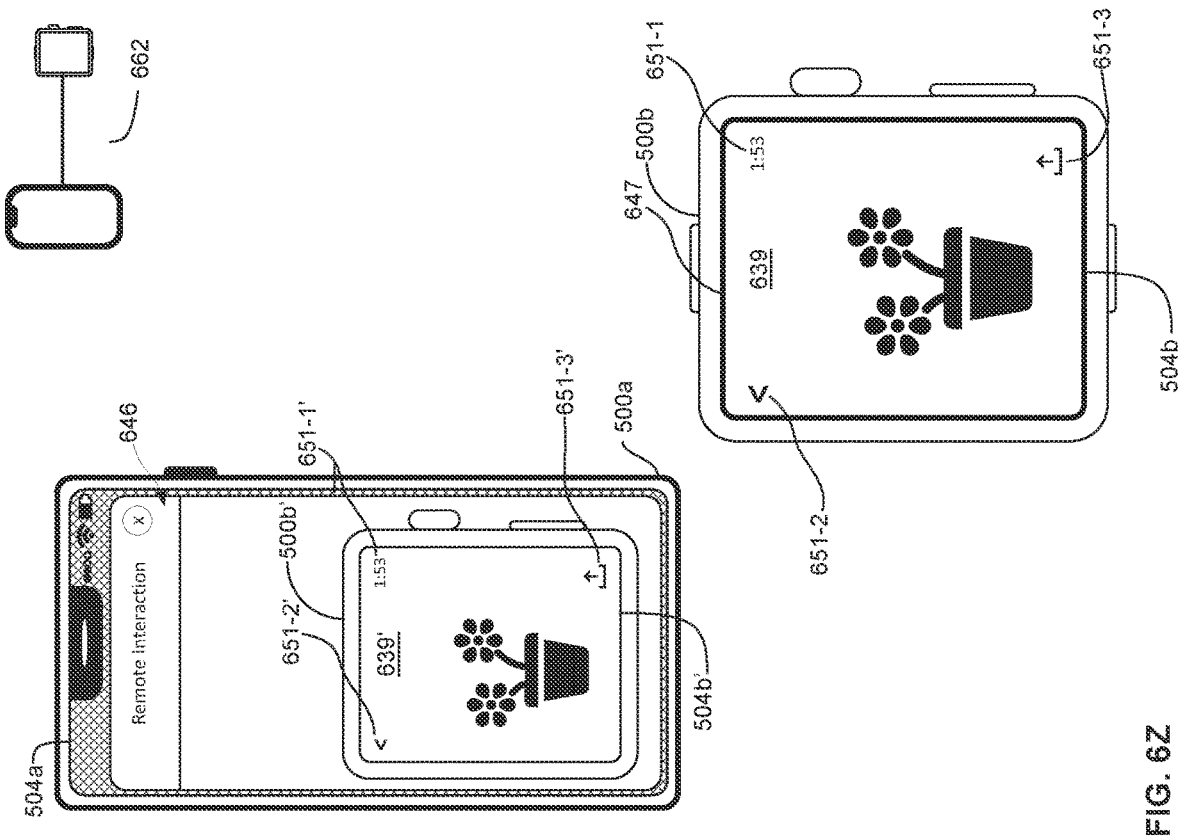
Figure 6Y:
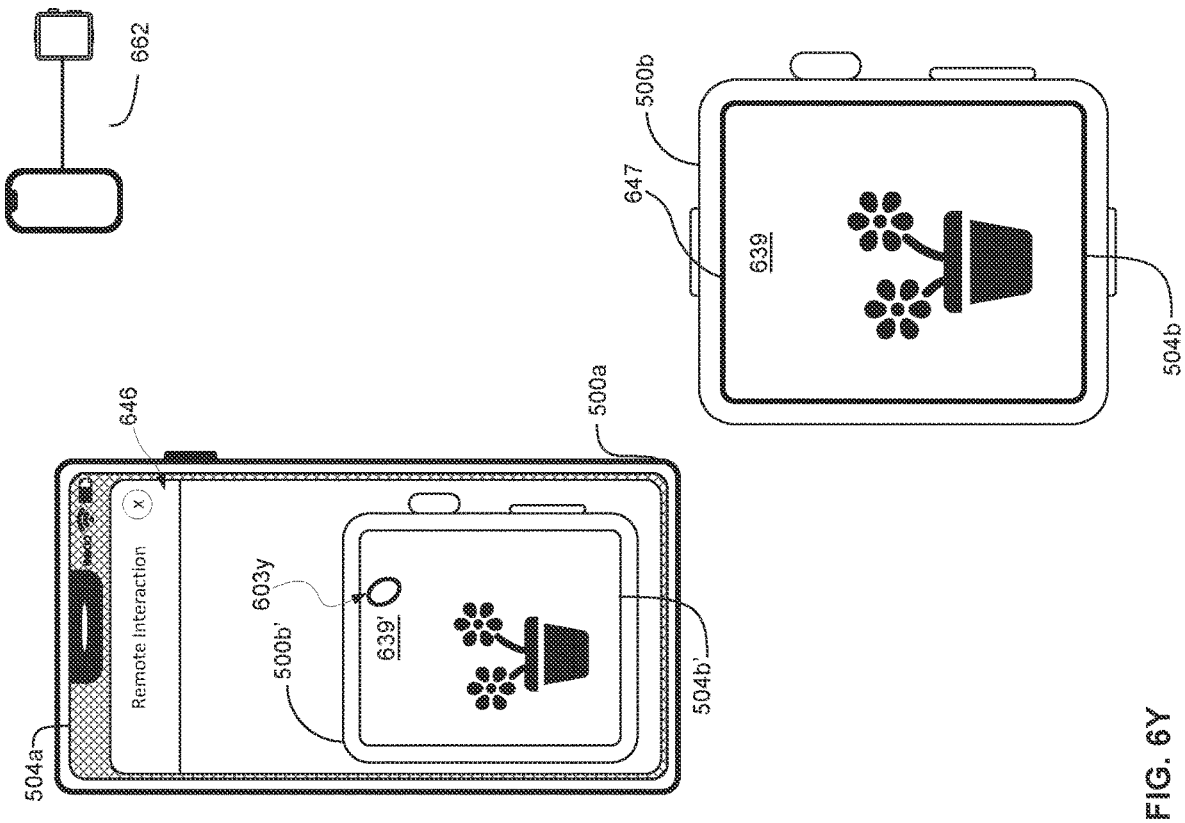
Figure 6B:
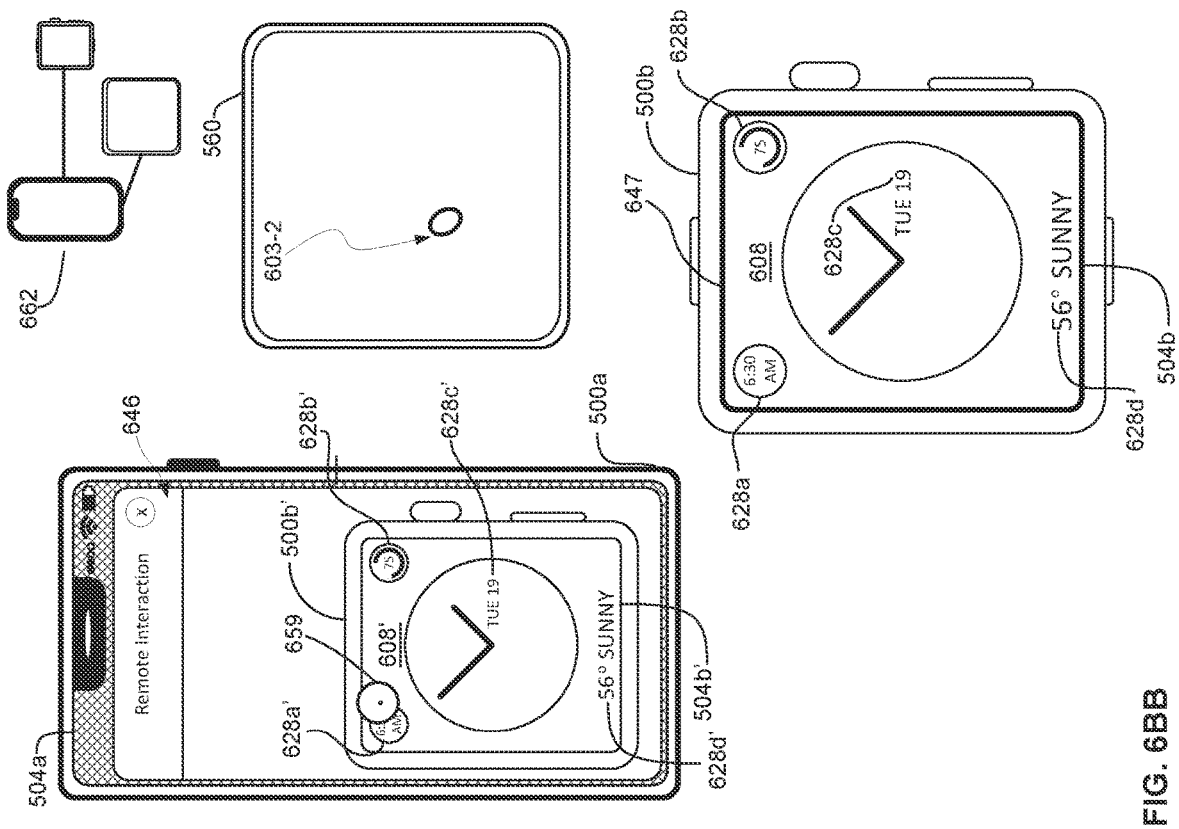
Figure 6A:
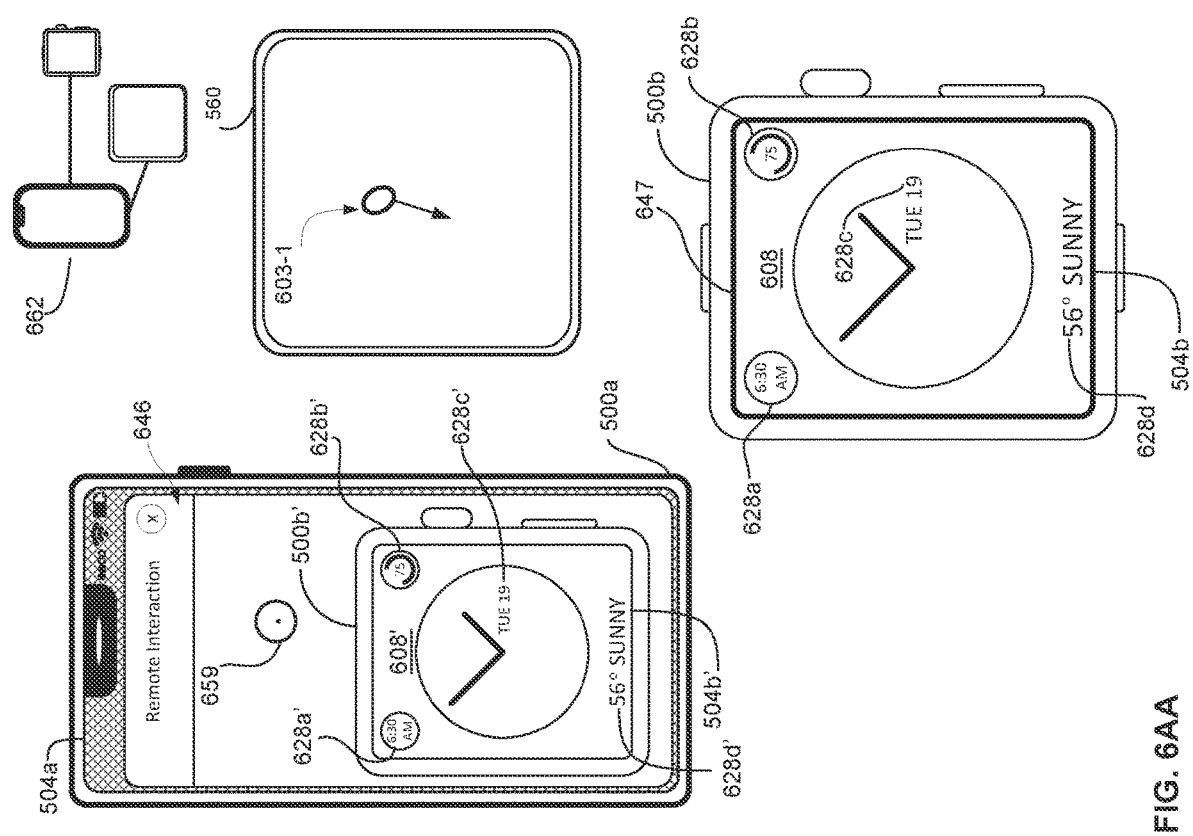
Figure 6D:
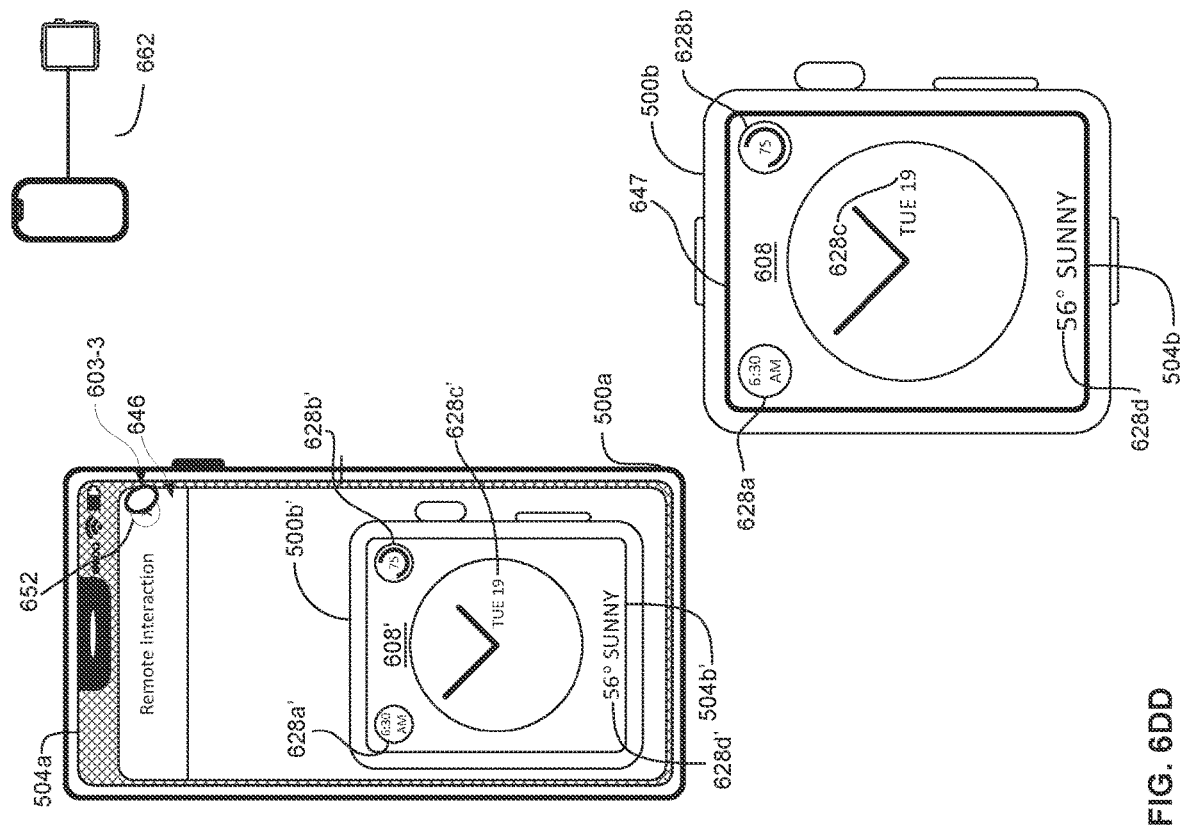
Figure 6C:
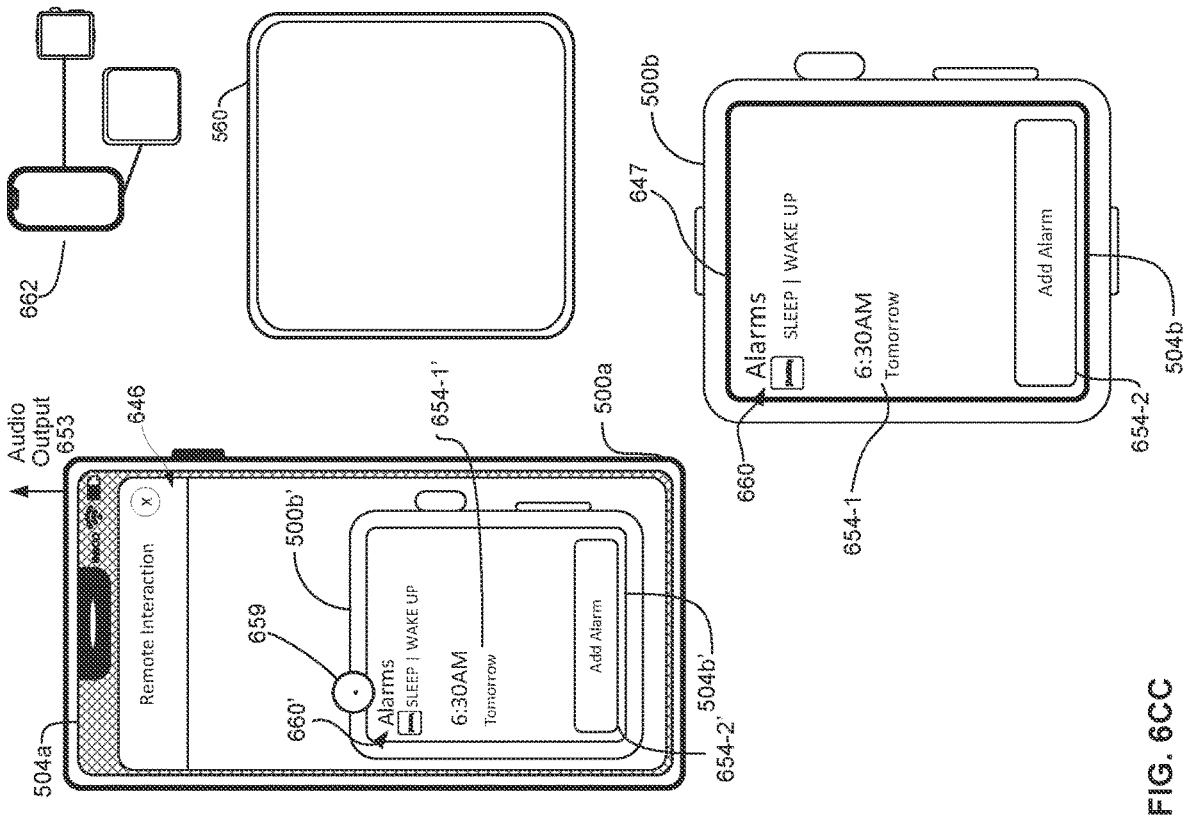
Figure 6F:
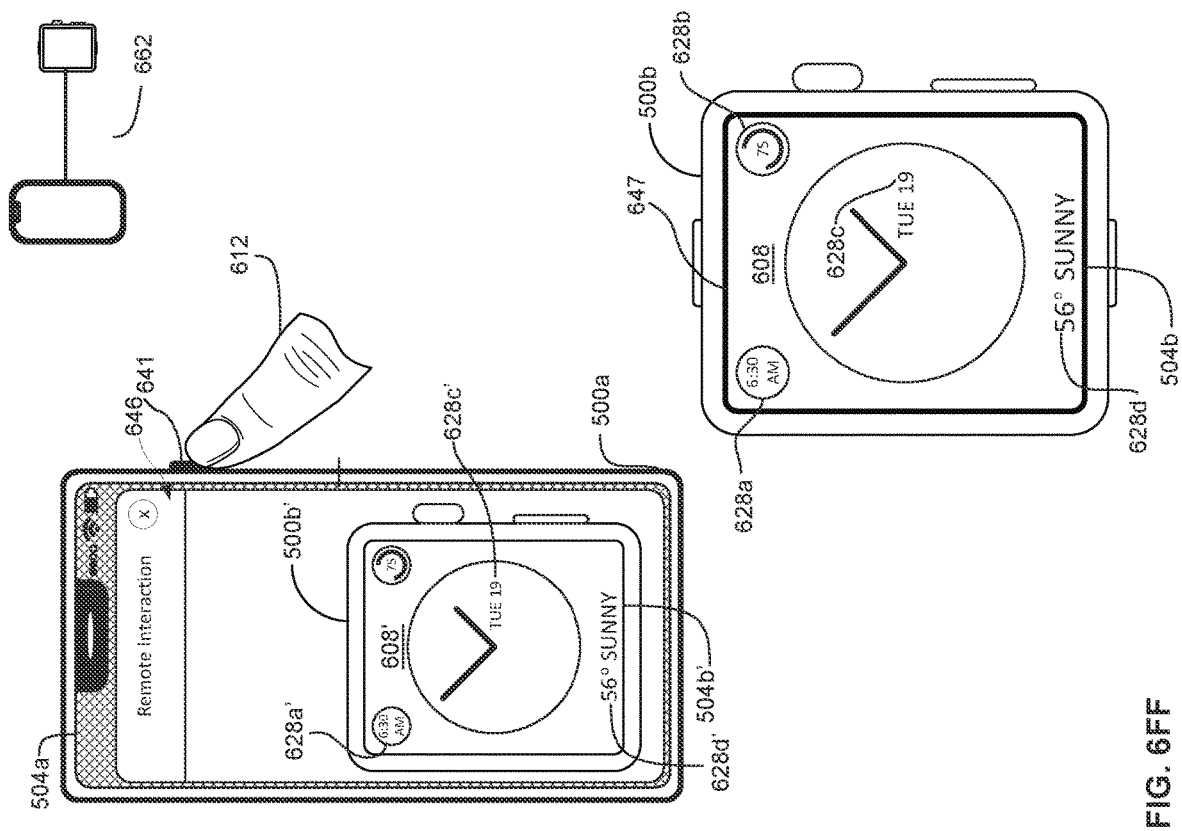
Figure 6E:
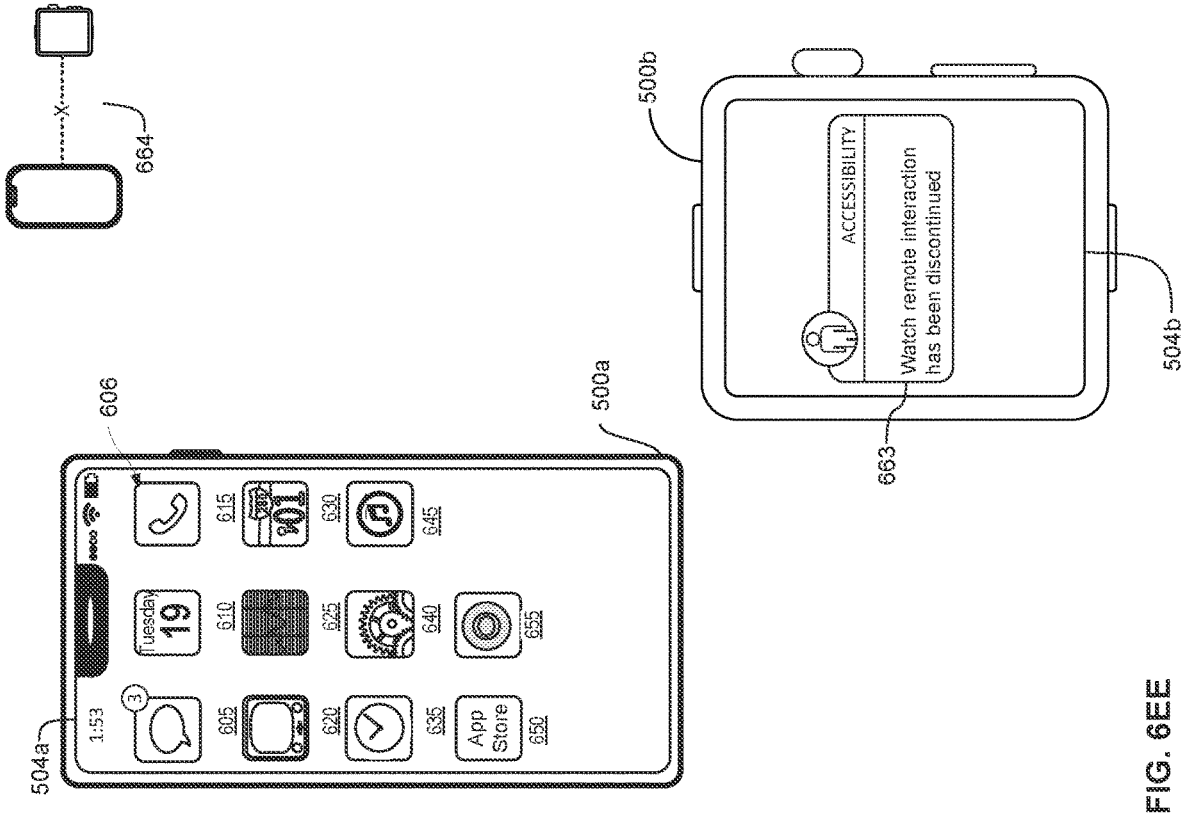
Figure 6G:
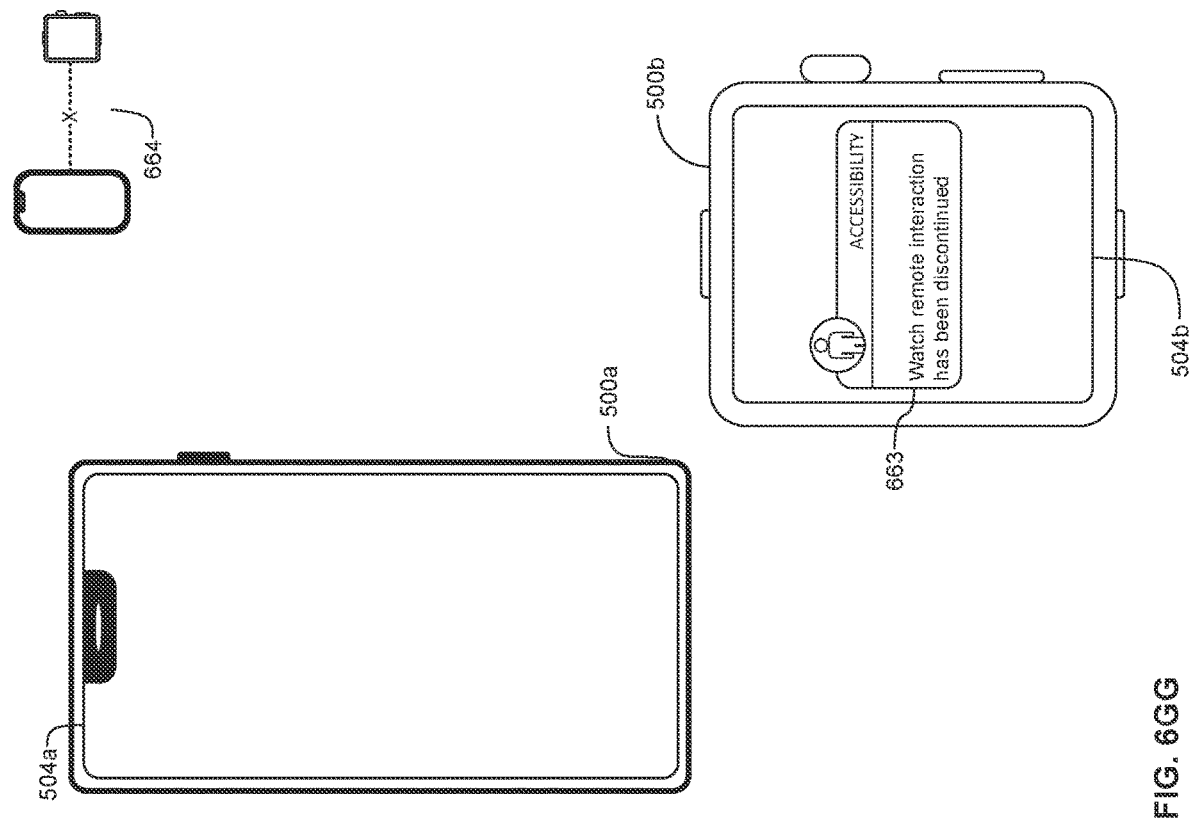

FIGS. 6A-6E illustrate a first electronic device initiating a remote interaction mode with a second electronic device in response to detecting user input in a settings application of the first electronic device. FIG. 6A illustrates a first device 500a that includes touch screen 504a. As shown in FIG. 6A, the electronic device 500a presents a lock screen user interface 604 (e.g., a wake screen user interface). In some embodiments, lock screen user interface 604 is the user interface that is displayed when electronic device 500a is awoken (e.g., from a sleep, a power off, or locked state). Additionally, as shown, FIG. 6A illustrates a second device 500b that includes touch screen 504b. For example, the second device 500b is a wearable electronic device (e.g., wearable on a wrist of the user). In some embodiments, the electronic device 500b presents a watch screen user interface 608 displaying a current time of day at the electronic device 500b. As shown in FIG. 6A, the watch screen user interface 608 optionally includes a plurality of user interface objects (e.g., icons and/or widgets) associated with applications operating on the second device 500b. For example, as shown in FIG. 6A, the watch screen user interface 608 includes an alarm clock user interface object 628a, a battery level user interface object 628b, a calendar user interface object 628c, and/or a weather user interface object 628d. As described herein, the plurality of user interface objects 628a-628d are optionally selectable to cause the second device 500b to display user interfaces corresponding to the selected user interface object.

In some embodiments, a remote interaction mode is configured between the first device 500a and the second device 500b in response to user input received at the first device 500a. As described herein, while in the remote interaction mode, information (e.g., images) displayed on the second device 500b (e.g., via touch screen 504b) are concurrently displayed on the first device 500a (e.g., via touch screen 504a), such that user input received at the first device 500a causes the second device 500b to update display of the information on the second device 500b. As shown by legend 664 in FIG. 6B, the first device 500a is optionally not in the remote interaction mode with the second device 500b. As discussed below, the first device 500a optionally initializes the remote interaction mode with the second device 500b in response to receiving user input corresponding to a request to initialize the remote interaction mode.

As shown in FIG. 6B, the first device 500a displays, via the touch screen 504a, a user interface 606 (e.g., after unlocking the lock screen user interface 604 shown in FIG. 6A). In some embodiments, user interface 606 is a home screen user interface of device 500A (e.g., as described with reference to FIG. 4A). For example, the user interface 606 includes an application icon 605, an application icon 610, an application icon 615, an application icon 620, an application icon 625, an application icon 630, an application icon 635, an application icon 640, an application icon 645, an application icon 650, and an application icon 655. As similarly described above, the different application icons are optionally selectable to display different user interfaces associated with the applications. Application icon 640 optionally corresponds to a settings application that displays information and/or a plurality of selectable options that are selectable to initiate processes for configuring various settings of and/or modes of operation of the electronic device 500a.

As shown in FIG. 6B, the first device 500a receives a selection input 603b directed to the application icon 640 while the first device 500a and the second device 500b are not in communication, as discussed above. For example, the first device 500a detects a tap 603b or touch (e.g., of a finger of the user) via the touch screen 504a.

In some embodiments, in response to receiving the selection input 603b, the first device 500a displays, via the touch screen 504a, a settings user interface 616 corresponding to the selected application icon 640, as shown in FIG. 6C. For example, the settings user interface 616 includes a plurality of user interface objects 626-1-626-10 that are associated with operating settings of the first device 500a. User interface object 626-1 corresponds to a selectable search field that is configured to receive a search query relating to the settings application. User interface object 626-2 is optionally selectable to cause the first device 500a to display information and/or additional user interface objects (e.g., in a second user interface) corresponding to a user account/profile of the electronic device 500a. User interface object 626-3 is selectable to cause the first device 500a to initiate a process for disabling receipt and transmission of wireless signals. User interface object 626-4 is selectable to cause the first device 500a to display a user interface for connecting to a particular Wi-Fi network. User interface object 626-5 is selectable to cause the first device 500a to display a user interface for controlling Bluetooth connections with external devices. User interface object 626-6 is selectable to cause the first device 500a to display a user interface including information (e.g., and/or additional user interface objects) corresponding to data usage of the electronic device 500a. User interface object 626-7 is selectable to cause the first device 500a to display a plurality of selectable options for configuring profile settings of the electronic device 500a, such as device storage and user preference settings. User interface object 626-8 is selectable to cause the first device 500a to display a user interface for configuring and/or customizing a controls toolbar/user interface of the first device 500a. User interface object 626-9 is selectable to cause the first device 500a to display a user interface for adjusting and/or configuring characteristics of the touch screen 504a. User interface object 626-10 is selectable to cause the first device 500a to display one or more user interfaces for configuring features and/or shortcuts that support and/or enhance the user's interaction with the first device 500a.

As shown in FIG. 6C, the first device 500a receives a selection input (e.g., a tap or touch input) 603c directed to the user interface object 626-10 in the settings user interface 616. In some embodiments, as mentioned above, in response to receiving the selection input 603c, the electronic device 500a displays one or more user interfaces for configuring accessibility features of the electronic device 500a. As shown in FIG. 6D, one of such user interfaces optionally includes a watch control user interface 614 that includes a list of external devices (e.g., wearable electronic devices, such as smart watches) known to the first device 500a. For example, as shown in FIG. 6D, the watch control user interface includes user interface object 624-1 and user interface object 624-2 corresponding to external devices with which the first device 500a is able to initiate a remote interaction mode. As shown in FIG. 6D, the first device 500a optionally receives a selection input (e.g., a tap or touch input) 603d directed to the user interface object 624-1.

In some embodiments, in response to receiving the selection input 603d, the first device 500a initiates the remote interaction mode with the second device 500b (e.g., identified as "My Watch" in user interface object 624-1). For example, as shown in FIG. 6E, the first device 500a establishes a connection (e.g., a wireless connection, such as through Bluetooth or Wi-Fi) with the second device 500b as shown in legend 662. In some embodiments, as shown in FIG. 6E, the first device 500a displays user interface 619 indicating that the first device 500a is in communication with the second device 500b (e.g., identified as "My Watch"). Additionally, as shown in FIG. 6E, the user interface 619 includes a selectable option 629 that is selectable to cause the first device 500a to operate in the remote interaction mode with the second device 500b, as described in more detail with reference to FIG. 6J. In some embodiments, when the remote interaction mode is initialized between the first device 500a and the second device 500b, the second device 500b displays a user interface object 613 indicating that the remote interaction mode has been initialized, as shown in FIG. 6E.

FIGS. 6F-6H illustrate a first electronic device initiating a remote interaction mode with a second electronic device in response to detecting user input in a controls user interface of the first electronic device. In FIG. 6F, the first device 500a is optionally displaying the home screen user interface 606 described above with reference to FIG. 6B. As shown by the legend 664 in FIG. 6F, a remote interaction mode has not been initialized between the first device 500*a* and the second device 500*b*. In FIG. 6F, the first device 500*a* optionally receives an interaction input (e.g., a tap and hold on the touch screen 504*a*, followed by downward movement along a surface of the touch screen 504*a*) 603*f* directed to a top region of the user interface 606.

In some embodiments, in response to receiving the interaction input 603*f*, the first device 500*a* displays, via the touch screen 504*a*, a controls user interface 632, as shown in FIG. 6G. For example, as shown in FIG. 6G, the controls user interface 632 includes a plurality of user interface elements 642-1-642-10 for controlling a plurality of corresponding parameters and/or operations of the first device 500*a*. For example, the plurality of user interface elements enable control of wireless and/or data carrier parameters (642-1), output of audio (642-2), brightness level of the touch screen 504*a* (642-3), volume level of the audio (642-4), enabling a restricted notification mode (642-5), restricting rotation of the display of the touch screen 504*a* (642-6), use of external monitors (642-7), initializing a remote interaction mode (642-8), activating one or more LEDs of the device 500*a* (642-9), and/or launching a camera application (642-10). As shown in FIG. 6G, while the controls user interface 632 is displayed, the first device 500*a* receives a selection input (e.g., a tap or touch input) 603*g* directed to selectable option 642-8 associated with initializing the remote interaction mode.

In some embodiments, in response to receiving the selection of the selectable option 642-8, the first device 500*a* initializes the remote interaction mode with the second device 500*b*, as similarly described above with reference to FIG. 6E. For example, as shown in FIG. 6H, the first device 500*a* and the second device 500*b* are communicatively linked as shown by the legend 662. Additionally, as shown in FIG. 6H, the first device 500*a* displays user interface 619 and the second device 500*b* displays the user interface object 613, as described above with reference to FIG. 6E, indicating that the remote interaction mode has been initialized between the first device 500*a* and the second device 500*b*.

FIGS. 6I-6J illustrate a first electronic device initiating a remote interaction mode with a second electronic device in response to detecting user input via a hardware control of the first electronic device. In FIG. 6I, the first device 500*a* is optionally displaying the home screen user interface 606 described above with reference to FIG. 6B. In some embodiments, the electronic device 500 similarly initiates the remote interaction mode in response to receiving the input illustrated in FIG. 6I while displaying a user interface other than the home screen user interface 606. In some embodiments, the electronic device 500 initiates the remote interaction mode in response to receiving the input illustrated in FIG. 6I while the display 504 is asleep and not displaying a user interface. In some embodiments, the electronic device 500 initiates the remote interaction mode in response to receiving the input illustrated in FIG. 6I regardless of whether or not the electronic device 500 is displaying a user interface and regardless of the user interface being displayed, if any. As shown by the legend 664 in FIG. 6I, a remote interaction mode has not been initialized between the first device 500*a* and the second device 500*b*. In FIG. 6I, the first device 500*a* optionally receives an interaction input directed to physical button (e.g., power button) 641 of the first device 500*a*. For example, the first device 500*a* detects an object (e.g., finger 612) press and release the physical button 641 sequentially a respective number of times (e.g., three times ("3×")). In some embodiments, the selection of the physical button 641 the respective number of times corresponds to a request to initialize a remote interaction mode between the first device 500*a* and the second device 500*b* (e.g., as defined by shortcuts setting on the electronic device 500*a* that is associated with the physical button 641).

In some embodiments, in response to receiving the selection of the physical button 641 the respective number of times, the first device 500*a* initializes the remote interaction mode with the second device 500*b*, as similarly described above with reference to FIG. 6E. For example, as shown in FIG. 6J, the first device 500*a* and the second device 500*b* are communicatively linked as shown by the legend 662. Additionally, as shown in FIG. 6J, the first device 500*a* displays user interface 619 and the second device 500*b* displays the user interface object 613, as described above with reference to FIG. 6E, indicating that the remote interaction mode has been initialized between the first device 500*a* and the second device 500*b*. In some embodiments, as described below, in response to receiving selection of the selectable option 629 of the user interface 619 (e.g., via selection input 603*j* in FIG. 6J), the first device 500*a* and the second device 500*b* enter the remote interaction mode, which includes concurrently displaying an image (e.g., a user interface) on the first device 500*a* and the second device 500*b*.

FIGS. 6K-6V illustrate exemplary interactions with a messaging application while a first electronic device is in a remote interaction mode with a second electronic device. In some embodiments, in response to the selection input 603*j* received in FIG. 6J, the first device 500*a* displays a remote interaction user interface 646 corresponding to the remote interaction mode between the first device 500*a* and the second device 500*b*, as shown in FIG. 6K. For example, as shown in FIG. 6K, while the first device 500*a* and the second device 500*b* are in the remote interaction mode as indicated by the legend 662, the first device 500*a* displays a representation of the second device 500*b*' in the remote interaction user interface 646. For example, the second device 500*b* transmits, to the first device 500*a*, data associated with displaying one or more images and metadata associated with the one or more images that enable the first device 500*a* to display a rendering/representation of the second device 500*b*, including the graphical contents (e.g., user interfaces, selectable options, and/or user interface objects) of the touch screen 504*b* of the second device 500*b*, and to respond to user interactions directed toward the graphical contents (e.g., using the metadata). In some embodiments, the representation of the second device 500*b*' includes a representation of the touch screen 504*b*' of the second device 500*b*, as well as an image of the user interface 608 displayed on the second device 500*b*. For example, as shown in FIG. 6K, the first device 500*a* displays a representation of the watch screen user interface 608', which includes a representation of the alarm user interface object 628*a*', a representation of the battery level user interface object 628*b*', a representation of the calendar user interface object 628*c*', and/or a representation of the weather user interface object 628*d*'.

Additionally, as shown in FIG. 6K, when the first device 500*a* enters the remote interaction mode with the second device 500*b* (e.g., when the first device 500*a* displays the remote interaction user interface 646), the second device 500*b* displays a visual indication 647 that indicates the first device 500*a* and the second device 500*b* are operating in the remote interaction mode. For example, as shown in FIG. 6K, the second device 500*b* ceases display of the user interface object 613 shown in FIG. 6J. As shown in FIG. 6K, the visual indication 647 is displayed along a perimeter of the touch screen 504*b* of the second device 500*b* and surrounds the watch screen user interface 608. In some embodiments, the visual indication is a colored, bolded, highlighted, or otherwise visually emphasized band that is displayed for the duration of the remote interaction mode.

As described herein, while the first device 500a and the second device 500b are operating in the remote interaction mode, the user is able to control the second device 500b (e.g., interact with and/or update display of user interfaces on the second device 500b) by interacting with the representation of the second device 500b' displayed on the first device 500a. In some embodiments, when the first device 500a detects inputs directed to the representation of the second device 500b' and/or to the images (e.g., representations of user interfaces) displayed on the representation of the second device 500b', the first device 500a transmits, to the second device 500b, data including instructions corresponding to the user inputs. As discussed below, in response to receiving the data, the second device 500b optionally performs one or more operations in accordance with the instructions, including updating display of the images (e.g., user interfaces, selectable options, user interface objects) displayed on the second device 500b. In some embodiments, when the second device 500b performs the one or more operations, the second device 500b transmits, to the first device 500a, data associated with displaying one or more updated images and metadata associated with the updated one or more images that enable the first device 500a to update display of the representation of the second device 500b' in real time (e.g., within a threshold amount of time, such as 0.005, 0.01, 0.05, 0.07, 0.1, 0.5. 0.75, 1, or 1.5 seconds, of the first device receiving the user input).

In FIG. 6L, while the first device 500a and the second device 500b are operating in the remote interaction mode, the user receives an incoming message 624 from a second user ("John"). For example, the second device 500b (and/or the first device 500a) receives data corresponding to the incoming message 624 from the second user (John), which causes the second device 500b to present a notification of the incoming message on the touch screen 504b. As shown in FIG. 6L, the second device 500b displays a preview 627 of the message from John, a first option 629-1 that is selectable to initiate a process to reply to the message, and a second option 629-2 that is selectable to ignore the message (e.g., forgo replying to the message) and cease display of the preview 627 and options 629-1 and 629-2. As shown in FIG. 6L, when the user receives the incoming message 624, the first device 500a updates display of the representation of the second device 500b' to include a representation of the preview 627', a representation of the first option 629-1', and a representation of the second option 629-2' (e.g., in response to receiving data corresponding to the display of such images from the second device 500b).

In some embodiments, while the first device 500a and the second device 500b are in the remote interaction mode and while the first device 500a and the second device 500b are associated with (e.g., logged into) a same user account/profile, when the first device 500a and/or the second device 500b detects a notification event (e.g., an incoming phone call, incoming message (e.g., as shown in FIG. 6L), an incoming email, and/or an application notification), the first device 500a and/or the second device 500b generate a notification corresponding to the notification event. For example, in response to detecting a notification event, the first device 500a displays a notification on the touch screen 504a (e.g., in a predetermined region on the touch screen 504a, such as a top region), the second device 500b displays a notification on the touch screen 504b (e.g., which is thus displayed on the representation of the second device 500b' on the first device 500a, as similarly shown in FIG. 6L), or both. Similarly, in some embodiments, while in the remote interaction mode, in response to detecting input directed to the notification (e.g., a selection of the notification), the first device 500a performs an operation associated with the notification (e.g., displaying a user interface associated with the notification), and/or the second device 500b performs the operation associated with the notification (e.g., which is thus reflected in the representation of the second device 500b' on the first device, as described below).

As shown in FIG. 6L, the first device 500a receives a selection input (e.g., a tap or touch input) 6031 directed to the representation of the first option 629-1'. In some embodiments, as discussed above, selection of the representation of the first option 629-1' causes the first device 500a to transmit data including instructions corresponding to the selection to the second device 500b. As shown in FIG. 6M, in response to receiving the data from the first device 500a, the second device 500b displays, via the touch screen 504b, a messaging user interface 631. For example, as shown in FIG. 6M, the messaging user interface 631 includes a plurality of representations of messages sent to or from the electronic device 500b (e.g., involving John), including the message just received from the second user ("How about lunch tomorrow?"). As shown in FIG. 6M, the messaging user interface 631 optionally includes an applications icon 633-1 and a message option 633-2 that, when selected, causes the electronic device 500b to present a user interface for composing a message to send to the second user. As shown in FIG. 6M, when the second device 500b displays the messaging user interface 631, the second device 500b maintains display of the visual indication 647 (e.g., because the first device 500a and the second device 500b are still operating in the remote interaction mode).

As shown in FIG. 6M, in some embodiments, the second device 500b transmits data (e.g., images) corresponding to the messages user interface 631 and metadata associated with the messages user interface 631 that cause the first device 500a to update display of the representation of the second device 500b'. As shown in FIG. 6M, the first device 500a updates the representation of the second device 500b' to include a representation of the messages user interface 631', representations of the messages between the user and the second user (John), a representation of the applications icon 633-1', and a representation of the messages option 633-2'. In some embodiments, the second device 500b includes a first physical button 643 (e.g., a crown or dial) that is selectable (e.g., via a press applied to the button) and/or scrollable (e.g., via a scroll applied to the button). As shown in FIG. 6M, the representation of the second device 500b' displayed on the first device 500a includes a representation of the first physical button 643'.

In some embodiments, user input directed to representations of physical buttons of the second device 500b on the first device 500a cause the second device 500b to perform one or more operations in accordance with corresponding physical interactions with the physical buttons. For example, as shown in FIG. 6M, the first device 500a receives an interaction input (e.g., a swipe or scrolling gesture detected on the touch screen 504b') 603m directed to the representation of the first button 643'. In some embodiments, in response to receiving the interaction input 603m, the first device 500a transmits data including instructions to the second device 500b that corresponds to a physical interaction with the physical button 643 (e.g., a scrolling of the dial/crown of the second device 500b).

In some embodiments, as shown in FIG. 6N, in response to receiving the data from the first device 500a, the second device 500b scrolls through the messaging user interface 631 to reveal, in the messaging user interface 631, additional user interface objects 633-3-633-6. For example, as shown in FIG. 6N, the second device 500b displays a selectable option 633-3 that is selectable to change a language associated with the messages user interface 631, and a plurality of suggested responses 633-4-633-6 that are selectable to transmit a message to John. As shown in FIG. 6N, the second device 500b transmits, to the first device 500a, images of and metadata associated with, the updated display of the messaging user interface 631 on the second device 500b. For example, as shown in FIG. 6N, the first device 500a scrolls through the representation of the messaging user interface 631' and displays representations of the selectable options 633-3'-633-6'.

As shown in FIG. 6N, the first device 500a receives a selection input (e.g., a tap or touch input) 603n directed to the representation of the selectable option 633-3' (e.g., corresponding to the suggested reply "Sure!"). In some embodiments, as shown in FIG. 6O, in response to the first device 500a receiving the selection input 603n, the second device 500b transmits the suggested reply ("Sure!") to the second user, which is represented by the message 636-1 displayed in the messages user interface 631 (e.g., due to the transmission of data corresponding to the input 603n from the first device 500a to the second device 500b). Additionally, as shown in FIG. 6O, when the second device 500b transmits the message to the second user, the first device 500a updates display of the representation of the messaging user interface 631' to include a representation of the transmitted message 636-1' (e.g., due to the transmission of updated images and metadata associated with the transmitted message from the second device 500b to the first device 500a).

In FIG. 6P, the user receives a subsequent incoming message 624 (e.g., from John), which causes the second device 500b to updated display of the messaging user interface 631 to include the new message from the second user ("Burger Joint or the Sandwich Club?"). Additionally, as shown in FIG. 6P, the first device 500a updates the representation of the messaging user interface 631' to include a representation of the new message 636-2' (e.g., due to the transmission of updated images and metadata associated with the incoming message from the second device 500b to the first device 500a). As shown in FIG. 6P, the first device 500a receives a selection input (e.g., a tap or touch input) 603p directed to the representation of the message option 633-2'.

In some embodiments, after the first device 500a receives the selection input 603p, the second device 500b performs a corresponding operation corresponding to selection of the message option 633-2 (e.g., in real time), including displaying a soft keyboard. For example, as shown in FIG. 6Q, the second device 500b displays a user interface 609 for composing a message to send to the second user (John). In some embodiments, the user interface 609 includes a message-entry region 611 and a keyboard 618 for inputting text into the message-entry region 611, as shown in FIG. 6Q. Additionally, as shown in FIG. 6Q, after the second device 500b displays the user interface 609 including the message-entry region 611 and the keyboard 618, the first device 500a optionally updates display of the representation of the second device 500b' to include a representation of the user interface 609', including a representation of the message-entry region 611' and a representation of the keyboard 618' (e.g., in real time). As shown in FIG. 6Q, in some embodiments, the representation of the keyboard 618' corresponds to (e.g., is the same or similar in appearance, form, and function as) the keyboard 618 displayed on the second device 500b. It should be understood that, in some embodiments, the second device 500b may alternatively display a user interface for composing a message using handwritten text (e.g., drawn text that is converted into font-based text) and the first device 500a may display an image of the user interface for composing a message using handwritten text with the representation of the second device 500b'.

As shown in FIG. 6Q, while the first device 500a displays the representation of the user interface 609' and while the second device 500b displays the user interface 609, the first device 500a receives selection of one or more keys of the representation of the keyboard 618'. For example, the first device 500a detects a sequence of taps directed to the keys of the representation of the keyboard 618' for composing the message to send to the second user (John).

In some embodiments, when the first device 500a receives the selection input 603p directed to the representation of the message icon 633-2' in FIG. 6P, the first device 500a alternatively displays a keyboard native to the first device 500a (e.g., associated with an operating system of the first device 500a) while displaying the user interface including a keyboard 618 at the second device 500b. For example, as shown in FIG. 6R, rather than updating display of the representation of the second device 500b' to include the representation of the keyboard 618', the first device 500a replaces display of the representation of the second device 500b' with the message entry region 617-1 and the keyboard 617, which is optionally associated with the operating system of the first device 500a (e.g., and is different in appearance and/or form from the keyboard 618 displayed on the second device 500b, which is optionally associated with an operating system of the second device 500b). It should be understood that, in some embodiments, the selection of one or more keys of the keyboard 617 in FIG. 6R causes the second device 500b to compose a message based on the selected one or more keys in the same or similar manner as the selection of one or more keys of the representation of the keyboard 618' in FIG. 6Q.

In some embodiments, in response to the first device 500a receiving the selection directed to the keys of the representation of the keyboard 618' (and/or the keys of the keyboard 617), the second device 500b displays, in the message-entry region 611, a sequence of characters 611-1 corresponding to the selected keys. For example, as mentioned above, the second device 500b composes the message "Let's do the Burger Joint" in response to the selection of the keys detected by the first device 500a (e.g., in real time), as shown in FIG. 6S. Additionally, in some embodiments, the second device 500b displays a cursor 611-2 with the sequence of characters 611-1 in the message-entry region 611, as shown in FIG. 6S. While the second device 500b updates the message-entry region 611 to include the sequence of characters 611-1 in the message-entry region 611, the first device 500a updates display of the representation of the second device 500b' to include a representation of the sequence of characters 611-1' in the representation of the message-entry region 611' (e.g., in real time).

In some embodiments, as shown in FIG. 6S, the user interface 609 includes a send option 609-1 that is selectable to cause the second device 500b to transmit a message including the sequence of characters 611-1 to the second user (John). As shown in FIG. 6S, the representation of the user interface 609' displayed at the first device 500a optionally includes a representation of the send option 609-1'. In FIG. 6S, the first device 500*a* receives a selection input (e.g., a tap or touch input) 603*r* directed to the representation of the send option 609-1'.

In some embodiments, in response to the first device 500*a* receiving the selection input 603*r*, the second device 500*b* transmits the message including the sequence of characters 611-1 to the second user. For example, as shown in FIG. 6T, the second device 500*b* redisplays the messaging user interface 631 that includes the message 636-3 composed using the representation of the keyboard 618' on the first device 500*a*. In some embodiments, as shown in FIG. 6T, after the second device 500*b* transmits the message to the second user (e.g., John), the first device 500*a* updates display of the representation of the second device 500*b*' to include a representation of the message 636-3' in the representation of the messaging user interface 631' (e.g., in real time).

As shown in FIG. 6T, the first device 500*a* detects a selection input (e.g., a tap or touch input) 603*s* directed to the representation of the first physical button 643'. For example, the first device 500*a* receives a tap on the touch screen 504*a* that corresponds to a press of the first physical button 643 of the second device 500*b*. In some embodiments, after the first device 500*a* receives the selection of the representation of the first physical button 643', the second device 500*b* performs an operation corresponding to a press of the first physical button 643 of the second device 500*b*. For example, the second device 500*b* navigates backward and redisplays the watch screen user interface 608 (e.g., described previously above), as shown in FIG. 6U. In some embodiments, as shown in FIG. 6U, after the second device 500*b* redisplays the watch screen user interface 608, the first device 500*a* updates the representation of the second device 500*b*' to redisplay the representation of the watch screen user interface 608' (e.g., in real time).

In some embodiments, as shown in FIG. 6U, the second device 500*b* includes a second physical button (e.g., a power button) 649. Accordingly, as shown in FIG. 6U, the representation of the second device 500*b*' displayed on the first device 500*a* optionally includes a representation of the second physical button 649'. In FIG. 6U, the first device 500*a* receives a selection input (e.g., a tap or touch input) 603*u* directed to the representation of the second physical button 649'. For example, the first device 500*a* detects a tap on the touch screen 504*a* directed to the representation of the second physical button 649' that corresponds to a press of the second physical button 649 of the second device 500*b*.

In some embodiments, in response to the first device 500*a* receiving the selection of the representation of the second physical button 649', the second device 500*b* performs an operation corresponding to a press of the second physical button 649 of the second device 500*b*. For example, as shown in FIG. 6V, the second device 500*b* replaces display of the watch screen user interface 608 with a plurality of tabs 656-658 corresponding to applications operating on the second device 500*b*. As shown in FIG. 6V, the tab 656 is optionally selectable to display a user interface associated with a messages application (e.g., similar to messaging user interface 631 described above), the tab 657 is optionally selectable to display a user interface associated with a timers application (e.g., for configuring/setting a timer at the second device 500*b*), and/or the tab 658 is optionally selectable to display a user interface associated with an audio application operating on the second device 500*b* (e.g., a music player application, a podcasts application, and/or an audiobooks application). In some embodiments, as shown in FIG. 6V, after the second device 500*b* displays the plurality of tabs 656-658 on the touch screen 504*b*, the first device 500*a* updates display of the representation of the second device 500*b*' to replace display of the representation of the watch screen user interface 608' with representations of the tabs 656'-658' (e.g., in real time).

FIGS. 6W-6Z illustrate exemplary interactions with an image while a first electronic device is in a remote interaction mode with a second electronic device. As shown in FIG. 6W, the first device 500*a* is operating in the remote interaction mode with the second device 500*b*, as indicated by legend 662. As described above, while in the remote interaction mode, the first device 500*a* displays a representation of the second device 500*b*', including one or more images on a representation of the touch screen 504*b*' of the second device, as shown in FIG. 6W. For example, the one or more images correspond to user interfaces, selectable options, and/or user interface objects currently displayed on the second device 500*b*.

As shown in FIG. 6W, the second device 500*b* is displaying a watch screen user interface 608 (e.g., displaying a current time of day at the second device 500*b*) which includes a calendar user interface object 628*c* and an image of flowers (e.g., a wallpaper of the watch screen user interface 608). Additionally, as similarly described above, because the first device 500*a* and the second device 500*b* are in the remote interaction mode, the second device 500*b* displays the visual indication 647, as shown in FIG. 6W. Further, the first device 500*a* optionally displays a representation of the watch screen user interface 608', including a representation of the calendar user interface object 628*c*' and the image of the flowers, as shown in FIG. 6W.

As described below, user input directed to an image displayed in a first context causes the second device to perform a first operation, and the user input directed to the image displayed in a second context, different from the first context, causes the second device to perform a second operation, different from the first operation. In FIG. 6W, the first device 500*a* receives a selection input (e.g., a tap or touch input) 603*w* directed to a respective portion of the representation of the touch screen 504*b*'. As discussed above, the watch screen user interface 608 includes the image of the flowers (e.g., the context of the display of the image of the flowers is as a wallpaper of the watch screen user interface 608). As shown in FIG. 6W, the respective portion of the representation of the touch screen 504*b*' to which the selection input 603*w* is directed includes the representation of the calendar user interface object 628*c*' in the watch screen user interface 608'. Accordingly, as described below, the selection input 603*w* corresponds to a selection of the user interface object 628*c* displayed in the watch screen user interface 608 on the second device 500*b*.

In some embodiments, in response to the receiving the selection 603*w* directed to the representation of the calendar user interface object 628*c*' in FIG. 6W, the first device 500*a* transmits, to the second device 500*b*, data including instructions corresponding to selection of the calendar user interface object 628 displayed in the watch screen user interface 608 on the second device 500*b*, as shown in FIG. 6X. In FIG. 6X, in response to receiving the data from the first device 500*a*, the second device 500*b* displays, via the touch screen 504*b*, a calendar user interface 637. For example, as shown in FIG. 6X, the calendar user interface 637 includes a current date at the second device 500*b* and an upcoming calendar event 638 (e.g., "Drop-off dog"), including information associated with the upcoming calendar event 638 (e.g., a time associated with the event, a duration of the event, and/or a location associated with the event). In some embodiments, after displaying the calendar user interface 637, the second device 500b transmits, to the first device 500a, images of the calendar user interface 637 and metadata associated with the calendar user interface 637. As shown in FIG. 6X, in response to receiving the images and metadata from the second device 500b, the first device 500a updates display of the representation of the second device 500b' to replace display of the representation of the watch screen user interface 608' with a representation of the calendar user interface 637', including a representation of the upcoming calendar event 638'.

In FIG. 6Y, the image of the flowers is alternatively displayed in a photos application on the second device 500b (e.g., the context of the display of the image of the flowers is in a photo-viewing user interface 639 on the second device 500b). Accordingly, as shown in FIG. 6Y, the representation of the second device 500b' includes a representation of the photo-viewing user interface 639', including the image of the flowers. In FIG. 6Y, the first device 500a receives a selection input (e.g., a tap or touch input) 603y directed to a respective portion of the representation of the touch screen 504b'. For example, the selection input 603y is received at the same respective portion of the representation of the touch screen 504b' as the selection input 603w in FIG. 6W. In some embodiments, the respective portion of the touch screen 504b' at which the selection input 603y is detected does not correspond to a portion of the photo-viewing user interface 639 displayed at the second device 500b that includes a selectable option or user interface object, as shown in FIG. 6Y.

In some embodiments, in response to receiving the selection input 603w, the first device 500a transmits, to the second device 500b, data including instructions corresponding to selection of the respective portion of the photo-viewing user interface 639. As shown in FIG. 6Z, in response to receiving the data, the second device 500b displays, via the touch screen 504b, a plurality of user interface elements 651-1-651-3 in the photo-viewing user interface 639. For example, the second device 500b displays a visual indication 651-1 corresponding to the current time of day at the second device 500b, a selectable option 651-2 that is selectable to navigate backward in the photo-viewing user interface 639 (e.g., and display a plurality of photos), and a selectable option 651-3 that is selectable to share the image of the flowers (e.g., via a message and/or an email), as shown in FIG. 6Z. In some embodiments, after displaying the user interface elements 651-1-651-3, the second device 500b transmits, to the first device 500a, data (e.g., images) of the user interface elements 651-1-651-3 and metadata associated with the user interface elements 651-1-651-3 to the first device 500a. As shown in FIG. 6Z, in response to receiving the images and metadata, the first device 500a updates display of the representation of the second device 500b' to include representations of the user interface elements 651-1'-651-3' in the representation of the photo-viewing user interface 639'. It should be understood that, in some embodiments, user input directed to the representations of the user interface elements 651-1'-651-3' received at the first device 500a cause the second device 500b to perform corresponding operations associated with the user interface elements 651-1-651-3 displayed in the photo-viewing user interface 639 on the second device 500b in a similar manner as described above.

Accordingly, as described above, user input (e.g., selection input 603w) received at the first device 500a directed to an image (e.g., the image of flowers) displayed in a first context (e.g., as a wallpaper in FIG. 6W) causes the second device 500b to perform a first operation (e.g., display calendar user interface 637 in FIG. 6X), and the user input (e.g., selection input 603y) directed to the image displayed in a second context (e.g., in a photo-viewing user interface 639 in FIG. 6Y), different from the first context, causes the second device to perform a second operation (e.g., display additional user interface elements 651-1-651-3 in FIG. 6Z), different from the first operation.

FIGS. 6AA-6CC illustrate exemplary interactions with content using an external input device while a first electronic device is in a remote interaction mode with a second electronic device. As shown in FIG. 6AA, the first device 500a is operating in the remote interaction mode with the second device 500b, as indicated by legend 662. As described above, while in the remote interaction mode, the first device 500a displays a representation of the second device 500b', including one or more images on a representation of the touch screen 504b' of the second device, as shown in FIG. 6AA. For example, the one or more images correspond to user interfaces, selectable options, and/or user interface objects currently displayed on the second device 500b.

In some embodiments, as shown in the legend 662 in FIG. 6AA, the first device 500a is in communication with an external input device (e.g., a trackpad) 560. In some embodiments, the first device 500a is in communication with an external keyboard, mouse, or control switch. For example, the trackpad 560 is configured to receive user input (e.g., on a touch-sensitive surface of the trackpad) for interacting with content displayed on the first device 500a. As shown in FIG. 6AA, the second device 500b is displaying a watch screen user interface 608 (e.g., described above with reference to FIG. 6A). Additionally, as similarly described above, because the first device 500a and the second device 500b are in the remote interaction mode, the second device 500b displays the visual indication 647, as shown in FIG. 6AA. Further, the first device 500a optionally displays a representation of the watch screen user interface 608', as shown in FIG. 6AA.

In some embodiments, the first device 500a is operating in an accessibility mode while the first device 500a is in the remote interaction mode with the second device 500b. For example, in the accessibility mode, one or more accessibility features are enabled that enhance and/or support user interaction with the first device 500a, such as an audio output feature and/or a switch control assistive feature. As shown in FIG. 6AA, while the accessibility mode is active, the first device 500a optionally displays a graphical pointer (e.g., cursor) 659 in the remote interaction user interface 646 that is controllable using the trackpad 560. In some embodiments, while the accessibility mode is active (e.g., while the switch control assistive feature is active), the first device 500a visually emphasizes (e.g., highlights) elements (e.g., user interface objects) of the representation of the second device 500b' in the remote interaction user interface 646. Input received via the external input device 560 while a respective element of the representation of the second device 500b' is visually emphasized initiates a process for performing a respective operation involving the respective element (e.g., selecting a respective user interface object). Thus, as described below, while the first device 500a and the second device 500b are in the remote interaction mode and/or while the accessibility mode is active on the first device 500a, user input received via the external input device 560 directed toward the representation of the second device 500b' causes the second device 500b to perform one or more corresponding actions in accordance with the user input.

In FIG. 6AA, the first device 500*a* receives, via the external input device 560, an interaction input 603-1 corresponding to a request to move the graphical pointer 659. For example, the trackpad 560 detects a contact (e.g., of a finger of the user) move on the touch-sensitive surface of the trackpad 560. In some embodiments, in response to receiving the interaction input 603-1 via the external input device 560, the first device moves the graphical pointer 659 in accordance with the interaction input, as shown in FIG. 6BB. For example, as shown in FIG. 6BB, the first device 500*a* moves the graphical pointer 659 over a respective portion of the representation of the second device 500*b*'. In some embodiments, the first device 500*a* visually emphasizes (e.g., highlights) the respective portion of the representation of the second device 500*b*'.

In FIG. 6BB, the first device receives, via the external input device 560, an interaction input (e.g., a touch or press) 603-2 corresponding to a request to perform a selection at a location of the graphical pointer 659. For example, as shown in FIG. 6BB, the graphical pointer 659 is located above a portion of the representation of the alarm user interface object 628*a*'. Accordingly, the first device 500*a* determines that the interaction input 603-2 corresponds to selection of the representation of the alarm user interface object 628*a*' (e.g., which is optionally visually emphasized).

In some embodiments, in response to the first device 500*a* receiving the selection of the representation of the alarm user interface object 628*a*', the second device 500*b* replaces display of the watch user interface 608 with an alarm user interface 660, as shown in FIG. 6CC. For example, as shown in FIG. 6CC, the alarm user interface 660 includes information 654-1 (e.g., identifying an alarm time at the second device 500*b* and/or a date when the alarm will be generated) and a selectable option 654-2 that is selectable to initiate a process for configuring an additional alarm at the second device 500*b*. In some embodiments, after the second device 500*b* displays the alarm user interface 660, the first device 500*a* updates display of the representation of the second device 500*b*' to replace the representation of the watch screen user interface 608' with a representation of the alarm user interface 660', including a representation of the information 654-1' and a representation of the selectable option 654-2' (e.g., in real time), as shown in FIG. 6CC.

As similarly described above, in FIG. 6CC, the first device 500*a* is optionally operating in the accessibility mode. In some embodiments, while in the accessibility mode, an audio output feature is active for the first device 500*a*. For example, with the audio output feature active, the first device 500*a* outputs audio including descriptions of the images, user interfaces, and/or graphical elements displayed on the touch screen 504*a*. Accordingly, as shown in FIG. 6CC, when the first device 500*a* displays the representation of the alarm user interface 660' on the representation of the second device 500*b*', the first device 500*a* outputs audio 653 corresponding to the representation of the alarm user interface 660'. For example, the first device 500*a* outputs, via one or more speakers of the first device 500*a*, the word "alarms" or the word "alarm user interface" informing the user (e.g., audibly) that the representation of the alarm user interface 660' is displayed on the touch screen 504*a*. Thus, as described above, accessibility features of the accessibility mode of the first device 500*a* enhance and/or support interactions with the representation of the second device for causing corresponding operations to be performed by the second device 500*b* while the first device 500*a* and the second device 500*b* are in the remote interaction mode.

FIGS. 6DD-6GG illustrate examples of terminating a remote interaction mode between a first electronic device and a second electronic device. In FIG. 6DD, the first device 500*a* and the second device 500*b* are in the remote interaction mode as shown by the legend 662. As described above, while in the remote interaction mode, the first device 500*a* displays a representation of the second device 500*b*' in the remote interaction user interface 646 on the touch screen 504*a* of the first device 500*a*, which optionally includes a representation of the watch screen user interface 608' that is currently displayed on the second device 500*b*, as shown in FIG. 6GG. Additionally, as previously discussed herein, the second device 500*b* displays the visual indication 647 on the touch screen 504*b* indicating that the first device 500*a* and the second device 500*b* are in the remote interaction mode.

In some embodiments, the remote interaction user interface 646 includes a selectable option 652 that is selectable to cease display of the remote interaction user interface 646, and thus terminate the remote interaction mode between the first device 500*a* and the second device 500*b*. As shown in FIG. 6DD, the first device 500*a* receives a selection input (e.g., a tap or touch) 603-3 directed to the selectable option 652 in the remote interaction user interface 646.

In some embodiments, in response to receiving the selection of the selectable option 652 in FIG. 6DD, the first device 500*a* ceases display of the remote interaction user interface 646 and terminates the remote interaction mode with the second device 500*b*, as shown in FIG. 6EE. For example, as shown in the legend 664 in FIG. 6EE, the first device 500*a* and the second device 500*b* are no longer exchanging data and images corresponding to the images displayed on the second device 500*b* and the user inputs received at the first device 500*a*. As shown in FIG. 6EE, the first device 500*a* optionally redisplays the home screen user interface 606 and the second device 500*b* ceases display of the visual indication 647 that indicates that the remote interaction mode is active. Additionally, in some embodiments, the second device 500*b* displays a user interface object 663 indicating that the remote interaction mode between the first device 500*a* and the second device 500*b* has been terminated.

In some embodiments, the remote interaction mode between the first device 500*a* and the second device 500*b* is terminated in response to user input received via a physical button of the first device 500*a*. For example, as shown in FIG. 6FF, while the first device 500*a* and the second device 500*b* are in the remote interaction mode, as shown in the legend 662, the first device 500*a* receives a press (e.g., via finger 612) on the physical button 641 of the first device 500*a*. As previously discussed above, the physical button 641 optionally corresponds to a power button of the first device 500*a* which is selectable to power off the display of the first device 500*a* (e.g., to lock the first device 500*a* and/or place the device 500*a* in a sleep mode).

In some embodiments, as shown in FIG. 6GG, in response to receiving the press of the physical button 641, the first device 500*a* turns off the touch screen 504*a* of the first device 500*a*. For example, the first device 500*a* ceases display of the remote interaction user interface 646, as shown in FIG. 6GG. In some embodiments, when the first device 500*a* turns off the touch screen 504*a*, the remote interaction mode is terminated between the first device 500*a* and the second device 500*b*, as illustrated in the legend 664. In some embodiments, when the remote interaction mode is terminated, as similarly described above, the second device 500*b* ceases display of the visual indication 647 and/or displays the user interface object 663.

It should be understood that, in some embodiments, any action that causes the touch screen 504*a* to shut off (e.g., the first device 500*a* is powered off, or the first device 500*a* loses battery power) also causes the remote interaction mode to be terminated. Additionally, if the touch screen 504*b* of the second device were to shut off (e.g., due to power-off or loss of battery power of the second device 500*b*), the remote interaction mode would also be terminated.

FIG. 7 is a flow diagram illustrating a method 700 of facilitating interactions between a first electronic device and a second electronic device in a remote interaction mode in accordance with some embodiments. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways in which a first electronic device interacts with a second electronic device in a remote interaction mode. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, the method 700 is performed at first electronic device (e.g., first device 500*a* in FIG. 6K) in communication with a display generation component, one or more input devices, and a second electronic device (e.g., second device 500*b* in FIG. 6K). For example, the first electronic device is a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the first electronic device is or includes a computer system. In some embodiments, the computer system is a tablet, mobile phone, laptop, desktop, a head-mounted display ("HMD"), device with a mechanical wheelbase, self-propelled device, smart speaker, wearable device, personal assistive device, robot, and/or camera. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the second electronic device is a wearable electronic device, such as a smart watch configured to be worn on a wrist of a user of the smart watch. In some embodiments, the second electronic device includes wireless communication circuitry and is in communication with a display generation component (e.g., an integrated touch screen display).

In some embodiments, while in a remote interaction mode with the second electronic device, the first electronic device receives (702), via the one or more input devices, data associated with displaying an image (e.g., user interface 608 in FIG. 6K) and respective data corresponding to the image from the second electronic device, wherein the image is currently displayed via the second electronic device, such as display of watch screen user interface 608 on the second device 500*b* as shown in FIG. 6K. For example, the first electronic device is in communication with the second electronic device (e.g., via their respective wireless communication circuitry) in the remote interaction mode (e.g., via Bluetooth and/or a Wi-Fi connection). In some embodiments, the first electronic device and the second electronic device are both logged into a same user account/profile associated with a user of the electronic devices. In some embodiments, the second electronic device transmits the image and the respective data corresponding to the image to the first electronic device in real time. For example, the second electronic device transmits data associated with displaying the image and the respective data within a threshold amount of time (e.g., 0.005, 0.01, 0.05, 0.07, 0.1, 0.5. 0.75, 1, or 1.5 seconds) of the image being displayed via (e.g., the display generation component of) the second electronic device. In some embodiments, the image includes a user interface (e.g., a time of day user interface (e.g., a watch face), an application user interface, and/or a home screen user interface), one or more representations of selectable options (e.g., optionally within the user interface), and/or representations of application icons. In some embodiments, the respective data includes metadata (e.g., image source, image size, image author, time of creation, and the like) that describes and/or provides information about the image displayed on the second electronic device, such as information about a function to be performed by the second electronic device in response to selection of a given element in the image. In some embodiments, the first electronic device enters the remote interaction mode with the second electronic device in response to receiving respective user input. For example, as described below, the first electronic device initializes the remote interaction mode with the second electronic device (or vice versa) in response to receiving one or more selections of a hardware button of the first electronic device. Additionally or alternatively, as described below, the first electronic device optionally initializes the remote interaction mode with the second electronic device in response to receiving selection of a pairing option displayed via the display generation component in communication with the first electronic device and/or the second electronic device. For example, as discussed below, the pairing option is displayed in a settings user interface (e.g., in a communications section of the setting user interface) and/or in a controls toolbar displayed on a home screen of the first electronic device and/or the second electronic device. In some embodiments, in response to receiving the data associated with displaying the image and the respective data corresponding to the image from the second electronic device, the first electronic device displays, via the display generation component in communication with the first electronic device, the image.

In some embodiments, while displaying, via the display generation component, the image (e.g., such as display of representation of the user interface 608' as shown in FIG. 6K), the first electronic device receives (704), via the one or more input devices, an input associated with the image (e.g., an input selecting a particular visual element in the image, wherein the image includes one or more visual selectable elements), such as selection input 603*w* in FIG. 6W. For example, while the first electronic device is displaying the image (e.g., a time of day user interface, an application user interface, and/or a home screen user interface), the first electronic device receives an input directed to the image. In some embodiments, the input is detected on a touch screen display of the first electronic device (e.g., on a location of the touch screen display that corresponds to a location of the image). In some embodiments, as described below, the first electronic device receives the input via external input devices in communication with the first electronic device while the first electronic device is in the remote interaction mode with the second electronic device. For example, the input is detected via a keyboard, mouse, or trackpad that is (e.g., wirelessly) connected to the first electronic device. In some embodiments, the second electronic device maintains display of the image while the first electronic device receives the input associated with the image. In some embodiments, the input associated with the image includes a selection input directed to (e.g., a portion of) the image displayed on the first electronic device. For example, the input corresponds to selection of an option/affordance associated with the image (e.g., displayed within and/or on the image). In some embodiments, the portions of the image (e.g., including options/affordances/elements displayed in the image) are associated with different operations, functions, applications, and/or controls. For example, selection of the options/affordances/elements displayed in the image (on the first electronic device or the second electronic device) cause the second electronic device to perform an action associated with the particular option/affordance/element selected, as discussed in more detail below. In some embodiments, the metadata corresponding to the image defines a command or instruction that is associated with the portion of the image that is selected. For example, the metadata defines the command or instruction that is transmitted by the first electronic device to the second electronic device, and thus the particular action that the second electronic device performs in response to the first electronic device receiving the selection input, as discussed in more detail below.

In some embodiments, in response to receiving the input (706), in accordance with a determination that the respective data is first data, the first electronic device performs (708) a first operation associated with the (e.g., particular visual element in the) image and the first data, such as selection of calendar user interface object 628c as shown in FIG. 6W. For example, in accordance with a determination that the metadata corresponding to the image is first metadata, the first electronic device performs a first type of operation. As described above, the image optionally is or includes a user interface (e.g., a time of day user interface, an application user interface, a home screen user interface, and the like). In some embodiments, the first data corresponding to the image includes data for performing the first operation, including activating one or more options displayed with the image. For example, while the first electronic device displays a user interface including one or more selectable options in the remote interaction mode, in response to receiving the input, the first electronic device activates one of the one or more selectable options in accordance with the input. In some embodiments, activation of the selectable option includes updating display of the image (e.g., the user interface) to include one or more additional selectable options and/or user interface elements (e.g., additional information, images, and/or icons). In some embodiments, activation of the selectable option includes displaying a new image associated with the selectable option (e.g., replacing display of the user interface with a different user interface associated with the selectable option, such as a respective application user interface associated with a respective application icon). In some embodiments, activation of the selectable option includes causing a corresponding operation involving the second electronic device to be performed. For example, the first electronic device causes the second electronic device to output audio, generate haptic feedback, and/or emit light in response to receiving the input. In some embodiments, in response to receiving the input, the first electronic device transmits data corresponding to the first operation to the second electronic device. As discussed above, in the remote interaction mode, the first electronic device and the second electronic device are optionally concurrently displaying the image when the first electronic device receives the input. As discussed below, when the first electronic device performs the first operation in response to receiving the input, the second electronic device optionally receives data (e.g., instructions) from the first electronic device that causes the second electronic device to also perform the first operation. In some embodiments, the second electronic device performs the first operation in real time (e.g., within a threshold amount of time, such as 0.005, 0.01, 0.05, 0.07, 0.1, 0.5. 0.75, 1, or 1.5 seconds, of the first electronic device performing the first operation). In some embodiments, in response to receiving the input, performing the first operation includes transmitting data (e.g., instructions) to the second electronic device, which causes the second electronic device to perform one of the operations described above involving the image. For example, when the first electronic device transmits instructions to the second electronic device, the instructions cause the second electronic device to perform one of the operations discussed above, which includes updating the image displayed on the second electronic device (and the first metadata corresponding to the image) and transmitting data associated with displaying the updated image and first metadata back to the first electronic device (e.g., in real time). The first electronic device then optionally updates display of the image displayed via the display generation component to correspond to the updated image (e.g., in real time). Accordingly, when input directed to the image is received at the first electronic device, the first electronic device uses the first metadata corresponding to the image to determine particular instructions to transmit to the second electronic device to cause the second electronic device to perform a corresponding operation involving the image.

In some embodiments, in accordance with a determination that the respective data is second data, the first electronic device performs (710) a second operation, different from the first operation, associated with the (e.g., particular visual element in the) image and the second data, such as selection of the image of flowers as shown in FIG. 6Y. For example, in accordance with a determination that the metadata corresponding to the image is second metadata, the first electronic device performs a second type of operation, different from the first type of operation. In some embodiments, the image optionally is or includes a user interface associated with an image viewing application. In some embodiments, the image (or a portion of the image) has the same appearance when the metadata is first metadata or second metadata. In some such embodiments, the metadata causes different operations to be performed when the portion of the image (e.g., the option/affordance/application icon) is selected. In some embodiments, the second data corresponding to the image includes data for performing the second operation, including updating display of the image to include one or more selectable options associated with the image. For example, while the first electronic device displays an image (e.g., a screenshot or representation) of a user interface in the remote interaction mode, in response to receiving the input, the first electronic device displays one of the one or more selectable options in accordance with the input. In some embodiments, the one or more selectable options are selectable to cause the first electronic device to perform one or more corresponding operations involving the image. For example, the one or more selectable options include an image editing option (e.g., for editing an appearance, size, shape, lighting, contrast, color, and/or sharpness of the image), a zooming in/out option, and/or a share option (e.g., for sharing via a text message, an email, or wireless transfer). In some embodiments, the input corresponds to selection of a scrolling option, and performing the second operation includes activating the scrolling operation displayed with the image. For example, the first electronic device updates display of the image of the user interface to scroll in a respective direction (e.g., an upward or downward direction) to reveal additional portions of the image. In some embodiments, the scrolling option is displayed because the respective data is the second data. In some embodiments, as similarly discussed above, in response to receiving the input, the first electronic device transmits data corresponding to the second operation to the second electronic device. As discussed below, when the first electronic device performs the second operation in response to receiving the input, the second electronic device receives data (e.g., instructions) from the first electronic device that causes the second electronic device to also perform the second operation. In some embodiments, the second electronic device performs the second operation in real time (e.g., within a threshold amount of time, such as 0.005, 0.01, 0.05, 0.07, 0.1, 0.5. 0.75, 1, or 1.5 seconds, of the first electronic device performing the second operation). In some embodiments, in response to receiving the input, performing the second operation includes transmitting data (e.g., instructions) to the second electronic device, which causes the second electronic device to perform one of the operations described above involving the image. For example, when the first electronic device transmits instructions to the second electronic device, the instructions cause the second electronic device to perform one of the operations discussed above, which includes updating the image displayed on the second electronic device (and the second metadata corresponding to the image) and transmitting data associated with displaying the updated image and second metadata back to the first electronic device (e.g., in real time). The first electronic device then optionally updates display of the image displayed via the display generation component to correspond to the updated image (e.g., in real time). Accordingly, when input directed to the image is received at the first electronic device, the first electronic device uses the second metadata corresponding to the image to determine particular instructions to transmit to the second electronic device to cause the second electronic device to perform a corresponding operation involving the image. Performing a respective operation involving an image displayed at a first electronic device based on data corresponding to the image transmitted from a second electronic device in communication with the first electronic device facilitates user input for and/or reduces the number of inputs needed for performing the respective operation involving the image displayed at the second electronic device, thereby improving user-device interaction.

In some embodiments, in response to receiving the input, in accordance with the determination that the respective data is the first data, performing the first operation includes transmitting, to the second electronic device, one or more first instructions that cause the second electronic device to perform a third operation associated with the image and the first data, such as display of user interface 637 on the second device 500b as shown in FIG. 6X. In some embodiments, in response to receiving the input, performing the first operation includes transmitting data (e.g., instructions) to the second electronic device, which causes the second electronic device to perform one of the operations described above involving the image. For example, when the first electronic device transmits one or more first instructions to the second electronic device, the one or more first instructions cause the second electronic device to update the image displayed on the second electronic device (and the first metadata corresponding to the image). In some embodiments, the one or more instructions cause the second electronic device to update the image displayed on the second electronic device in a similar manner as if the second electronic device itself had received the input. In some embodiments, the third operation includes concurrently displaying one or more selectable options with the image via a display of the second electronic device. In some embodiments, the third operation includes displaying one or more user interface elements (e.g., additional information, images, and/or selectable icons) at the second electronic device. In some embodiments, the third operation includes displaying a new image at the second electronic device (e.g., replacing display of the user interface displayed when the first input was received with a different user interface, such as a respective application user interface associated with a respective application icon). In some embodiments, performing the third operation includes outputting audio, generating haptic feedback, and/ or emitting light at the second electronic device.

In some embodiments, in accordance with the determination that the respective data is the second data, performing the second operation includes transmitting, to the second electronic device, one or more second instructions that cause the second electronic device to perform a fourth operation associated with the image and the second data, such as display of user interface objects 651-1-651-3 on the second device 500b as shown in FIG. 6Z. In some embodiments, in response to receiving the input, performing the second operation includes transmitting data (e.g., instructions) to the second electronic device, which causes the second electronic device to perform one of the operations described above involving the image. For example, when the first electronic device transmits one or more second instructions to the second electronic device, the one or more second instructions cause the second electronic device to update the image displayed on the second electronic device (and the second metadata corresponding to the image). In some embodiments, the one or more instructions cause the second electronic device to update the image displayed on the second electronic device in a similar manner as if the second electronic device itself had received the input. In some embodiments, the fourth operation includes displaying one or more selectable options associated with the image on the second electronic device. In some embodiments, the one or more selectable options are selectable to cause the second electronic device to perform one or more corresponding operations involving the image. In some embodiments, the fourth operation includes activating a scrolling option displayed with the image. For example, the first electronic device updates display of the image of the user interface to scroll in a respective direction (e.g., an upward or downward direction) to reveal additional portions of the image. Performing a respective operation involving an image displayed at a first electronic device based on data corresponding to the image transmitted from a second electronic device in communication with the first electronic device facilitates user input for and/or reduces the number of inputs needed for performing the respective operation involving the image displayed at the second electronic device, thereby improving user-device interaction.

In some embodiments, the second electronic device includes a hardware input device (e.g., a hardware button, rotating dial or switch), such as physical button 643 of the second device 500*b* in FIG. 6M. In some embodiments, while in the remote interaction mode, the first electronic device concurrently displays, via the display generation component, a representation of the hardware input device of the second electronic device with the image, such as display of representation of the physical button 643' on the first device 500*a* as shown in FIG. 6M. For example, the image of the user interface that is displayed on the second electronic device is concurrently displayed with a representation of the hardware input device on the first electronic device. In some embodiments, while in the remote interaction mode with the second electronic device, the first electronic device displays a representation of the second electronic device including the image and the hardware input device of the second electronic device at their appropriate and respective locations on the second electronic device. In some embodiments, the hardware input device is integrated with a housing of the second electronic device. In some embodiments, the hardware input device has a housing that is separate from the housing of the second electronic device and is in communication with the second electronic device.

In some embodiments, while concurrently displaying the representation of the hardware input device with the image, the first electronic device receives, via the one or more input devices, a second input directed to the representation of the hardware input device, such as scrolling input 603*m* directed to the representation of the physical button 643' as shown in FIG. 6M or selection input 603*s* directed to the representation of the physical buttons 643' as shown in FIG. 6T. For example, the first electronic device detects an interaction input directed to the representation of the hardware input device displayed on the first electronic device. In some embodiments, the first electronic device detects a selection input and/or movement input directed toward the representation of the hardware input device, as described below.

In some embodiments, in response to receiving the second input, in accordance with a determination that the second input corresponds to a first interaction with the hardware input device, the first electronic device transmits, to the second electronic device, one or more first instructions that cause the second electronic device to perform a third operation associated with the first interaction with the hardware input device, such as scrolling through user interface 631 displayed on the second device 500*b* as shown in FIG. 6N. For example, if the first electronic device determines that the second input corresponds to a first interaction with the hardware input device, such as a selection input (e.g., a touch or tap) on the representation of the hardware input device that corresponds to a button press of the hardware input device, the first electronic device transmits data to the second electronic device to perform an operation associated with the button press. In some embodiments, if the first electronic device determines that the second input includes a tap and hold (e.g., for a threshold amount of time, such as 0.5, 1, 1.5, 2, 2.5, 3, 4, or 5 seconds) on the representation of the hardware input device, the first electronic device transmits data to the second electronic device to perform an operation associated with the tap and hold. In some embodiments, the one or more first instructions cause the second electronic device to update the image displayed on the second electronic device in a similar manner as if the second electronic device itself had received the second input corresponding to the first interaction with the hardware input device. In some embodiments, if the image displayed on the second electronic device includes a user interface of a respective application operating on the second electronic device, the third operation includes navigating away from the user interface (e.g., and redisplaying a home-screen user interface, such as a watch user interface). In some embodiments, as similarly described above, when the second electronic device performs the third operation, the second electronic device transmits data (e.g., instructions) back to the first electronic device that causes the first electronic device to update display of the image in accordance with the third operation. Performing a respective operation associated with a hardware input device of a first electronic device involving an image displayed at the first electronic device based on data corresponding to an interaction with a representation of the hardware input device transmitted from a second electronic device in communication with the first electronic device facilitates user input for and/or reduces the number of inputs needed for performing the respective operation involving the image displayed at the second electronic device, thereby improving user-device interaction.

In some embodiments, in response to receiving the second input, in accordance with a determination that the second input corresponds to a second interaction with the hardware input device, the first electronic device transmits, to the second electronic device, one or more second instructions that cause the second electronic device to perform a fourth operation, different from the third operation, associated with the second interaction with the hardware input device, such as redisplay of watch screen user interface 608 on the second device 500*b* as shown in FIG. 6U. For example, if the first electronic device determines that the second input corresponds to a second interaction with the hardware input device, such as a scrolling/swiping input on the representation of the hardware input device that corresponds to a twist/rotation/scroll/movement of the hardware input device, the first electronic device transmits data to the second electronic device to perform an operation associated with the twist/rotation/scroll/movement. In some embodiments, if the image displayed on the second electronic device includes a user interface of a respective application operating on the second electronic device, the third operation includes scrolling in the user interface (e.g., and displaying additional portions of the user interface in accordance with a magnitude and direction of the scrolling). In some embodiments, as similarly described above, when the second electronic device performs the third operation, the second electronic device transmits data (e.g., instructions) back to the first electronic device that causes the first electronic device to update display of the image in accordance with the third operation. Performing a respective operation associated with a hardware input device of a first electronic device involving an image displayed at the first electronic device based on data corresponding to an interaction with a representation of the hardware input device transmitted from a second electronic device in communication with the first electronic device facilitates user input for and/or reduces the number of inputs needed for performing the respective operation involving the image displayed at the second electronic device, thereby improving user-device interaction.

In some embodiments, while not operating in the remote interaction mode with the second electronic device, the first electronic device detects, via the one or more input devices, a respective input corresponding to a request to initialize the remote interaction mode with the second electronic device, such as selection input 603*j* directed to selectable option 629 as shown in FIG. 6J. For example, before the first electronic device is in the remote interaction mode with the second electronic device, the first electronic device detects input for initialization of the remote interaction mode with the second electronic device (e.g., actively communicating with the second electronic device). As described in more detail below, the respective input includes interaction with one or more controls of the first electronic device and/or user interface elements displayed on the first electronic device.

In some embodiments, in response to detecting the respective input, the first electronic device transmits, to the second electronic device, an indication of the initialization of the remote interaction mode with the second electronic device, wherein the indication causes the second electronic device to display a first user interface object corresponding to the indication, such as display of user interface object 613 on the second device 500*b* as shown in FIG. 6J. For example, when the first electronic device initializes the remote interaction mode with the second electronic device, the first electronic device transmits the indication to the second electronic device. In some embodiments, in response to receiving the indication, the second electronic device displays a user interface object indicating that the remote interaction mode has been initialized. For example, the user interface object is an indication of a notification of the initialization of the remote interaction mode. In some embodiments, the user interface object includes information and/or visual indicators that indicate (e.g., convey) that the remote interaction mode has been initialized. In some embodiments, the user interface object is not displayed on the second electronic device for a duration of the remote interaction mode (e.g., the second electronic device ceases display of the user interface object after a predefined period of time, such as 0.75, 1, 1.5, 2, 3, 4, 5, 8, or 10 seconds). Displaying a user interface object indicating that a remote interaction mode has been initialized between a first electronic device and a second electronic device facilitates discovery that the initialization of the interaction mode was successful and/or facilitates user input for interacting with content while in the remote interaction mode, thereby improving user-device interaction.

In some embodiments, while the first electronic device operates in the remote interaction mode with the second electronic device, the second electronic device displays a second visual indication indicating that the first electronic device is in the remote interaction mode with the second electronic device, such as display of visual indication 647 on the second device 500*b* as shown in FIG. 6K. For example, when the first electronic device transmits the indication of the initialization of the remote interaction mode with the second electronic device, the first electronic device transmits instructions that cause the second electronic device to also display the visual indication. In some embodiments, while in the remote interaction mode, the second electronic device displays the second visual indication along a border of the display of the second electronic device. For example, the second electronic device displays a band having respective characteristics (e.g., color, thickness, opacity, and/or brightness) along the edges of the display of the second electronic device (e.g., around the image displayed on the second electronic device) that indicates that the first electronic device is currently in the remote interaction mode with the second electronic device. In some embodiments, the second visual indication remains displayed on the second electronic device even as the image is updated on the second electronic device in response to user input received at the first electronic device. In some embodiments, the second electronic device ceases display of the first user interface object when the visual indication is displayed. For example, the first electronic device transmits instructions to the second electronic device that causes the second electronic device to cease displaying the first user interface object (e.g., the notification indicating that the remote interaction mode has been initialized) after a predetermined time threshold (e.g., 0.75, 1, 1.5, 2, 3, 4, 5, 8, or 10 seconds) has passed. In some embodiments, the second user interface object is displayed for the duration that the first electronic device is in the remote interaction mode with the second electronic device. In some embodiments, in accordance with a determination that the first electronic device is no longer in the remote interaction mode with the second electronic device (e.g., due to user input corresponding to a request to exit the remote interaction mode), the second electronic device ceases display of the second user interface object. Displaying a visual indication indicating that a first electronic device is in a remote interaction mode with a second electronic device facilitates discovery that the remote interaction mode is active and/or facilitates user input for interacting with content while in the remote interaction mode, thereby improving user-device interaction.

In some embodiments, the image includes a user interface region (e.g., a text-entry region within a user interface that is associated with a respective application operating on the second electronic device, such as a messaging application, a web browsing application, and/or a text composition application), such as user interface 631 displayed on the second device 500*b* in FIG. 6Q. In some embodiments, while displaying the image, the first electronic device receives, via the one or more input devices, a second input corresponding to a request to input text into the user interface region, such as selection input 603*p* directed to representation of selectable option 633-2' on the first device 500*a* as shown in FIG. 6P. For example, the first electronic device detects a selection input directed to the user interface region. In some embodiments, the first electronic device detects selection of an input option (e.g., associated with the user interface region and/or displayed proximate to the user interface region) for initiating a process for inputting text into the user interface region.

In some embodiments, in response to receiving the second input, the first electronic device displays, via the display generation component, a keyboard (e.g., keyboard 617 in FIG. 6R) for inputting text into the user interface region (e.g., displayed by the second electronic device). For example, the keyboard is associated with the respective application that is providing display of the user interface region, an operating system of the first electronic device, and/or an operating system of the second electronic device.

In some embodiments, the first electronic device transmits, to the second electronic device, one or more first instructions that cause the second electronic device to display a keyboard (e.g., keyboard 618 in FIG. 6R) for inputting text into the user interface region. In some embodiments, the keyboard displayed on the first electronic device corresponds to the keyboard displayed on the second electronic device. For example, the keyboards have the same appearance (e.g., same arrangement of keys on the keyboard, same color, same size, same proportions, same color, and/or same selectable options (e.g., for inserting images and/or files into the user interface region)). In some embodiments, the keyboard displayed on the first electronic device does not correspond to the keyboard on the second electronic device. For example, the keyboard displayed on the first electronic device is associated with the operating system of the first electronic device and thus has a different appearance from the keyboard displayed on the second electronic device, which is associated with the operating system of the second electronic device. In some embodiments, the keyboards are concurrently displayed on the first electronic device and the second electronic device.

In some embodiments, while displaying the keyboard, the first electronic device receives, via the one or more input devices, selection of one or more keys of the keyboard, such as selection input 603*q* in FIG. 6Q. For example, the first electronic device detects selection input (e.g., series of taps or touches) directed to one or more keys on the keyboard displayed by the first electronic device.

In some embodiments, in response to receiving the selection of the one or more keys, the first electronic device transmits, to the second electronic device, one or more second instructions corresponding to the selection of the one or more keys that cause the second electronic device to display the selected one or more characters (e.g., the selected letters, numbers, punctuation marks, whitespace, and/or special characters) in the user interface region, such as display of characters 611-1 on the second device 500*b* as shown in FIG. 6S. For example, the one or more characters corresponding to the one or more selected keys are concurrently displayed in the user interface regions displayed on the first electronic device and the second electronic device. In some embodiments, if the keyboards displayed on the first electronic device and the second electronic device are different, as discussed above, the one or more characters displayed in the user interface region on the first electronic device and the second electronic device are still the same. Displaying characters on a first electronic device and a second electronic device while the first electronic device is in communication with the second electronic device in response to user input on a keyboard displayed on the first electronic device facilitates user input for providing characters on the second electronic device in response to the keyboard of the first electronic device and/or facilitates discovery that characters can be provided on the second electronic device using the keyboard of the first electronic device, thereby improving user-device interaction.

In some embodiments, while in the remote interaction mode with the second electronic device and while operating in a respective control mode (e.g., a control/accessibility mode for assisting the user with effectively using the first electronic device), as described with reference to FIG. 6AA, the first electronic device receives, via the one or more input devices, a second input corresponding to selection of a user interface element of the image using the respective control mode, such as input 603-2 in FIG. 6BB. For example, as similarly discussed above, the image displayed on the first electronic device includes a selectable option for causing an operation involving the image to be performed. In some embodiments, while in the respective control mode, the electronic device detects an interaction input selecting the user interface element. In some embodiments, the accessibility/control mode is a mode in which, in response to a user input, the electronic device presents audio descriptions of user interface elements (e.g., the user interface element selected by or corresponding to the user input). In some embodiments, while the accessibility mode is active, in response to a secondary selection input of a user interface element, the electronic device presents spoken audio describing the user interface element without selecting the user interface element. For example, as discussed below, the electronic device detects a predefined gesture or detects the second input via an external input device in communication with the first electronic device. For example, in response to a three-contact tap on a user interface element displayed on a touch screen, the electronic device presents an audio description of the user interface element without selecting the user interface element and in response to a one-contact tap on a user interface element displayed on a touch screen, the electronic device selects the user interface element.

In some embodiments, in response to receiving the second input, the first electronic device performs a third operation corresponding to the selection of the user interface element using the respective control mode, such as selection of user interface object 628 on the second device 500*b* as shown in FIG. 6BB. For example, the first electronic device updates display of the image according to the third operation (e.g., such as one of the operations described above, including displaying additional selectable options, displaying a new user interface, and/or displaying additional portions of the user interface). Performing a respective operation involving an image displayed at a first electronic device based on data corresponding to the image transmitted from a second electronic device in communication with the first electronic device while the first electronic device is in an assistive control mode facilitates user input for and/or reduces the number of inputs needed for performing the respective operation involving the image displayed at the second electronic device using the assistive control mode of the first electronic device, thereby improving user-device interaction.

In some embodiments, the respective control mode corresponds to an audio output mode (e.g., a voice over assistive mode). In some embodiments, the second input corresponds to a secondary selection of the user interface element using the respective control mode, such as movement of cursor 659 on the first device 500*a* as shown in FIG. 6BB. For example, the secondary selection corresponds to a request to output audio corresponding to (e.g., providing information about) the user interface element, rather than a selection of the user interface element. In some embodiments, performing the third operation includes presenting an audio output (e.g., audio output 653 in FIG. 6CC) corresponding to the user interface element without transmitting, to the second electronic device, one or more instructions that cause the second device to perform a fourth operation corresponding to selection of the user interface element. For example, the first electronic device outputs the audio providing information about (e.g., identifying) the user interface element without selecting the user interface element, which causes the fourth operation to be performed.

In some embodiments, the first electronic device receives, via the one or more input devices, a third input corresponding to primary selection of the user interface element, such as selection 603-2 in FIG. 6BB. For example, the first electronic device receives a selection of the user interface element after the first electronic device outputs the audio corresponding to the user interface element. In some embodiments, the third input is different from the second input. For example, the second input includes a first type of gesture (e.g., a triple tap detected on the touch sensitive surface (e.g., touch screen) of the first electronic device) and the third input includes a second type of gesture (e.g., a double tap or single tap), different from the first type of gesture.

In some embodiments, in response to receiving the third input, the first electronic device transmits, to the second electronic device, the one or more instructions that cause the second device to perform the fourth operation, such as display of user interface 660 on the second device 500b as shown in FIG. 6CC. For example, the second electronic device updates display of the image according to the fourth operation (e.g., such as one of the operations described above, including displaying additional selectable options, displaying a new user interface, and/or displaying additional portions of the user interface). Performing a respective operation involving an image displayed at a first electronic device based on data corresponding to the image transmitted from a second electronic device in communication with the first electronic device while the first electronic device is in an audio assistive control mode facilitates user input for and/or reduces the number of inputs needed for performing the respective operation involving the image displayed at the second electronic device using the audio assistive control mode of the first electronic device, thereby improving user-device interaction.

In some embodiments, the one or more input devices include a switch input device (e.g., an external input device, such as a switch device or a controller device in communication with the first electronic device while the first electronic device operates in a switch control assistive mode, or an integrated input device, such as the touch screen of the first electronic device), such as input device 560 in FIG. 6AA. In some embodiments, the second input is associated with the switch input device (e.g., the second input is detected via one or more hardware buttons and/or switches of the switch input device, or at a particular location on the touch screen of the first electronic device), such as detection of selection input 603-2 on a touch-sensitive surface of input device 560. In some embodiments, using the accessibility mode, the first electronic device chronologically visually emphasizes (e.g., highlights) user interface elements displayed in the image (e.g., the user interface). When a respective user interface element is visually emphasized, the user interface element is selected using the switch input device. In some embodiments, the first electronic device displays a menu element including one or more selectable options for performing one or more respective operations involving the user interface element previously selected. For example, the first electronic device chronologically visually emphasizes the one or more selectable options, which are able to be selected using the switch input device for causing the second electronic device to perform a selection of the user interface element.

In some embodiments, performing the third operation corresponding to the selection of the user interface element using the respective control mode includes transmitting, to the second electronic device, one or more instructions that cause the second device to perform a fourth operation corresponding to selection of the user interface element, such as display of user interface 660 on the second device 500b as shown in FIG. 6CC. For example, the second electronic device updates display of the image according to the fourth operation (e.g., such as one of the operations described above, including displaying additional selectable options, displaying a new user interface, and/or displaying additional portions of the user interface) in response to receiving the second input using the switch input device. In some embodiments, the second electronic device would perform the fourth operation if the first electronic device received a selection input not using the respective control mode (e.g., a tap) directed to the user interface element (e.g., similar to or same as the first input described above) displayed on the first electronic device. In some embodiments, the second electronic device would perform the fourth operation if the second electronic device received a selection input directed to the user interface element displayed on the second electronic device using an input device of the second electronic device (e.g., a touch screen of the second electronic device). Performing a respective operation involving an image displayed at a first electronic device based on data corresponding to the image transmitted from a second electronic device in communication with the first electronic device while the first electronic device is in a switch control assistive mode facilitates user input for and/or reduces the number of inputs needed for performing the respective operation involving the image displayed at the second electronic device using the switch control assistive mode of the first electronic device, thereby improving user-device interaction.

In some embodiments, the one or more input devices include a hardware input device (e.g., an external keyboard, trackpad, and/or mouse in communication with the first electronic device, such as paired with the first electronic device via Bluetooth. In some embodiments, the hardware input device is directly paired with and/or in communication with the first electronic device, but is not directly paired with and/or in communication with the second electronic device), such as input device 560 in FIG. 6AA, and the input associated with the image is detected via the hardware input device, such as selection input 603-2 in FIG. 6BB. For example, the input includes interaction with (e.g., selection and/or movement of) a key or button of the hardware input device. Accordingly, when input directed to the image is received via the hardware input device in communication with the first electronic device, the first electronic device transmits instructions to the second electronic device that cause the second electronic device to perform a corresponding operation involving the image. Performing a respective operation involving an image displayed at a first electronic device based on data corresponding to the image transmitted from a second electronic device in communication with the first electronic device in response to input received via a hardware input device facilitates user input for and/or enables the hardware input device to be used for performing the respective operation involving the image displayed at the second electronic device, thereby improving user-device interaction.

In some embodiments, while not operating in the remote interaction mode with the second electronic device (e.g., before the first electronic device is in the remote interaction mode with the second electronic device), the first electronic device detects, via the one or more input devices, a respective input corresponding to a request to initiate the remote interaction mode with the second electronic device, such as selection input 603d directed to selectable option 624-1 as shown in FIG. 6D. For example, the remote interaction mode is initiated from the first electronic device (e.g., and optionally, not from the second electronic device). In some embodiments, the respective input includes a series of inputs navigating through one or more settings user interfaces of the first electronic device, through which the first electronic device is caused to communicate with the second electronic device (e.g., in response to selection of a pairing option displayed on one of the settings user interfaces). In some embodiments, the respective input includes interaction with a shortcut user interface (e.g., a controls user interface) of the first electronic device. For example, the first electronic device receives selection of a selectable option displayed in the shortcut user interface that corresponds to the request to initiate the remote interaction mode. In some embodiments, the respective input includes a sequence of inputs directed to a hardware input device (e.g., a button or switch) of the first electronic device. For example, the first electronic device receives a predefined sequence of inputs (e.g., a plurality of selections (e.g., a triple press)) directed to a first button (e.g., a power button) of the first electronic device that corresponds to the request to initiate the remote interaction mode with the second electronic device. In some embodiments, in response to detecting a different input directed to the first button, such as a single press of the first button, the electronic device toggles a sleep/wake state of the display generation component in communication with the first electronic device.

In some embodiments, in response to detecting the respective input, the first electronic device initiates the remote interaction mode with the second electronic device, as represented by display of user interface 619 as shown in FIG. 6E. In some embodiments, the first electronic device displays a user interface that provides information regarding the initiation of the remote interaction mode (e.g., a confirmation user interface indicating that the first electronic device is in communication with the second electronic device). In some embodiments, the first electronic device displays an option that is selectable to launch the remote interaction mode with the second electronic device, which causes the image displayed at the second electronic device to also be displayed at the first electronic device. In some embodiments, the second electronic device does not receive an input corresponding to the request to initiate the remote interaction mode with the first electronic device. Initiating a remote interaction mode between a first electronic device and a second electronic device in response to input received at the first electronic device avoids unintentional and/or unwanted initiation of the remote interaction mode between the first electronic device and the second electronic device and/or reduces the number of inputs needed to initialize the remote interaction mode, thereby improving user-device interaction.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, receiving operation 704 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, determining the current location of an electronic device enables the electronic device to discover other electronic device near its vicinity. Accordingly, use of such personal information data enables users to view information that is relevant to them. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to enable location services that determine the location of the electronic device and/or locations of other electronic devices.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at first electronic device in communication with a display generation component, one or more input devices, and a second electronic device:
while in a remote interaction mode with the second electronic device, receiving, via the one or more input devices, data associated with displaying an image and respective data corresponding to the image from the second electronic device, wherein the image is currently displayed via the second electronic device;
while displaying, via the display generation component, the image, receiving, via the one or more input devices, an input associated with the image; and
in response to receiving the input:
in accordance with a determination that the respective data is first data, performing a first operation associated with the image and the first data; and
in accordance with a determination that the respective data is second data, performing a second operation, different from the first operation, associated with the image and the second data.

2. The method of claim 1, wherein:
in response to receiving the input:
in accordance with the determination that the respective data is the first data, performing the first operation includes transmitting, to the second electronic device, one or more first instructions that cause the second electronic device to perform a third operation associated with the image and the first data; and
in accordance with the determination that the respective data is the second data, performing the second operation includes transmitting, to the second electronic device, one or more second instructions that cause the second electronic device to perform a fourth operation associated with the image and the second data.

3. The method of claim 1, wherein the second electronic device includes a hardware input device, the method further comprising:
while in the remote interaction mode, concurrently displaying, via the display generation component, a representation of the hardware input device of the second electronic device with the image;
while concurrently displaying the representation of the hardware input device with the image, receiving, via the one or more input devices, a second input directed to the representation of the hardware input device; and
in response to receiving the second input:
in accordance with a determination that the second input corresponds to a first interaction with the hardware input device, transmitting, to the second electronic device, one or more first instructions that cause the second electronic device to perform a third operation associated with the first interaction with the hardware input device.

4. The method of claim 3, further comprising:
in response to receiving the second input:
in accordance with a determination that the second input corresponds to a second interaction with the hardware input device, transmitting, to the second electronic device, one or more second instructions that cause the second electronic device to perform a fourth operation, different from the third operation, associated with the second interaction with the hardware input device.

5. The method of claim 1, further comprising:
while not operating in the remote interaction mode with the second electronic device, detecting, via the one or more input devices, a respective input corresponding to a request to initialize the remote interaction mode with the second electronic device; and
in response to detecting the respective input:
transmitting, to the second electronic device, an indication of the initialization of the remote interaction mode with the second electronic device, wherein the indication causes the second electronic device to display a first user interface object corresponding to the indication.

6. The method of claim 5, wherein:
while the first electronic device operates in the remote interaction mode with the second electronic device, the second electronic device displays a second visual indication indicating that the first electronic device is in the remote interaction mode with the second electronic device.

7. The method of claim 1, wherein the image includes a user interface region, the method further comprising:
- while displaying the image, receiving, via the one or more input devices, a second input corresponding to a request to input text into the user interface region;
- in response to receiving the second input:
  - displaying, via the display generation component, a keyboard for inputting text into the user interface region; and
  - transmitting, to the second electronic device, one or more first instructions that cause the second electronic device to display a keyboard for inputting text into the user interface region;
- while displaying the keyboard, receiving, via the one or more input devices, selection of one or more keys of the keyboard; and
- in response to receiving the selection of the one or more keys:
  - transmitting, to the second electronic device, one or more second instructions corresponding to the selection of the one or more keys that cause the second electronic device to display selected one or more characters in the user interface region.

8. The method of claim 1, further comprising:
- while in the remote interaction mode with the second electronic device and while operating in a respective control mode, receiving, via the one or more input devices, a second input corresponding to selection of a user interface element of the image using the respective control mode; and
- in response to receiving the second input:
  - performing a third operation corresponding to the selection of the user interface element using the respective control mode.

9. The method of claim 8, wherein:
- the respective control mode corresponds to an audio output mode,
- the second input corresponds to a secondary selection of the user interface element using the respective control mode,
- performing the third operation includes presenting an audio output corresponding to the user interface element without transmitting, to the second electronic device, one or more instructions that cause the second electronic device to perform a fourth operation corresponding to selection of the user interface element, and
- the method further comprises:
  - receiving, via the one or more input devices, a third input corresponding to primary selection of the user interface element; and
  - in response to receiving the third input, transmitting, to the second electronic device, the one or more instructions that cause the second electronic device to perform the fourth operation.

10. The method of claim 8, wherein:
- the one or more input devices include a switch input device,
- the second input is associated with the switch input device, and
- performing the third operation corresponding to the selection of the user interface element using the respective control mode includes transmitting, to the second electronic device, one or more instructions that cause the second electronic device to perform a fourth operation corresponding to selection of the user interface element.

11. The method of claim 1, wherein the one or more input devices include a hardware input device, and the input associated with the image is detected via the hardware input device.

12. The method of claim 1, further comprising:
- while not operating in the remote interaction mode with the second electronic device, detecting, via the one or more input devices, a respective input corresponding to a request to initiate the remote interaction mode with the second electronic device; and
- in response to detecting the respective input:
  - initiating the remote interaction mode with the second electronic device.

13. A first electronic device, comprising:
- one or more processors;
- memory; and
- one or more programs, wherein the one or more programs are stored in the memory and configured to be executed by the one or more processors, the one or more programs including instructions for:
  - while in a remote interaction mode with a second electronic device, receiving, via one or more input devices, data associated with displaying an image and respective data corresponding to the image from the second electronic device, wherein the image is currently displayed via the second electronic device;
  - while displaying, via a display generation component, the image, receiving, via one or more input devices, an input associated with the image; and
  - in response to receiving the input:
    - in accordance with a determination that the respective data is first data, performing a first operation associated with the image and the first data; and
    - in accordance with a determination that the respective data is second data, performing a second operation, different from the first operation, associated with the image and the second data.

14. The first electronic device of claim 13, wherein:
- in response to receiving the input:
  - in accordance with the determination that the respective data is the first data, performing the first operation includes transmitting, to the second electronic device, one or more first instructions that cause the second electronic device to perform a third operation associated with the image and the first data; and
  - in accordance with the determination that the respective data is the second data, performing the second operation includes transmitting, to the second electronic device, one or more second instructions that cause the second electronic device to perform a fourth operation associated with the image and the second data.

15. The first electronic device of claim 13, wherein the second electronic device includes a hardware input device, the one or more programs further including instructions for:
- while in the remote interaction mode, concurrently displaying, via the display generation component, a representation of the hardware input device of the second electronic device with the image;
- while concurrently displaying the representation of the hardware input device with the image, receiving, via the one or more input devices, a second input directed to the representation of the hardware input device; and
- in response to receiving the second input:
  - in accordance with a determination that the second input corresponds to a first interaction with the hardware input device, transmitting, to the second electronic device, one or more first instructions that cause the second electronic device to perform a third operation associated with the first interaction with the hardware input device.

16. The first electronic device of claim 15, wherein the one or more programs further include instructions for:
in response to receiving the second input:
in accordance with a determination that the second input corresponds to a second interaction with the hardware input device, transmitting, to the second electronic device, one or more second instructions that cause the second electronic device to perform a fourth operation, different from the third operation, associated with the second interaction with the hardware input device.

17. The first electronic device of claim 13, wherein the one or more programs further include instructions for:
while not operating in the remote interaction mode with the second electronic device, detecting, via the one or more input devices, a respective input corresponding to a request to initialize the remote interaction mode with the second electronic device; and
in response to detecting the respective input:
transmitting, to the second electronic device, an indication of the initialization of the remote interaction mode with the second electronic device, wherein the indication causes the second electronic device to display a first user interface object corresponding to the indication.

18. The first electronic device of claim 17, wherein:
while the first electronic device operates in the remote interaction mode with the second electronic device, the second electronic device displays a second visual indication indicating that the first electronic device is in the remote interaction mode with the second electronic device.

19. The first electronic device of claim 13, wherein the image includes a user interface region, the one or more programs further including instructions for:
while displaying the image, receiving, via the one or more input devices, a second input corresponding to a request to input text into the user interface region;
in response to receiving the second input:
displaying, via the display generation component, a keyboard for inputting text into the user interface region; and
transmitting, to the second electronic device, one or more first instructions that cause the second electronic device to display a keyboard for inputting text into the user interface region;
while displaying the keyboard, receiving, via the one or more input devices, selection of one or more keys of the keyboard; and
in response to receiving the selection of the one or more keys:
transmitting, to the second electronic device, one or more second instructions corresponding to the selection of the one or more keys that cause the second electronic device to display selected one or more characters in the user interface region.

20. The first electronic device of claim 13, wherein the one or more programs further include instructions for:
while in the remote interaction mode with the second electronic device and while operating in a respective control mode, receiving, via the one or more input devices, a second input corresponding to selection of a user interface element of the image using the respective control mode; and
in response to receiving the second input:
performing a third operation corresponding to the selection of the user interface element using the respective control mode.

21. The first electronic device of claim 20, wherein:
the respective control mode corresponds to an audio output mode,
the second input corresponds to a secondary selection of the user interface element using the respective control mode,
performing the third operation includes presenting an audio output corresponding to the user interface element without transmitting, to the second electronic device, one or more instructions that cause the second electronic device to perform a fourth operation corresponding to selection of the user interface element, and
the one or more programs further include instructions for:
receiving, via the one or more input devices, a third input corresponding to primary selection of the user interface element; and
in response to receiving the third input, transmitting, to the second electronic device, the one or more instructions that cause the second electronic device to perform the fourth operation.

22. The first electronic device of claim 20, wherein:
the one or more input devices include a switch input device,
the second input is associated with the switch input device, and
performing the third operation corresponding to the selection of the user interface element using the respective control mode includes transmitting, to the second electronic device, one or more instructions that cause the second electronic device to perform a fourth operation corresponding to selection of the user interface element.

23. The first electronic device of claim 13, wherein the one or more input devices include a hardware input device, and the input associated with the image is detected via the hardware input device.

24. The first electronic device of claim 13, wherein the one or more programs further include instructions for:
while not operating in the remote interaction mode with the second electronic device, detecting, via the one or more input devices, a respective input corresponding to a request to initiate the remote interaction mode with the second electronic device; and
in response to detecting the respective input:
initiating the remote interaction mode with the second electronic device.

25. A non-transitory computer readable storage medium storing one or more programs, the one or more programs comprising instructions, which when executed by one or more processors of a first electronic device, cause the first electronic device to:
while in a remote interaction mode with a second electronic device, receive, via one or more input devices, data associated with displaying an image and respective data corresponding to the image from the second electronic device, wherein the image is currently displayed via the second electronic device;
while displaying, via a display generation component, the image, receive, via one or more input devices, an input associated with the image; and in response to receiving the input:
in accordance with a determination that the respective data is first data, perform a first operation associated with the image and the first data; and
in accordance with a determination that the respective data is second data, perform a second operation, different from the first operation, associated with the image and the second data.

26. The non-transitory computer readable storage medium of claim 25, wherein:
in response to receiving the input:
in accordance with the determination that the respective data is the first data, performing the first operation includes transmitting, to the second electronic device, one or more first instructions that cause the second electronic device to perform a third operation associated with the image and the first data; and
in accordance with the determination that the respective data is the second data, performing the second operation includes transmitting, to the second electronic device, one or more second instructions that cause the second electronic device to perform a fourth operation associated with the image and the second data.

27. The non-transitory computer readable storage medium of claim 25, wherein the second electronic device includes a hardware input device, the instructions further causing the first electronic device to:
while in the remote interaction mode, concurrently display, via the display generation component, a representation of the hardware input device of the second electronic device with the image;
while concurrently displaying the representation of the hardware input device with the image, receive, via the one or more input devices, a second input directed to the representation of the hardware input device; and
in response to receiving the second input:
in accordance with a determination that the second input corresponds to a first interaction with the hardware input device, transmit, to the second electronic device, one or more first instructions that cause the second electronic device to perform a third operation associated with the first interaction with the hardware input device.

28. The non-transitory computer readable storage medium of claim 27, wherein the instructions further cause the first electronic device to:
in response to receiving the second input:
in accordance with a determination that the second input corresponds to a second interaction with the hardware input device, transmit, to the second electronic device, one or more second instructions that cause the second electronic device to perform a fourth operation, different from the third operation, associated with the second interaction with the hardware input device.

29. The non-transitory computer readable storage medium of claim 25, wherein the instructions further cause the first electronic device to:
while not operating in the remote interaction mode with the second electronic device, detect, via the one or more input devices, a respective input corresponding to a request to initialize the remote interaction mode with the second electronic device; and
in response to detecting the respective input:
transmit, to the second electronic device, an indication of the initialization of the remote interaction mode with the second electronic device, wherein the indication causes the second electronic device to display a first user interface object corresponding to the indication.

30. The non-transitory computer readable storage medium of claim 29, wherein:
while the first electronic device operates in the remote interaction mode with the second electronic device, the second electronic device displays a second visual indication indicating that the first electronic device is in the remote interaction mode with the second electronic device.

31. The non-transitory computer readable storage medium of claim 25, wherein the image includes a user interface region, the instructions further causing the first electronic device to:
while displaying the image, receive, via the one or more input devices, a second input corresponding to a request to input text into the user interface region;
in response to receiving the second input:
display, via the display generation component, a keyboard for inputting text into the user interface region; and
transmit, to the second electronic device, one or more first instructions that cause the second electronic device to display a keyboard for inputting text into the user interface region;
while displaying the keyboard, receive, via the one or more input devices, selection of one or more keys of the keyboard; and
in response to receiving the selection of the one or more keys:
transmit, to the second electronic device, one or more second instructions corresponding to the selection of the one or more keys that cause the second electronic device to display selected one or more characters in the user interface region.

32. The non-transitory computer readable storage medium of claim 25, wherein the instructions further cause the first electronic device to:
while in the remote interaction mode with the second electronic device and while operating in a respective control mode, receive, via the one or more input devices, a second input corresponding to selection of a user interface element of the image using the respective control mode; and
in response to receiving the second input:
perform a third operation corresponding to the selection of the user interface element using the respective control mode.

33. The non-transitory computer readable storage medium of claim 32, wherein:
the respective control mode corresponds to an audio output mode,
the second input corresponds to a secondary selection of the user interface element using the respective control mode,
performing the third operation includes presenting an audio output corresponding to the user interface element without transmitting, to the second electronic device, one or more instructions that cause the second electronic device to perform a fourth operation corresponding to selection of the user interface element, and
the instructions further cause the first electronic device to:
receive, via the one or more input devices, a third input corresponding to primary selection of the user interface element; and in response to receiving the third input, transmit, to the second electronic device, the one or more instructions that cause the second electronic device to perform the fourth operation.

34. The non-transitory computer readable storage medium of claim 32, wherein:
the one or more input devices include a switch input device,
the second input is associated with the switch input device, and
performing the third operation corresponding to the selection of the user interface element using the respective control mode includes transmitting, to the second electronic device, one or more instructions that cause the second electronic device to perform a fourth operation corresponding to selection of the user interface element.

35. The non-transitory computer readable storage medium of claim 25, wherein the one or more input devices include a hardware input device, and the input associated with the image is detected via the hardware input device.

36. The non-transitory computer readable storage medium of claim 25, wherein the instructions further cause the first electronic device to:
while not operating in the remote interaction mode with the second electronic device, detect, via the one or more input devices, a respective input corresponding to a request to initiate the remote interaction mode with the second electronic device; and
in response to detecting the respective input:
initiate the remote interaction mode with the second electronic device.

* * * * *